(12) United States Patent
Uchida

(10) Patent No.: US 10,727,700 B2
(45) Date of Patent: Jul. 28, 2020

(54) POWER TRANSMISSION SYSTEM

(71) Applicant: FUJITSU LIMITED, Kawasaki-shi, Kanagawa (JP)

(72) Inventor: Akiyoshi Uchida, Akashi (JP)

(73) Assignee: FUJITSU LIMITED, Kawasaki (JP)

(*) Notice: Subject to any disclaimer, the term of this patent is extended or adjusted under 35 U.S.C. 154(b) by 70 days.

(21) Appl. No.: 16/204,708

(22) Filed: Nov. 29, 2018

(65) Prior Publication Data

US 2019/0103768 A1    Apr. 4, 2019

Related U.S. Application Data

(63) Continuation of application No. PCT/JP2016/066721, filed on Jun. 6, 2016.

(51) Int. Cl.
*H02J 50/12* (2016.01)
*H02J 50/40* (2016.01)
(Continued)

(52) U.S. Cl.
CPC .............. *H02J 50/12* (2016.02); *H02J 7/025* (2013.01); *H02J 50/40* (2016.02); *H02J 50/80* (2016.02); *H04B 5/0037* (2013.01)

(58) Field of Classification Search
CPC .. H02J 50/12; H02J 7/025; H02J 50/40; H02J 50/80; H04B 5/0037
See application file for complete search history.

(56) References Cited

U.S. PATENT DOCUMENTS

2011/0260532 A1    10/2011 Tanabe
2011/0260682 A1    10/2011 Low et al.
(Continued)

FOREIGN PATENT DOCUMENTS

JP    2010-288442 A    12/2010
JP    2011-120361 A    6/2011
(Continued)

OTHER PUBLICATIONS

International Search Report and Written Opinion of the International Searching Authority (Form PCT/ISA/210, 220, and 237), mailed in connection with PCT/JP2016/066721 and dated Aug. 23, 2016 (10 pages).

*Primary Examiner* — Rexford N Barnie
*Assistant Examiner* — Terrence R Willoughby
(74) *Attorney, Agent, or Firm* — Fujitsu Patent Center

(57) ABSTRACT

A power-transmission system includes a power transmitter; receivers that each receive power by electricity via a space from the power transmitter; a first determiner configured to determine based on power-data concerning rated-power each received from the receivers and the received power whether the receiver excessive in the received power and the receiver insufficient in the received power are present; a second determiner that determines whether the received power of the receiver excessive in the received power is equal to or larger than a predetermined value; and a command generator configured to transmit, to the receiver determined as having the received power equal to or larger than the predetermined value by the second determiner, a command for reducing the received power with the receivers to be equal to or smaller than a predetermined target value.

9 Claims, 32 Drawing Sheets

(51) Int. Cl.
*H02J 50/80* (2016.01)
*H02J 7/02* (2016.01)
*H04B 5/00* (2006.01)

(56) References Cited

U.S. PATENT DOCUMENTS

| | | |
|---|---|---|
| 2012/0080957 A1 | 4/2012 | Cooper et al. |
| 2015/0022017 A1* | 1/2015 | Kim .................. H02J 5/005 307/104 |
| 2015/0115729 A1 | 4/2015 | Kanno |
| 2016/0072339 A1 | 3/2016 | Shichino |
| 2016/0190870 A1* | 6/2016 | Nagamine ............... H02J 50/10 307/52 |
| 2016/0294220 A1* | 10/2016 | Kwon .................... H02J 50/80 |
| 2017/0207667 A1 | 7/2017 | Shimokawa |

FOREIGN PATENT DOCUMENTS

| | | |
|---|---|---|
| JP | 2013-530662 A | 7/2013 |
| JP | 2014-176173 A | 9/2014 |
| JP | 2015-12633 A | 1/2015 |
| JP | 2015-111997 A | 6/2015 |
| JP | 2015-149890 A | 8/2015 |
| WO | 2016/067447 A1 | 5/2016 |

\* cited by examiner

FIG. 9

| RATED OUTPUT (W) | UPPER LIMIT VALUE (W) | LOWER LIMIT VALUE (W) | PREDETERMINED VALUE (W) | TARGET VALUE (W) |
|---|---|---|---|---|
| 5 | 6 | 5 | 6.6 | 6.3 |

FIG. 10

| POWER RECEIVER ID | ELECTRIC POWER DATA | EXCESSIVE DEGREE DATA |
|---|---|---|
| 001 | EXCESSIVE | 50% |

FIG. 11

| ADJUSTMENT COMMAND | INCREASE DUTY RATIO | NO ADJUSTMENT OF DUTY RATIO | REDUCE DUTY RATIO |
|---|---|---|---|
| DATA VALUE | 10 | 01 | 00 |

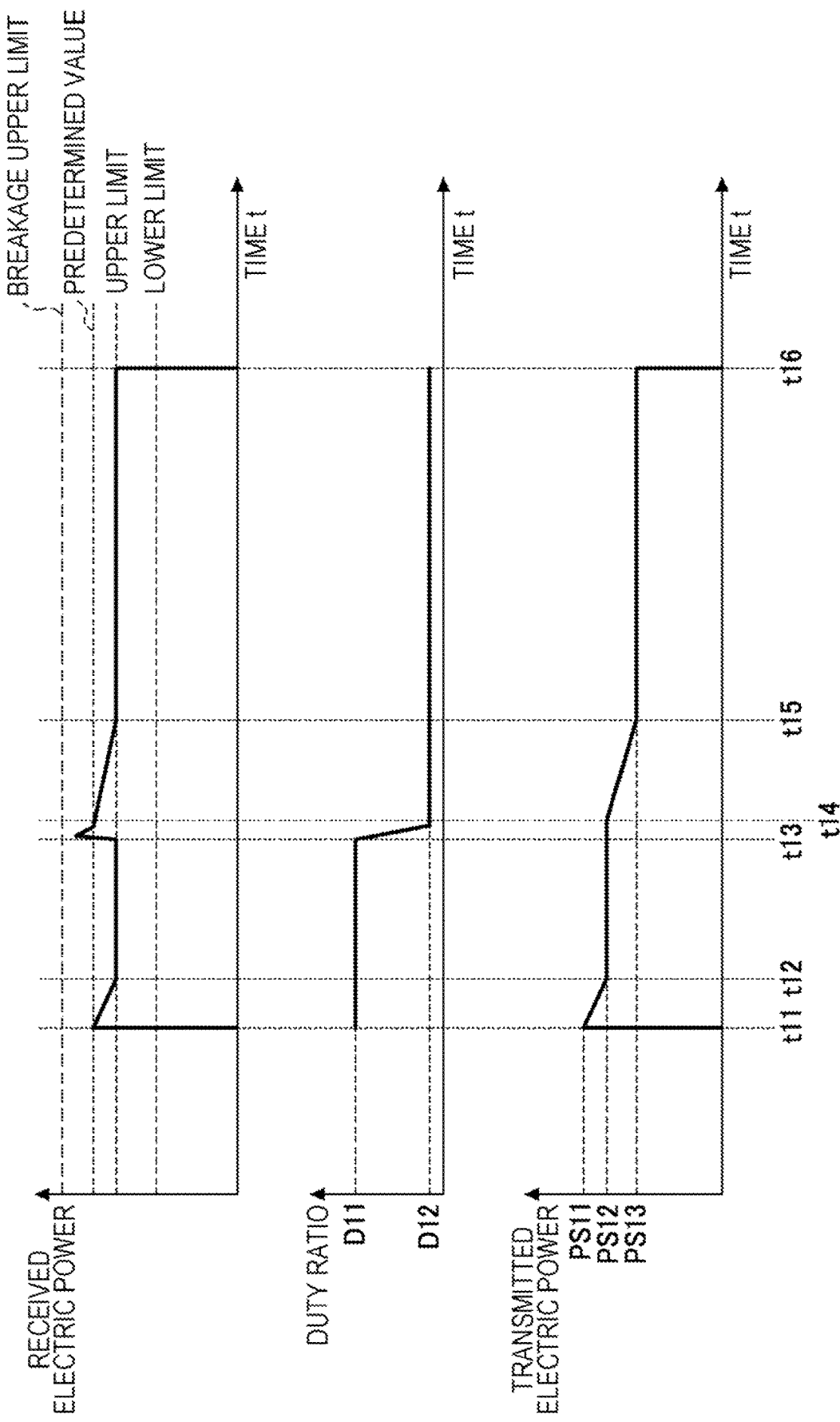

POWER TRANSMISSION SYSTEM

CROSS-REFERENCE TO RELATED APPLICATION

This application is a continuation application of International Application PCT/JP2016/066721 filed on Jun. 6, 2016 and designated the U.S., the entire contents of which are incorporated herein by reference.

FIELD

The embodiments discussed herein are related to a power transmission system.

BACKGROUND

There has been a pointless charging apparatus including a collective charging unit capable of collectively charging a plurality of electronic devices with a pointless charging scheme, the pointless charging apparatus including an acquiring unit configured to acquire, for each of the electronic devices, device information of the electronic device and a determining unit configured to determine based on the device information acquired by the acquiring unit whether the electronic device is adapted to the collective charging.

The pointless charging apparatus further includes a charging control unit configured to perform the collective charging when the determining unit determines that all of the plurality of electronic devices are adapted to the collective charging and a first notifying unit configured to, when the determining unit determines that at least any one of the plurality of electronic devices is not adapted to the collective charging, specify the electronic device and notifies the electronic device.

The acquiring unit further acquires, as the device information of the electronic device, for each of the electronic devices, reception sensitivity of a reception function of the electronic device. When the determining unit determines that all of the plurality of electronic devices are adapted to the collective charging, the charging control unit performs the collective charging and determines charging speed of the collective charging unit based on the reception sensitivity acquired by the acquiring unit (see, for example, Japanese Laid-open Patent Publication No. 2011-120361).

SUMMARY

According to an aspect of the embodiments, a power transmission system includes a power transmitter; and a plurality of power receivers configured to simultaneously receive electric power from the power transmitter with magnetic field resonance or electric field resonance, wherein each of the plurality of power receivers includes: a secondary-side resonance coil; an adjuster configured to adjust received electric power received by the secondary-side resonance coil; a power reception-side modem configured to communicate with the power transmitter; and a power reception-side controller configured to control the adjuster, the power transmitter include: a primary-side resonance coil configured to transmit electric power to the secondary-side resonance coil of each of the plurality of power receivers with the magnetic field resonance or the electric field resonance; a power transmission-side modem configured to communicate with the plurality of power receivers; a first determiner configured to determine based on electric power data concerning rated electric power received from each of the plurality of power receivers and the received electric power whether the power receiver excessive in the received electric power and the power receiver insufficient in the received electric power are present; a second determiner configured to, when the first determiner determines that the power receiver excessive in the received electric power and the power receiver insufficient in the received electric power are present, determine whether the received electric power of the power receiver excessive in the received electric power is equal to or larger than a predetermined value; and a command generator configured to transmit, to the power receiver determined as having the received electric power equal to or larger than the predetermined value by the second determiner, via the power transmission-side modem, a command for reducing the received electric power with the adjuster to be equal to or smaller than a predetermined target value, when the command is received by the power reception-side modem, the power reception-side controller controls the adjuster until the received electric power decrease to the predetermined target value or smaller, and when the received electric power decreases to the predetermined target value or smaller, the power reception-side modem transmits the electric power data to the power transmission-side modem.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating data stored in a memory of the power receiver;

FIG. 10 is a diagram illustrating data structures of electric power data and excessive degree data;

FIG. 11 is a diagram illustrating data structures of adjustment commands stored in the memory of the power receiver;

FIG. 35 is a diagram illustrating operation in reducing received electric power of the power receiver to a target value using a reduction command.

DESCRIPTION OF EMBODIMENTS

Embodiments are explained below.

First Embodiment

Before first to third embodiments are explained, the underlying technology of power receivers and power transmission systems in the first to third embodiments is explained with reference to FIGS. 1 to 3.

Figure 1:
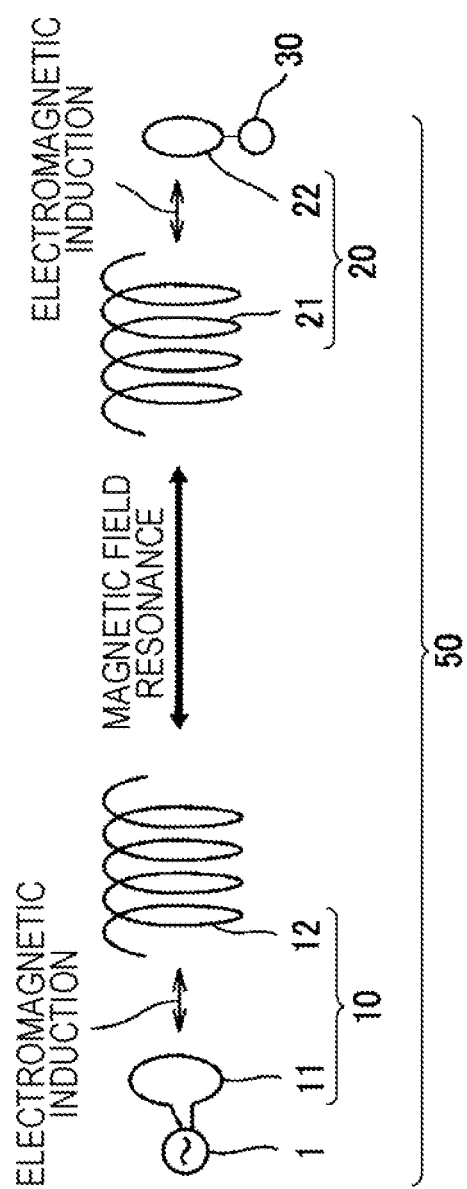
FIG. 1 is a diagram illustrating a power transmission system.

FIG. 1 is a diagram illustrating a power transmission system 50.

As illustrated in FIG. 1, the power transmission system 50 includes an AC power supply 1, a power transmitter 10 on a primary side (a power transmission side), and a power receiver 20 on a secondary side (a power reception side). The power transmission system 50 may include a plurality of power transmitters 10 and a plurality of power receivers 20.

The power transmitter 10 includes a primary-side coil 11 and a primary-side resonance coil 12. The power receiver 20 includes a secondary-side resonance coil 21 and a secondary-side coil 22. A load apparatus 30 is connected to the secondary-side coil 22.

As illustrated in FIG. 1, the power transmitter 10 and the power receiver 20 perform transmission of energy (electric power) from the power transmitter 10 to the power receiver 20 with magnetic field resonance between the primary-side resonance coil (LC resonator) 12 and the secondary-side resonance coil (LC resonator) 21. As the power transmission from the primary-side resonance coil 12 to the secondary-side resonance coil 21, not only the magnetic field resonance but also electric field resonance and the like are possible. However, in the following explanation, the magnetic field resonance is mainly explained as an example.

In the first embodiment, as an example, a frequency of an AC voltage output by the AC power supply 1 is 6.78 MHz and a resonant frequency of the primary-side resonance coil 12 and the secondary-side resonance coil 21 is 6.78 MHz.

Power transmission from the primary-side coil 11 to the primary-side resonance coil 12 is performed using electromagnetic induction. Power transmission from the secondary-side resonance coil 21 to the secondary-side coil 22 is also performed using electromagnetic induction.

In a form illustrated in FIG. 1, the power transmission system 50 includes the secondary-side coil 22. However, the power transmission system 50 may not include the secondary-side coil 22. In this case, the load apparatus 30 only has to be directly connected to the secondary-side resonance coil 21.

Figure 2:
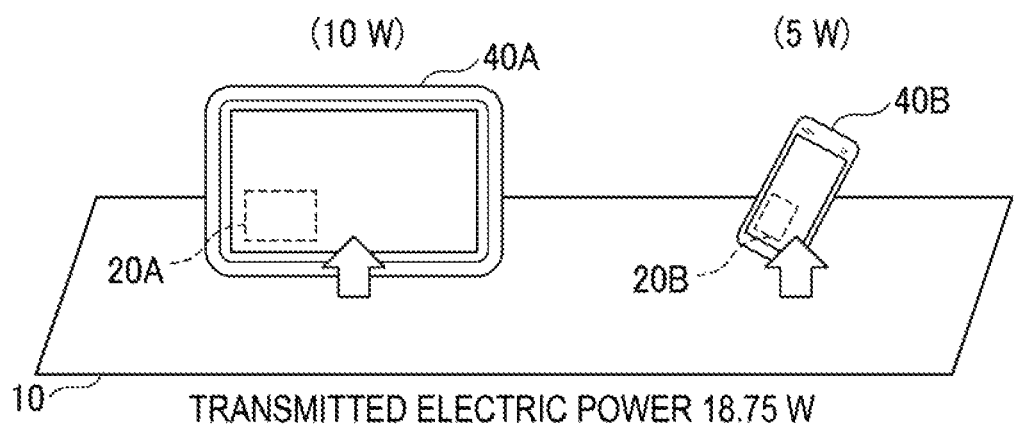
FIG. 2 is a diagram illustrating a state in which electric power is transmitted from a power transmitter to electronic devices by magnetic field resonance.

FIG. 2 is a diagram illustrating a state in which electric power is transmitted from the power transmitter 10 to electronic devices 40A and 40B by the magnetic field resonance.

The electronic devices 40A and 40B are respectively a tablet computer and a smartphone and respectively incorporate power receivers 20A and 20B. The power receivers 20A and 20B include a configuration obtained by removing the secondary-side coil 22 from the power receiver 20 (see FIG. 1) illustrated in FIG. 1. That is, for example, the power receivers 20A and 20B include the secondary-side resonance coils 21. In FIG. 2, the power transmitter 10 is simplified and illustrated. However, the power transmitter 10 is connected to the AC power supply 1 (see FIG. 1).

In FIG. 2, the electronic devices 40A and 40B are disposed in positions at an equal distance from the power transmitter 10. The power receivers 20A and 20B respectively incorporated in the electronic devices 40A and 40B receive electric power in a noncontact state from the power transmitter 10 with the magnetic field resonance.

As an example, in the state illustrated in FIG. 2, it is assumed that power reception efficiency of the power receiver 20A incorporated in the electronic device 40A is 40% and power reception efficiency of the power receiver 20B incorporated in the electronic device 40B is 40%.

The power reception efficiencies of the power receivers 20A and 20B are represented by ratios of electric powers (received electric powers) received by the secondary-side coils 22 of the power receivers 20A and 20B to electric power transmitted from the primary-side coil 11 connected to the AC power supply 1. When the power transmitter 10 does not include the primary-side coil 11 and the primary-side resonance coil 12 is directly connected to the AC power supply 1, received electric power only has to be calculated using electric power transmitted from the primary-side resonance coil 12 instead of the electric power transmitted from the primary-side coil 11. When the power receivers 20A and 20B do not include the secondary-side coils 22, received electric power only has to be calculated using electric power received by the secondary-side resonance coil 21 instead of the electric power received by the secondary-side coil 22.

The power reception efficiencies of the power receivers 20A and 20B depend on coil specifications of the power transmitter 10 and the power receivers 20A and 20B, the distances between the power transmitter 10 and the power receivers 20A and 20B, and the postures of the power transmitter 10 and the power receivers 20A and 20B. In FIG. 2, the configurations of the power receivers 20A and 20B are the same. The power receivers 20A and 20B are disposed in positions of an equal distance from the power transmitter 10 and in an equal posture. Therefore, the power reception efficiencies of the power receivers 20A and 20B are equal and are, for example, 40%.

It is assumed that a rated output (rated electric power) of the electronic device 40A is 10 W and a rated output of the electronic device 40B is 5 W.

In such a case, electric power transmitted from the primary-side resonance coil 12 (see FIG. 1) of the power transmitter 10 is 18.75 W. 18.75 W is calculated by (10 W+5 W)/(40%+40%).

Incidentally, when the electric power of 18.75 W of the power transmitter 10 is transmitted toward the electronic devices 40A and 40B, the power receivers 20A and 20B receive electric power of 15 W in total. Since the power receivers 20A and 20B equally receive the electric power, each of the power receivers 20A and 20B receives electric power of 7.5 W.

As a result, the electric device 40A is short of electric power by 2.5 W and the electric device 40B is in excess of electric power by 2.5 W.

That is, for example, even if the electric power of 18.75 W is transmitted from the power transmitter 10 to the electronic devices 40A and 40B, the electronic devices 40A and 40B are unable to be charged in a well-balanced state. In other words, for example, supply of electric power in simultaneously charging the electronic devices 40A and 40B is not well-balanced.

Figure 3:
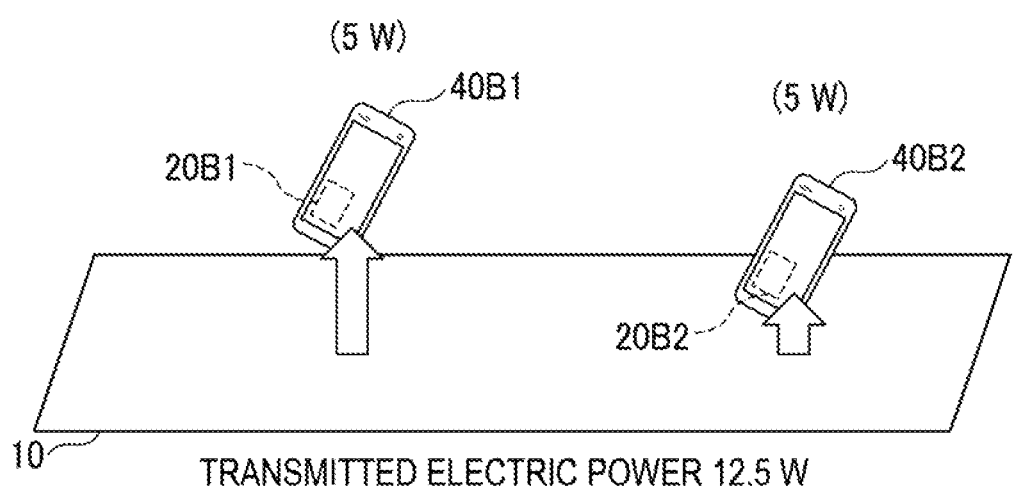
FIG. 3 is a diagram illustrating a state in which electric power is transmitted from the power transmitter to electronic devices by the magnetic field resonance.

FIG. 3 is a diagram illustrating a state in which electric power is transmitted from the power transmitter 10 to electronic devices 40B1 and 40B2 by the magnetic field resonance.

The electronic devices 40B1 and 40B2 are smartphones of the same type and respectively incorporate power receivers 20B1 and 20B2. The power receivers 20B1 and 20B2 are equal to the power receiver 20B illustrated in FIG. 2. That is, for example, the power receivers 20B1 and 20B2 include secondary-side resonance coils 21. In FIG. 3, the power transmitter 10 is simplified and illustrated. However, the power transmitter 10 is connected to the AC power supply 1 (see FIG. 1).

In FIG. 3, angles (postures) of the electronic devices 40B1 and 40B2 with respect to the power transmitter 10 are equal. However, the electronic device 40B1 is disposed in a position farther from the power transmitter 10 than the electronic device 40B2. The power receivers 20B1 and 20B2 respectively incorporated in the electronic devices 40B1 and 40B2 receive electric power in a noncontact state from the power transmitter 10 with the magnetic field resonance.

As an example, in the state illustrated in FIG. 3, it is assumed that power reception efficiency of the power receiver 20B1 incorporated in the electronic device 40B1 is 35% and power reception efficiency of the power receiver 20B2 incorporated in the electronic device 40B2 is 45%.

Since angles (postures) of the electronic devices 40B1 and 40B2 with respect to the power transmitter 10 are equal, the power reception efficiencies of the power receivers 20B1 and 20B2 depend on the distances between the power receivers 20B1 and 20B2 and the power transmitter 10. Therefore, in FIG. 3, the power reception efficiency of the power receiver 20B1 is lower than the power reception efficiency of the power receiver 20B2. Both of rated outputs of the electronic devices 40B1 and 40B2 are 5 W.

In such a case, electric power transmitted from the primary-side resonance coil 12 (see FIG. 1) of the power transmitter 10 is 12.5 W. 12.5 W is calculated by (5 W+5 W)/(35%+45%).

Incidentally, when the electric power of 12.5 W is transmitted from the power transmitter 10 toward the electronic devices 40B1 and 40B2, the power receivers 20B1 and 20B2 receive electric power of 10 W in total. In FIG. 3, the power reception efficiency of the power receiver 20B1 is 35% and the power reception efficiency of the power receiver 20B2 is 45%. Therefore, the power receiver 20B1 receives electric power of approximately 4.4 W and the power receiver 20B2 receives electric power of approximately 5.6 W.

As a result, the electronic device 40B1 is short of electric power by approximately 0.6 W and the electronic device 40B2 is in excess of electric power by 0.6 W.

That is, for example, even if the electric power of 12.5 W is transmitted from the power transmitter 10 to the electronic devices 40B1 and 40B2, the electronic devices 40B1 and 40B2 are unable to be charged in a well-balanced state. In other words, for example, supply of electric power in simultaneously charging the electronic devices 40B1 and 40B2 is not well-balanced (there is room of improvement).

The supply balance of electric power supplied when the angles (the postures) of the electronic devices 40B1 and 40B2 with respect to the power transmitter 10 are equal and the distances of the electronic devices 40B1 and 40B2 from the power transmitter 10 are different is explained above.

However, the reception frequencies depend on the distances between the power transmitter 10 and the power receivers 20B1 and 20B2 and the angles (the postures) of the power receivers 20B1 and 20B2 with respect to the power transmitter 10. Therefore, if the angles (the postures) of the electronic devices 40B1 and 40B2 are different in the positional relation illustrated in FIG. 3, the power reception efficiencies of the power receivers 20B1 and 20B2 are values different from 35% and 45% explained above.

Even if the distances of the electronic devices 40B1 and 40B2 from the power transmitter 10 are equal, if the angles (the postures) of the electronic devices 40B1 and 40B2 with respect to the power transmitter 10 are different, the power reception efficiencies of the power receivers 20B1 and 20B2 are values different from each other.

A power receiver and a power transmission system in a first embodiment are explained with reference to FIGS. 4 and 5.

Figure 4:
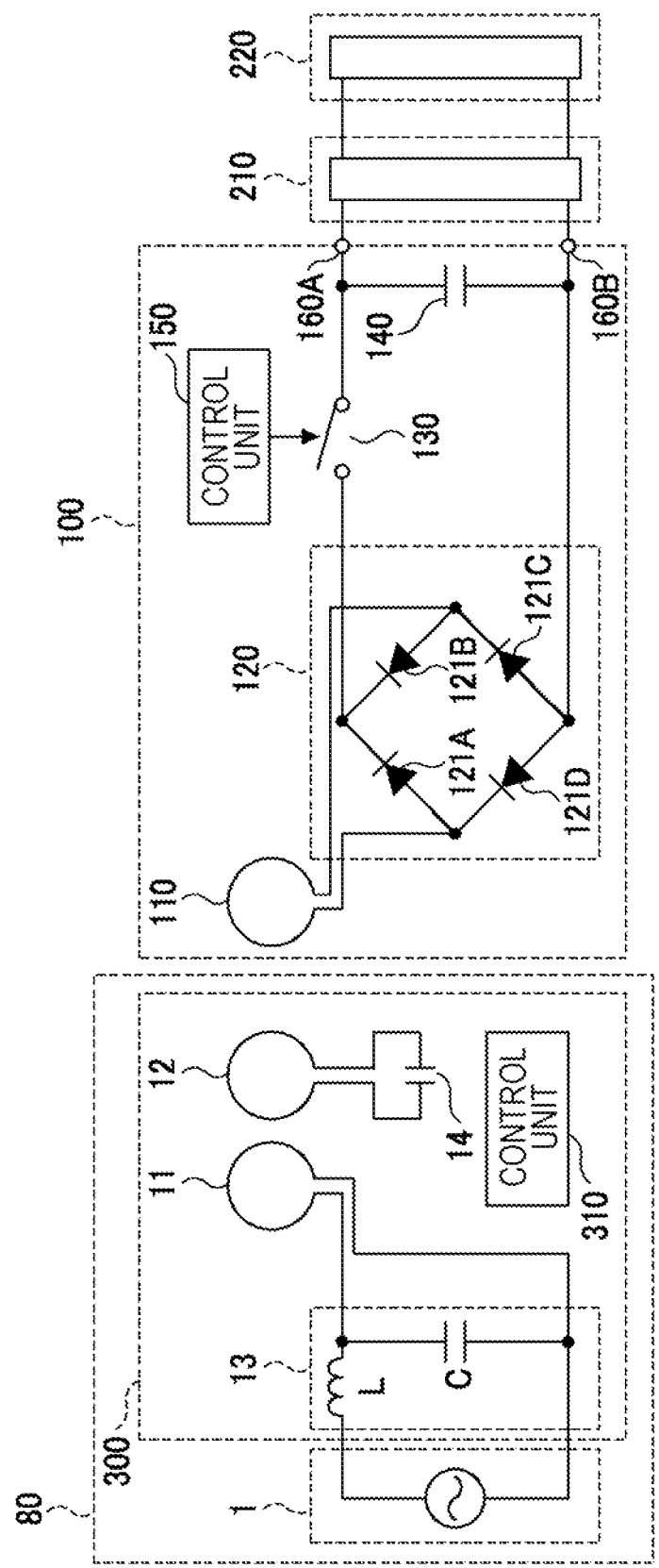
FIG. 4 is a diagram illustrating a power receiver and a power transmitting apparatus in a first embodiment.

FIG. 4 is a diagram illustrating a power receiver 100 and a power transmitting apparatus 80 in the first embodiment. The power transmitting apparatus 80 includes an AC power supply 1 and a power transmitter 300. The AC power supply 1 is the same as the AC power supply 1 illustrated in FIG. 1.

The power transmitting apparatus 80 includes the AC power supply 1 and the power transmitter 300.

The power transmitter 300 includes the primary-side coil 11, the primary-side resonance coil 12, a matching circuit 13, a capacitor 14, and a control unit 310.

The power receiver 100 includes a secondary-side resonance coil 110, a rectifier circuit 120, a switch 130, a smoothing capacitor 140, a control unit 150, and output terminals 160A and 160B. A DC-DC converter 210 is connected to the output terminals 160A and 160B. A battery 220 is connected to an output side of the DC-DC converter 210. In FIG. 4, a load circuit is the battery 220.

First, the power transmitter 300 is explained. As illustrated in FIG. 4, the primary-side coil 11 is a loop-like coil and is connected to the AC power supply 1 via the matching circuit 13 between both ends. The primary-side coil 11 is disposed near the primary-side resonance coil 12 in a noncontact manner and electromagnetically coupled to the primary-side resonance coil 12. The primary-side coil 11 is disposed such that the center axis of the primary-side coil 11 coincides with the center axis of the primary-side resonance coil 12. This is to improve coupling strength of the primary-side coil 11 and the primary-side resonance coil 12 and suppress a leak of a magnetic flux to suppress generation of an unneeded electromagnetic field around the primary-side coil 11 and the primary-side resonance coil 12.

The primary-side coil 11 generates a magnetic field with AC power supplied from the AC power supply 1 through the matching circuit 13 and transmits electric power to the primary-side resonance coil 12 with electromagnetic induction (mutual induction).

As illustrated in FIG. 4, the primary-side resonance coil 12 is disposed near the primary-side coil 11 in a noncontact manner and electromagnetically coupled to the primary-side coil 11. The primary-side resonance coil 12 is designed to have a predetermined resonant frequency and have a high Q value. The resonant frequency of the primary-side resonance coil 12 is set to be equal to a resonant frequency of the secondary-side resonance coil 110. The capacitor 14 for adjusting the resonant frequency is connected in series between both ends of the primary-side resonance coil 12.

The resonant frequency of the primary-side resonance coil 12 is set to be the same frequency as the frequency of the AC power output by the AC power supply 1. The resonant frequency of the primary-side resonance coil 12 depends on the inductance of the primary-side resonance coil 12 and the capacitance of the capacitor 14. Therefore, the inductance of the primary-side resonance coil 12 and the capacitance of the capacitor 14 are set such that the resonant frequency of the primary-side resonance coil 12 is the same frequency as the frequency of the AC power output from the AC power supply 1.

The matching circuit 13 is inserted to take impedance matching of the primary-side coil 11 and the AC power supply 1. The matching circuit 13 includes an inductor L and a capacitor C.

The AC power supply 1 is a power supply configured to output AC power having a frequency requested for magnetic field resonance. The AC power supply 1 incorporates an amplifier configured to amplify the output power. The AC power supply 1 outputs, for example, AC power having a high frequency of approximately several hundred kHz to several ten MHz.

The capacitor 14 is a capacitor of a variable capacitance type inserted in series between both the ends of the primary-side resonance coil 12. The capacitor 14 is provided to adjust the resonant frequency of the primary-side resonance coil 12. The capacitance of the capacitor 14 is set by the control unit 310.

The control unit 310 performs control of an output voltage and an output frequency of the AC power supply 1, control of the capacitance of the capacitor 14, control of electric energy (an output) transmitted from the primary-side resonance coil 12, setting of duty ratios of the power receivers 100A and 100B, and the like.

The power transmitting apparatus 80 explained above transmits, to the primary-side resonance coil 12, with magnetic induction, AC power supplied from the AC power supply 1 to the primary-side coil 11 and transmits electric power from the primary-side resonance coil 12 to the secondary-side resonance coil 110 of the power receiver 100 with the magnetic field resonance.

The secondary-side resonance coil 110 included in the power receiver 100 is explained.

The secondary-side resonance coil 110 is designed to have the same resonant frequency as the resonant frequency of the primary-side resonance coil 12 and have a high Q value. A pair of terminals of the secondary-side resonance coil 110 is connected to the rectifier circuit 120.

The secondary-side resonance coil 110 outputs, to the rectifier circuit 120, AC power transmitted from the primary-side resonance coil 12 of the power transmitter 300 by the magnetic field resonance.

The rectifier circuit 120 includes four diodes 121A to 121D. The diodes 121A to 121D are connected in a bridge shape. The rectifier circuit 120 full-wave rectifies electric power input from the secondary-side resonance coil 110 and outputs the electric power.

The switch 130 is inserted in series into a line on a high-voltage side (a line on the upper side in FIG. 4) of a pair of lines that connects the rectifier circuit 120 and the smoothing capacitor 140. The switch 130 only has to be, for example, a switch that may perform transmission and interruption of a DC voltage at high speed like an FET.

The electric power full-wave rectified by the rectifier circuit 120 is input to the switch 130. The full-wave rectified electric power may be treated as DC power. Therefore, the switch 130 may be a switch for a direct current. As the switch 130 for the direct current, a switch having a simple structure like an FET may be used. Therefore, a reduction in the size of the switch 130 is possible. As a switch for an alternating current, there are, for example, a relay, a triac, and a switch including an FET. The relay is a mechanical switch. Therefore, the size of the relay is large. A problem of durability is likely to occur when high-speed switching is performed. The triac is inappropriate for high-speed switching at 6.78 MHz or the like. The switch for the alternating current including the FET includes a plurality of FETs. Therefore, the switch for the alternating current is large compared with the FET for the direct current. The influence of parasitic capacitance on the alternating current occurs. Because of such reasons, it is advantageous to use the FET for the direct current as the switch 130 because a reduction in size is possible and the influence of parasitic capacitance does not occur.

Details of the driving pattern of the switch 130 are explained below. The switch 130 is pulse width modulation (PWM)-driven by the control unit 150. A duty ratio of a PWM driving pattern of the switch 130 is set based on an adjustment command transmitted from the power transmitting apparatus 80. The adjustment command transmitted from the power transmitting apparatus 80 is explained below.

A frequency of the PWM driving pattern is set to be equal to or lower than a frequency of AC power received by the secondary-side resonance coil 110.

The smoothing capacitor 140 is connected to an output side of the rectifier circuit 120. The smoothing capacitor 140 smooths the electric power full-wave rectified by the rectifier circuit 120 and outputs the electric power as DC power. The output terminals 160A and 160B are connected to an output side of the smoothing capacitor 140. The electric power full-wave rectified by the rectifier circuit 120 may be treated as substantial AC power because a negative component of AC power is inverted into a positive component. However, by using the smoothing capacitor 140, stable DC power may be obtained even when a ripple is included in the full-wave rectified electric power.

The DC-DC converter 210 is connected to the output terminals 160A and 160B. The DC-DC converter 210 converts a voltage of DC power output from the power receiver 100 into a rated voltage of the battery 220 and outputs the voltage. When the output voltage of the rectifier circuit 120 is higher than the rated voltage of the battery 220, the DC-DC converter 210 steps down the output voltage of the rectifier circuit 120 to the rated voltage of the battery 220. When the output voltage of the rectifier circuit 120 is lower than the rated voltage of the battery 220, the DC-DC converter 210 steps up the output voltage of the rectifier circuit 120 to the rated voltage of the battery 220.

The battery 220 only has to be a repeatedly rechargeable secondary battery. For example, a lithium ion battery may be used. For example, when the power receiver 100 is incorporated in an electronic device such as a tablet computer or a smartphone, the battery 220 is a main battery of such an electronic device.

In the power transmission system in the first embodiment, the power transmitter 300 requests the power receiver 100 to send charging rate data. The charging rate data is data representing a charging rate of the battery 220.

There are various methods of calculating the charging rate of the battery 220. For example, a control unit incorporated in the battery 220 may calculate the charging rate based on an inter-terminal voltage between a positive polarity terminal and a negative polarity terminal of the battery 220 with reference to data representing a relation between the inter-terminal voltage and the charging rate. In this case, a value of an electric current flowing to the positive polarity terminal or the negative polarity terminal may be used. The charging rate of the battery 220 may be calculated by any method. The battery 220 may transmit data representing the inter-terminal voltage to the control unit 150 as the charging rate data. The control unit 150 may calculate the charging rate from the inter-terminal voltage.

The primary-side coil 11, the primary-side resonance coil 12, and the secondary-side resonance coil 110 are manufactured by, for example, winding a copper wire. However, the material of the primary-side coil 11, the primary-side resonance coil 12, and the secondary-side resonance coil 110 may be metal other than copper (for example, gold or aluminum). Different materials may be used for the primary-side coil 11, the primary-side resonance coil 12, and the secondary-side resonance coil 110.

In such a configuration, the primary-side coil 11 and the primary-side resonance coil 12 are a power transmission side of electric power and the secondary-side resonance coil 110 is a power reception side of the electric power.

The electric power is transmitted from the power transmission side to the power reception side using the magnetic field resonance generated between the primary-side resonance coil 12 and the secondary-side resonance coil 110 by a magnetic field resonance scheme. Therefore, it is possible to transmit the electric power in a longer distance than an electromagnetic induction scheme for transmitting the electric power from the power transmission side to the power reception side with electromagnetic induction.

The magnetic field resonance scheme has advantages that the magnetic field resonance scheme has a higher degree of freedom than the electromagnetic induction scheme concerning the distance or positional deviation between resonance coils and is position-free.

Figure 5:
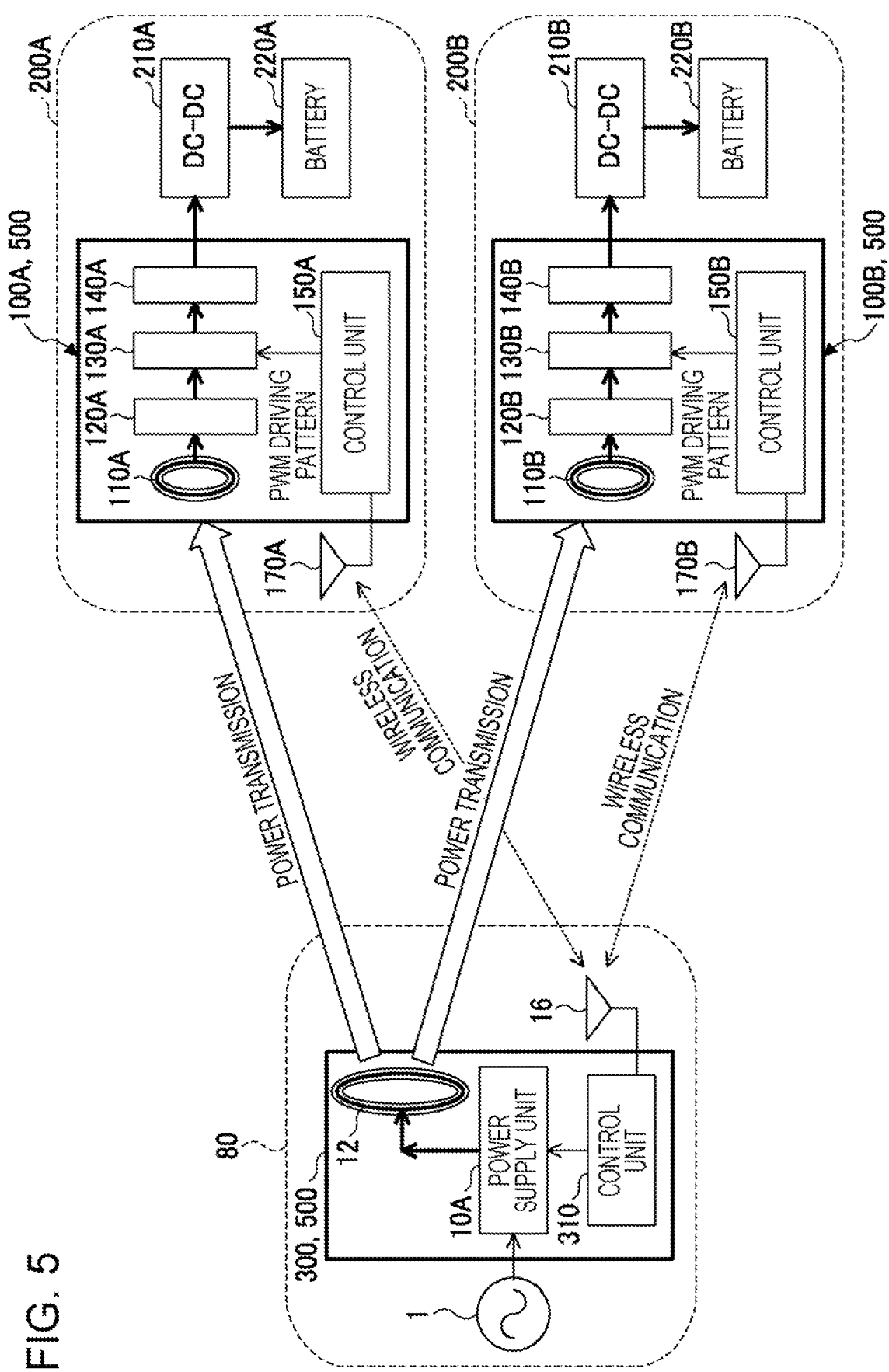
FIG. 5 is a diagram illustrating a power transmitting apparatus and electronic devices including power transmission systems in the first embodiment.

FIG. 5 is a diagram illustrating the power transmitting apparatus 80 and electronic devices 200A and 200B including power transmission systems 500 in the first embodiment.

The power transmitting apparatus 80 is the same as the power transmitting apparatus 80 illustrated in FIG. 4. However, in FIG. 5, components other than the primary-side coil 11 and the control unit 310 in FIG. 4 are represented as a power supply unit 10A. The power supply unit 10A collectively represents the primary-side resonance coil 12, the matching circuit 13, and the capacitor 14. The AC power supply 1, the primary-side resonance coil 12, the matching circuit 13, and the capacitor 14 may be collectively grasped as a power supply unit.

The power transmitting apparatus 80 further includes an antenna 16. The antenna 16 only has to be an antenna capable of performing wireless communication at a short distance such as Bluetooth (trademark). The antenna 16 is provided to receive data representing excess or shortage of received electric power from power receivers 100A and 100B included in the electronic devices 200A and 200B. The received data is input to the control unit 310.

The electronic devices 200A and 200B are respectively terminal machines such as tablet computers or smartphones. The electronic devices 200A and 200B respectively incorporate power receivers 100A and 100B, DC-DC converters 210A and 210B, and batteries 220A and 220B.

The power receivers 100A and 100B respectively have configurations obtained by adding antennas 170A and 170B to the power receiver 100 illustrated in FIG. 4. The DC-DC converters 210A and 210B are respectively the same as the DC-DC converter 210 illustrated in FIG. 4. The batteries 220A and 220B are respectively the same as the battery 220 illustrated in FIG. 4.

The power receiver 100A includes a secondary-side resonance coil 110A, a rectifier circuit 120A, a switch 130A, a smoothing capacitor 140A, a control unit 150A, and an antenna 170A. The secondary-side resonance coil 110A, the rectifier circuit 120A, the switch 130A, the smoothing capacitor 140A, and the control unit 150A respectively correspond to the secondary-side resonance coil 110, the rectifier circuit 120, the switch 130, the smoothing capacitor 140, and the control unit 150 illustrated in FIG. 4. In FIG. 5, the secondary-side resonance coil 110A, the rectifier circuit 120A, the switch 130A, and the smoothing capacitor 140A are simplified and illustrated. The output terminals 160A and 160B are omitted.

The power receiver 100B includes a secondary-side resonance coil 110B, a rectifier circuit 120B, a switch 130B, a smoothing capacitor 140B, a control unit 150B, and an antenna 170B. The secondary-side resonance coil 110B, the rectifier circuit 120B, the switch 130B, the smoothing capacitor 140B, and the control unit 150B respectively correspond to the secondary-side resonance coil 110, the rectifier circuit 120, the switch 130, the smoothing capacitor 140, and the control unit 150 illustrated in FIG. 4. In FIG. 5, the secondary-side resonance coil 110B, the rectifier circuit 120B, the switch 130B, and the smoothing capacitor 140B are simplified and illustrated. The output terminals 160A and 160B are omitted.

The antennas 170A and 170B only have to be antennas capable of performing wireless communication in a short distance such as Bluetooth (registered trademark). The antennas 170A and 170B are provided to perform data communication with the antenna 16 of the power transmitter 300 and respectively connected to the control units 150A and 150B of the power receivers 100A and 100B. The control units 150A and 150B are examples of the driving control unit.

The control unit 150A of the power receiver 100A transmits, for example, data representing, for example, excess or shortage of received electric power to the power transmitter 300 via the antenna 170A. Similarly, the control unit 150B of the power receiver 100B transmits, for example, data representing data representing, for example, excess or shortage of the received electric power to the power transmitter 300 via the antenna 170B.

The electronic devices 200A and 200B may charge the batteries 220A and 220B without coming into contact with the power transmitting apparatus 80 in a state in which the electronic devices 200A and 200B are disposed near the power transmitting apparatus 80. The charging of the batteries 220A and 220B may be simultaneously performed.

The power transmission systems 500 are constructed by the power transmitter 300 and the power receivers 100A and 100B among the components illustrated in FIG. 5. That is, for example, in the power transmitting apparatus 80 and the electronic devices 200A and 200B, the power transmission systems 500 for enabling power transmission in a noncontact state by the magnetic field resonance are adopted.

Figure 6:
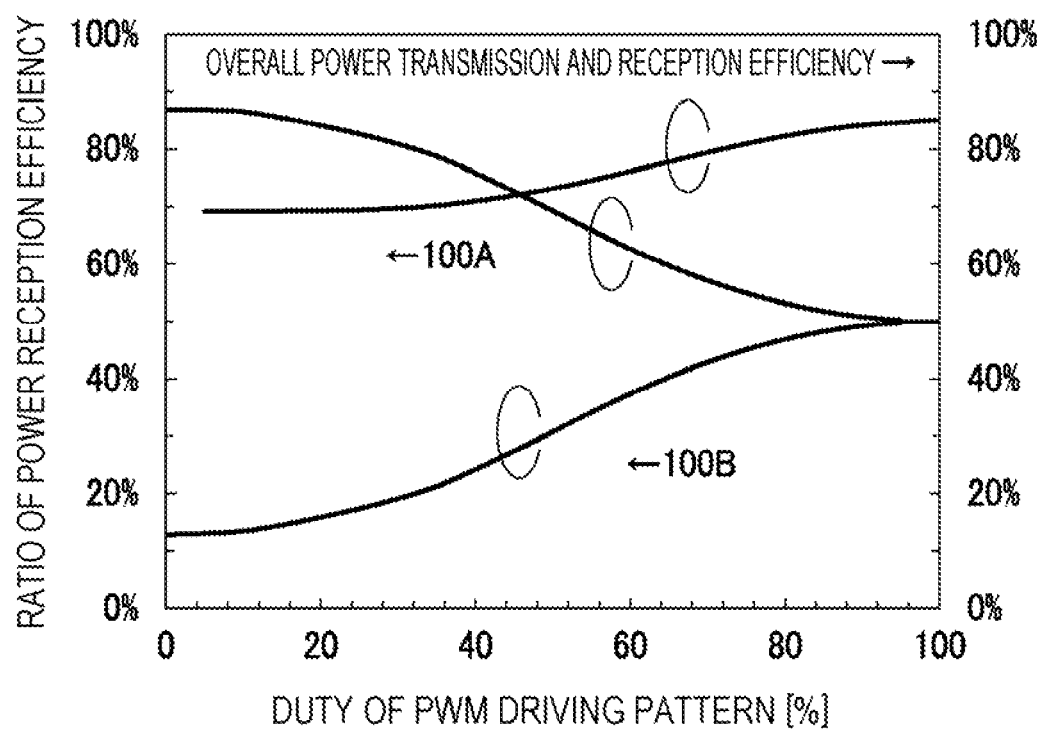
FIG. 6 is a diagram illustrating a relation between a duty ratio and power receiving efficiency of the power receiver.

FIG. 6 is a diagram illustrating a relation between a duty ratio of a PWM driving pattern and received electric energy of the power receivers 100A and 100B.

In the following explanation, in a state in which a duty ratio of a PWM driving pattern for driving the switch 130A of the power receiver 100A is fixed to 100%, a duty ratio of a PWM driving pattern for driving the switch 130B of the power receiver 100B is reduced from 100%.

In FIG. 6, the horizontal axis indicates the duty ratio of the PWM driving pattern for driving the switch 130B of the power receiver 100B. The vertical axis on the left side indicates ratios of power reception efficiencies of the power receivers 100A and 100B. The vertical axis on the right side indicates a sum of the power reception efficiencies of the power receivers 100A and 100B as a percentage.

The ratio of the power reception efficiencies is, when a sum of the power reception efficiencies of the power receivers 100A and 100B is set to 100%, a ratio of the power reception efficiency of each of the power receivers 100A and 100B to the sum of the power reception efficiencies. For example, when both the power reception efficiencies of the power receivers 100A and 100B are equal at 40% (the sum of the power reception efficiencies is 80%), both of the ratios of the power reception efficiencies of the power receivers 100A and 100B are 50%.

Both of the power reception efficiencies of the power receivers 100A and 100B being equal at 40% refers to a state in which both of the power reception efficiencies of the power receivers 100A and 100B are equal at 40% when the two power receivers 100A and 100B simultaneously receive electric power from the power transmitter 300. The power receivers 100A and 100B alone have power reception efficiency of approximately 85%.

As an example, it is assumed that, in a state in which both of duty ratios of PWM driving patterns for driving the switches 130A and 130B of the power receivers 100A and 100B are 100%, both of the ratios of the power reception efficiencies of the power receivers 100A and 100B are 50%.

In a state in which the duty ratio of the PWM driving pattern for driving the switch 130A of the power receiver 100A is fixed to 100%, when the duty ratio of the PWM driving pattern for driving the switch 130B of the power receiver 100B is reduced from 100%, as illustrated in FIG. 6, the ratio of the power reception efficiency of the power receiver 100B decreases. The ratio of the power reception efficiency of the power receiver 100A increases according to the decrease in the ratio of the power reception efficiency of the power receiver 100B.

When the duty ratio of the PWM driving pattern for driving the switch 130B of the power receiver 100B is reduced in this way, a power reception amount of the power receiver 100B decreases. Therefore, an electric current flowing to the power receiver 100B also decreases. That is, for example, the impedance of the power receiver 100B changes according to the change in the duty ratio.

In power transmission using the magnetic field resonance, electric power transmitted from the power transmitter 300 to the power receivers 100A and 100B by the magnetic field resonance is distributed between the power receivers 100A and 100B. Therefore, when the duty ratio of the PWM driving pattern for driving the switch 130B of the power receiver 100B is reduced from 100%, a power reception amount of the power receiver 100A increases by a decrease in a power reception amount of the power receiver 100B.

Therefore, as illustrated in FIG. 6, the ratio of the power reception efficiency of the power receiver 100B decreases. The ratio of the power reception efficiency of the power receiver 100A increases according to the decrease in the ratio of the power reception efficiency of the power receiver 100B.

When the duty ratio of the PWM driving pattern for driving the switch 130B of the power receiver 100B decreases to approximately 10%, the ratio of the power reception efficiency of the power receiver 100B decreases to approximately 13% and the ratio of the power reception efficiency of the power receiver 100A increases to approximately 70%.

The sum of the power reception efficiencies of the power receivers 100A and 100B is approximately 85% when the duty ratio of the PWM driving pattern for driving the switch 130B of the power receiver 100B is 100%. When the duty ratio of the PWM driving pattern for driving the switch 130B of the power receiver 100B decreases to approximately 10%, the sum of the power reception efficiencies of the power receivers 100A and 100B increases to approximately 87%.

In this way, in the state in which the duty ratio of the PWM driving pattern for driving the switch 130A of the power receiver 100A is fixed to 100%, when the duty ratio of the PWM driving pattern for driving the switch 130B of the power receiver 100B is reduced from 100%, the ratio of the power reception efficiency of the power receiver 100B decreases and the ratio of the power reception efficiency of the power receiver 100A increases. The sum of the power reception efficiencies of the power receivers 100A and 100B is a value around 80% and does not greatly fluctuate.

In the power transmission using the magnetic field resonance, the electric power transmitted from the power transmitter 300 to the power receivers 100A and 100B by the magnetic field resonance is distributed between the power receivers 100A and 100B. Therefore, even if the duty ratio changes, the sum of the power reception efficiencies of the power receivers 100A and 100B does not greatly fluctuate.

Similarly, in a state in which the duty ratio of the PWM driving pattern for driving the switch 130B of the power receiver 100B is fixed to 100%, if the duty ratio of the PWM driving pattern for driving the switch 130A of the power receiver 100A is reduced from 100%, the ratio of the power reception efficiency of the power receiver 100A decreases and the ratio of the power reception efficiency of the power receiver 100B increases. The sum of the power reception efficiencies of the power receivers 100A and 100B is a value around 80% and does not greatly fluctuate.

Therefore, if the duty ratio of the PWM driving pattern for driving one of the switches 130A or 130B of the power receivers 100A and 100B is adjusted, the ratio of the power reception efficiencies of the power receivers 100A and 100B may be adjusted.

As explained above, when the duty ratio of the PWM driving pattern for driving the switch 130A or 130B is changed, the ratios of the power reception efficiencies of the secondary-side resonance coils 110A and 110B of the power receivers 100A and 100B change.

Therefore, in the first embodiment, the duty ratio of one of the PWM driving patterns of the switches 130A and 130B of the power receivers 100A and 100B is changed from a reference duty ratio. The reference duty ratio is, for example, 100%. In this case, the duty ratio of one of the PWM driving patterns is set to an appropriate value smaller than 100%.

As it is seen from FIG. 6, when the duty ratio of one of the power receivers (100A or 100B) is reduced, a received electric power amount of the power receiver (100A or 100B) decreases. A received electric power amount of the other power receiver (100A or 100B) increases in a state in which the duty ratio is fixed.

Therefore, if the duty ratio of the PWM driving pattern of one power receiver (100A or 100B) is reduced, a power supply amount to the one power receiver (100A or 100B) is reduced. A power supply amount to the other power receiver (100A or 100B) may be increased.

However, an upper limit value of receivable electric power is set for the power receivers 100A and 100B. Therefore, when the distribution of the received electric powers of the two power receivers 100A and 100B is adjusted by adjusting the duty ratios, electric power that is unable to be received and is lost occurs if the received electric powers exceed the upper limit value of the power receiver (100A or 100B).

A minimum value (a lower limit value) of chargeable electric power to the battery (220A or 220B) is set for the power receiver (100A or 100B). Therefore, when the received electric power is reduced by reducing the duty ratio, the battery (220A or 220B) is unable to be charged if the received electric power is lower than the lower limit value.

Therefore, when the distribution of the received electric powers of the two power receivers 100A and 100B is adjusted by adjusting the duty ratios, it is desirable to consider the upper limit value and the lower limit value of the power receiver (100A or 100B) in order to efficiently charge the power receivers 100A and 100B.

In this case, the frequency of the PWM driving pattern is set to a frequency equal to or lower than a frequency of AC power transmitted by the magnetic field resonance. More desirably, the frequency of the PWM driving pattern is set to a frequency lower than the frequency of the AC power transmitted by the magnetic field resonance. For example, the frequency of the PWM driving pattern only has to be set to a frequency lower by approximately one or two digits than the frequency of the AC power transmitted by the magnetic field resonance.

This is because, if the frequency of the PWM driving pattern is higher than the frequency of the AC power transmitted by the magnetic field resonance, ON/Off of the switch 130A or 130B is switched halfway in one cycle of full-wave rectified electric power and adjustment of electric energy is likely to be unable to be appropriately performed.

Therefore, the frequency of the PWM driving pattern has to be set to a frequency equal to or lower than the frequency of the AC power transmitted by the magnetic field resonance. In that case, if the frequency of the PWM driving pattern is set to a frequency lower by approximately one or two digits than the frequency of the AC power transmitted by the magnetic field resonance, the adjustment of the electric energy may be more appropriately performed.

For example, when the frequency of the AC power transmitted by the magnetic field resonance is 6.78 MHz, the frequency of the PWM driving pattern only has to be set to approximately several hundred kHz.

A relation between the duty ratio of the PWM driving pattern and the received electric power is explained with reference to FIG. 7.

Figure 7:
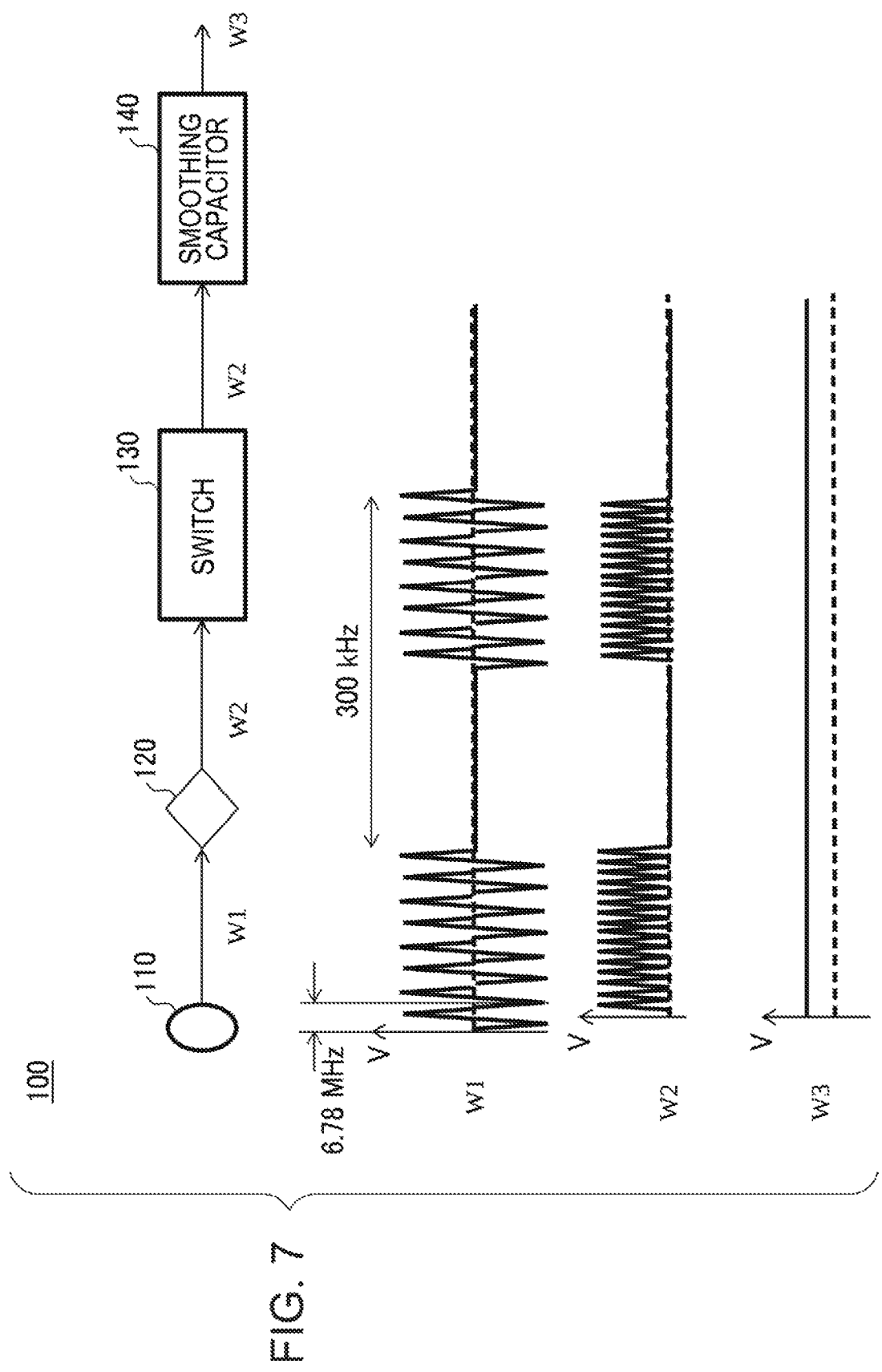
FIG. 7 is a diagram illustrating a relation between a duty ratio of a PWM driving pattern and received electric power in the power receiver.

FIG. 7 is a diagram illustrating a relation between the duty ratio of the PWM driving pattern and the received electric power in the power receiver 100.

In FIG. 7, the secondary-side resonance coil 110, the rectifier circuit 120, the switch 130, and the smoothing capacitor 140 of the power receiver 100 is simplified and illustrated and power waveforms W1, W2, and W3 are illustrated.

The power waveform W1 indicates a waveform of electric power obtained between the secondary-side resonance coil 110 and the rectifier circuit 120. The power waveform W2 indicates a waveform of electric power obtained between the rectifier circuit 120 and the switch 130. The power waveform W3 indicates a waveform of electric power obtained between the switch 130 and the smoothing capacitor 140.

Power waveforms on an input side and an output side of the switch 130 are substantially equal. Therefore, the power waveform W2 is also a power waveform obtained between the switch 130 and the smoothing capacitor 140.

It is assumed that a frequency of an AC voltage output by the AC power supply 1 is 6.78 MHz and a resonant frequency of the primary-side resonance coil 12 and the secondary-side resonance coil 21 is 6.78 MHz. It is assumed that a frequency of a PWM pulse of a PWM driving pattern is 300 kHz and a duty ratio is 50%.

Actually, as illustrated in FIG. 4, the power receiver 100 includes a circuit configuration in which a loop is formed between the secondary-side resonance coil 110 and the battery 220.

Therefore, an electric current flows to the loop circuit while the switch 130 is on but does not flow to the loop circuit while the switch 130 is off.

The power waveform W1 is a waveform in which AC power supplied from the secondary-side resonance coil 110 to the rectifier circuit 120 intermittently flows according to ON/OFF of the switch 130.

The power waveform W2 is a waveform in which electric power full-wave rectified by the rectifier circuit 120 intermittently flows according to ON/OFF of the switch 130.

The power waveform W3 is DC power obtained by smoothing electric power full-wave rectified by the rectifier circuit 120 and supplied to the smoothing capacitor 140 through the switch 130. A voltage value of the power waveform W3 is high when the duty ratio increases and is low when the duty ratio decreases.

As explained above, a voltage value of the DC power output from the smoothing capacitor 140 may be adjusted by adjusting the duty ratio of the driving pattern.

Figure 8:
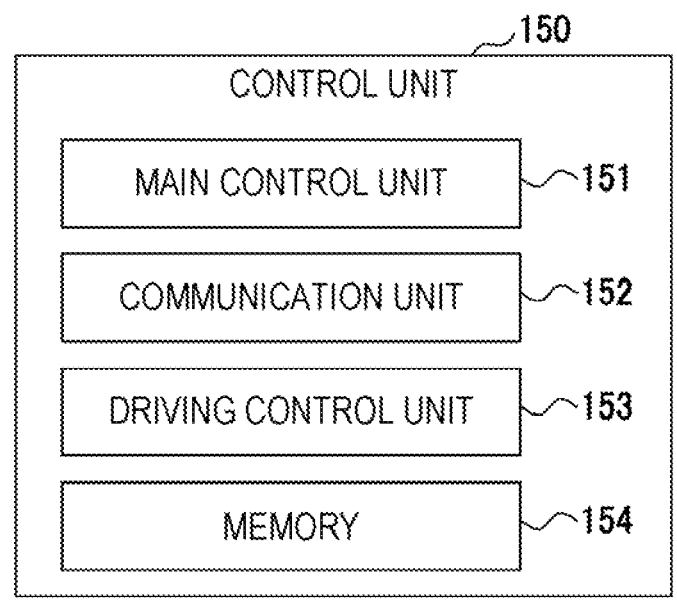
FIG. 8 is a diagram illustrating the configuration of a control unit of the power receiver.

FIG. 8 is a diagram illustrating the configuration of the control unit 150. The control unit 150 is included in the power receiver 100 illustrated in FIG. 4. The control unit 150 is the same as the control units 150A and 150B illustrated in FIG. 5.

The control unit 150 includes a main control unit 151 including a processor such as a Central Processing Unit (CPU), a Field Programmable Gate Array (FPGA) or an Application Specific Integrated Circuits (ASIC) or any combination thereof, a communication unit 152, a driving control unit 153, and a memory 154.

The main control unit 151 controls control processing by the control unit 150. The main control unit 151 transmits electric power data, charging rate data, received electric power data, and predetermined value data to the power transmitter 300 via the communication unit 152. The main control unit 151 is an example of a power reception-side control unit.

The electric power data is data indicating whether received electric power of the power receiver 100 is excessive, proper, or insufficient. The received electric power being proper indicates that the received electric power is within a predetermined range considered to be proper.

Whether the received electric power of the power receiver 100 is excessive, proper, or insufficient depends on a relation between an upper limit value and a lower limit value of the received electric power of the power receiver 100. The upper limit value and the lower limit value of the received electric power depends on a rated output (rated electric power) of the power receiver 100. Therefore, the electric power data is data concerning the rated output and the received electric power of the power receiver 100. A relation between the upper limit value and the lower limit value of the received electric power and the excessive, proper, or insufficient received electric power is explained below.

The charging rate data is data indicating a charging rate of the battery 220. The main control unit 151 acquires the charging rate data. The received electric power data is data indicating electric power received by the secondary-side resonance coil 110 of the power receiver 100.

The predetermined value data is data indicating a predetermined value larger by a predetermined rate than the upper limit value of the received electric power of the power receiver 100. The predetermined value data is data used to determine whether the received electric power of the power receiver 100 is equal to or larger than the predetermined value larger by the predetermined rate than the upper limit value. The predetermined value data is stored in the memory 154. The predetermined value indicated by the predetermined value data is set in advance for each power receiver 100. The predetermined value is sometimes different for each power receiver 100.

When receiving an adjustment command for adjusting a duty ratio from the power transmitter 300 via the communication unit 152, the main control unit 151 outputs the adjustment command to the driving control unit 153. The driving control unit 153 is a processor configured to adjust the duty ratio according to the adjustment command. The driving control unit 153 may be used as the main control unit 151 as well.

The communication unit 152 performs wireless communication with the power transmitter 300. For example, when the power receiver 100 performs short-range wireless communication by Bluetooth (trademark) with the power transmitter 300, the communication unit 152 is a modem for Bluetooth. The communication unit 152 is an example of a power reception-side communication unit.

The driving control unit 153 PWM-drives the switch 130. The driving control unit 153 adjusts, based on an adjustment command input from the main control unit 151, a duty ratio of a PWM driving pattern for PWM-driving the switch 130. The driving control unit 153 is an example of a driving control unit configured to perform driving control of the switch 130 and is an example of an adjusting unit configured to adjust the duty ratio of the PWM driving pattern.

The memory 154 stores data indicating the rated output (the rated electric power) of the power receiver 100, the upper limit value of the received electric power, and the lower limit value of the received electric power, the predetermined value data, and the target value data. The memory 154 only has to be, for example, a nonvolatile memory.

As an example, the target value data is a value higher than the upper limit value of the received electric power and lower than the predetermined value data. The target value data is data indicating a target value in reducing received electric power of the power receiver 100 higher than the predetermined value indicated by the predetermined value data. For example, when the predetermined value data is a value obtained by increasing the upper limit value of the received electric power by 10%, the target value data is a value obtained by increasing the upper limit value of the received electric power by 5%. The target value data may be equal to the upper limit value of the received electric power. A form is explained in which the target value data is higher than the upper limit value of the received electric power.

The rated output of the power receiver 100 is a rated output of the battery 220, which is the load apparatus of the power receiver 100.

The upper limit value of the received electric power is an upper limit value of electric power with which the battery 220 may be charged without causing excessive electric power unable to be charged when the battery 220, which is the load apparatus of the power receiver 100, is charged. In other words, for example, when the received electric power of the power receiver 100 is larger than the upper limit value of the received electric power, excessive electric power unable to be charged in the battery 220 occurs when the battery 220 is charged.

The lower limit value of the received electric power is a minimum value of electric power with which charging of the battery 220, which is the load apparatus of the power receiver 100, may be performed. In other words, for example, the lower limit value of the received electric power is minimum electric power with which the charging of the battery 220 is unable to be performed when the received electric power of the power receiver 100 is smaller than the lower limit value of the received electric power.

FIG. 9 is a diagram illustrating data stored in the memory 154.

In the memory 154, the data indicating the rated output of the power receiver 100, the upper limit value of the received electric power, and the lower limit value of the received electric power, the predetermined value data, and the target value data are stored. In FIG. 9, as an example, an upper limit value and a lower limit value of received electric power at the time when the rated output of the power receiver 100 is 5 W are illustrated. The upper limit value of the received electric power is 6 W and the lower limit value of the received electric power is 5 W. The predetermined value indicated by the predetermined value data is 6.6 W. The target value indicated by the target value data is 6.3 W.

For example, if the received electric power is less than 5 W, the main control unit 151 only has to determine that the received electric power is insufficient using the upper limit value and the lower limit value of the received electric power. That is, for example, the main control unit 151 only has to determine that the received electric power is insufficient if the received electric power <5 W.

The main control unit 151 only has to determine that the received electric power is proper if the received electric power is 5 W or more and 6 W or less. That is, for example, the main control unit 151 only has to determine that the received electric power is proper if 5 W≤the received electric power≤6 W.

The main control unit 151 only has to determine that the received electric power is excessive if the received electric power is more than 6 W. That is, for example, the main control unit 151 only has to determine that the received electric power is excessive if 6 W<the received electric power.

If the rated output is 10 W, the upper limit value of the received electric power is 12 W, and the lower limit value of the received electric power is 10 W, as an example, the main control unit 151 only has to determine as explained below.

For example, the main control unit 151 only has to determine that the received electric power is insufficient if the received electric power is less than 10 W. That is, for example, the main control unit 151 only has to determine that the received electric power is insufficient if the received electric power<10 W.

The main control unit 151 only has to determine that the received electric power is proper if the received electric power is 10 W or more and 12 W or less. That is, for example, the main control unit 151 only has to determine that the received electric power is proper if 10 W≤the received electric power≤12 W.

The main control unit 151 only has to determine that the received electric power is excessive if the received electric power is more than 12 W. That is, for example, the main control unit 151 only has to determine that the received electric power is excessive if 12 W<the received electric power.

When determining that the received electric power is insufficient, the main control unit 151 transmits electric power data indicating that the received electric power is insufficient to the power transmitter 300. When determining that the received electric power is proper, the main control unit 151 transmits electric power data indicating that the received electric power is proper to the power transmitter 300. When determining that the received electric power is excessive, the main control unit 151 transmits electric power data indicating that the received electric power is excessive to the power transmitter 300.

When the received electric power is excessive, the main control unit 151 transmits data indicating a degree of the excessive received electric power (an excessive degree) (excessive degree data) to the power transmitter 300 together with the electric power data. The excessive degree data indicates a degree that the received electric power exceeds the upper limit value. For example, when the upper limit value is 6 W, if the received electric power is 9 W, the excessive degree data is 50%.

FIG. 10 is a diagram illustrating data structures of the electric power data and the excessive degree data.

The electric power data and the excessive degree data generated by the main control unit 151 are stored in the memory 154 in association with an ID (Identification) of the power receiver 100.

The electric power data indicates whether the received electric power of the power receiver 100 is excessive, proper, or insufficient. The electric power data may be indicated by, for example, a 2-bit data value. For example, a data value indicating the excessive received electric power may be set to ' 10', a data value indicating the proper received electric power may be set to ' 01', and a data value indicating the insufficient received electric power may be set to ' 00'.

The excessive degree data is data indicating an excessive degree as a numerical value when the received electric power is excessive. The excessive degree data is data generated when the received electric power is excessive. Therefore, the excessive degree data is not generated when the received electric power is proper or insufficient. When the received electric power is proper or insufficient, the excessive degree data does not have a data value.

In FIG. 10, as an example, data is illustrated in which the ID of the power receiver 100 is 001, the electric power data indicates excessive received electric power, and the excessive degree data indicates the data of 50%. The electric power data and the excessive degree data may be represented by one data without being distinguished. For example, the excessive degree may be indicated by a positive numerical value when the received electric power is excessive, the proper received electric power may be indicated by ' 0' (zero), and the insufficient degree may be indicated by a negative numerical value when the received electric power is insufficient.

When receiving the electric power data explained above, the power transmitter 300 transmits an adjustment command for increasing a duty ratio, an adjustment command for setting a degree of adjustment of the duty ratio to zero, or an adjustment command for reducing the duty ratio to the power receiver 100.

When the power receiver 100 receives any one of the adjustment commands from the power transmitter 300, the driving control unit 153 adjusts, based on the adjustment command input from the main control unit 151, a duty ratio of a PWM driving pattern for PWM-driving the switch 130.

More specifically, for example, when the adjustment command for increasing the duty ratio is input from the main control unit 151, the driving control unit 153 increases the duty ratio of the PWM driving pattern for PWM-driving the switch 130. A degree of increasing the duty ratio according to the adjustment command only has to be set in advance in the power receiver 100. For example, the degree of increasing the duty ratio according to the adjustment command may be retained by the driving control unit 153 as a fixed value or may be stored in the memory 154.

When the adjustment command for setting the degree of adjustment of the duty ratio to zero is input from the main control unit 151, the driving control unit 153 maintains the duty ratio of the PWM driving pattern. That is, for example, in this case, the duty ratio is not changed.

When the adjustment command for reducing the duty ratio is input from the main control unit 151, the driving control unit 153 reduces the duty ratio of the PWM driving pattern for PWM-driving the switch 130.

A degree of reducing the duty ratio according to the adjustment command only has to be set in advance in the power receiver 100. For example, the degree of reducing the duty ratio according to the adjustment command may be retained by the driving control unit 153 as a fixed value or may be stored in the memory 154.

The power transmitter 300 may store, in the memory 360, data indicating degrees of reducing the duty ratio according to adjustment commands of the power receivers 100 and transmit the data to the power receivers 100. In this case, when updating firmware used in performing control processing using an adjustment command, the power transmitter 300 may acquire data indicating a degree of a power receiver of a new model.

The degree of reducing the duty ratio according to the adjustment command may be equal to the degree of increasing the duty ratio according to the adjustment command.

The degree of reducing the duty ratio according to the adjustment command may be set to a larger value for the power receiver 100 having a larger rated output.

The adjustment command for increasing the duty ratio, the adjustment command for setting the degree of adjustment of the duty ratio to zero, and the adjustment command for reducing the duty ratio may be realized by, for example, 2-bit data.

As an example, a 2-bit data value of the adjustment command for increasing the duty ratio may be set to '10', a 2-bit data value of the adjustment command for setting the degree of adjustment of the duty ratio to zero may be set to '01', and a 2-bit data value of the adjustment command for reducing the duty ratio may be set to '00'.

When such adjustment commands are used, data illustrated in FIG. 11 only has to be stored in the memory 154.

FIG. 11 is a diagram illustrating data structures of the adjustment commands stored in the memory 154.

As an example, the 2-bit data value of the adjustment command for increasing the duty ratio is '10', the 2-bit data value of the adjustment command for setting the degree of adjustment of the duty ratio to zero is '01', and the 2-bit data value of the adjustment command for reducing the duty ratio is '00'.

If such data of the adjustment commands are stored in the memory 154, when receiving an adjustment command from the power transmitter 300, the driving control unit 153 of the power receiver 100 may refer to the data of the adjustment command stored in the memory 154 and determine content of the adjustment command received from the power transmitter 300. The driving control unit 153 drives the switch 130 according to the adjustment command received from the power transmitter 300. In this case, according to the adjustment command, the duty ratio of the PWM driving pattern for driving the switch 130 is increased or reduced or retained at a value of the duty ratio as it is without being adjusted.

Figure 12:
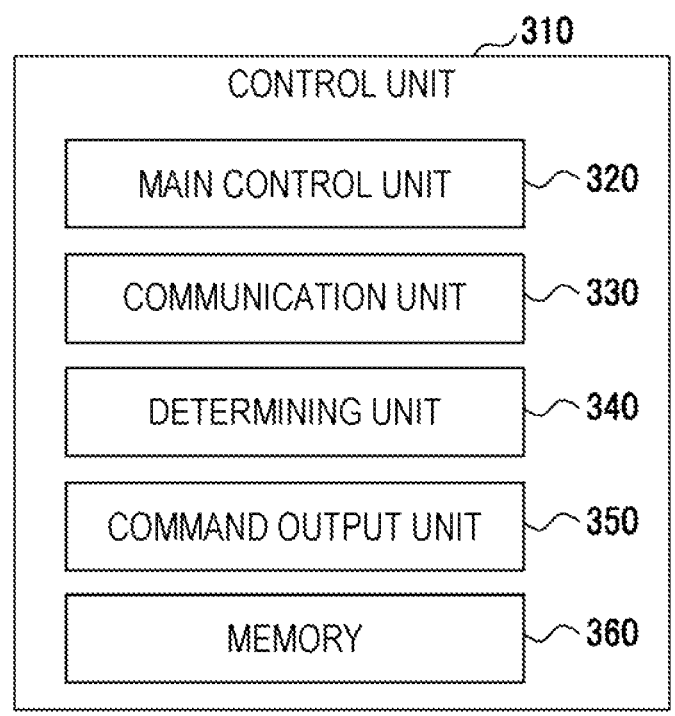
FIG. 12 is a diagram illustrating the configuration of a control unit of the power transmitter.

FIG. 12 is a diagram illustrating the configuration of the control unit 310. The control unit 310 is included in the power transmitter 300 illustrated in FIGS. 4 and 5.

As an example, a form is explained in which the power transmitter 300 (see FIG. 5) communicates with two or more power receivers 100 and controls received electric power.

The control unit 310 includes a main control unit 320, a communication unit 330, a determining unit 340, a command output unit 350, and a memory 360. The command output unit 350 is also called as a command generator.

The main control unit 320 controls control processing by the control unit 310.

The communication unit 330 performs wireless communication with the power receiver 100. For example, when the power transmitter 300 performs short-range wireless communication by Bluetooth (trademark) with the power receiver 100, the communication unit 330 is a modem for Bluetooth. The communication unit 330 is an example of a power transmission-side communication unit.

The communication unit 330 receives electric power data from the power receiver 100. The electric power data received from the power receiver 100 indicates whether received electric power of the power receiver 100 is excessive, proper, or insufficient.

The determining unit 340 determines based on the electric power data received from the power receiver 100 whether the power receiver 100 excessive in the received electric power, the power receiver 100 insufficient in the received electric power, and the power receiver 100 having received electric power in a proper range are present. The determining unit 340 determines based on the electric power data received from the power receiver 100 whether both of the power receiver 100 excessive in the received electric power and the power receiver 100 insufficient in the received electric power are present. The determining unit 340 is an example of a first determining unit and a second determining unit.

When the determining unit 340 determines that both of the power receiver 100 excessive in the received electric power and the power receiver 100 insufficient in the received electric power are present, the command output unit 350 transmits the adjustment command for reducing the duty ratio to the power receiver 100 excessive in the received electric power via the communication unit 330. In this case, when a plurality of power receivers 100 excessive in the received electric power are present, the command output unit 350 transmits the adjustment command for reducing the duty ratio to the plurality of power receivers 100 excessive in the received electric power.

When the determining unit 340 determines that one or a plurality of power receivers 100 excessive in the received electric power are present and received electric powers of the remaining power receivers 100 are proper, the command output unit 350 transmits the adjustment command for reducing the duty ratio to the one or the plurality of power receivers 100 excessive in the received electric power via the communication unit 330. In this case, the command output unit 350 transmits the adjustment command for not adjusting the duty ratio to the power receivers 100 proper in the received electric power via the communication unit 330.

When the determining unit 340 determines that one or a plurality of power receivers 100 insufficient in the received electric power are present and received electric powers of the remaining power receivers 100 are proper, the command output unit 350 transmits the adjustment command for increasing the duty ratio to the one or the plurality of power receivers 100 insufficient in the received electric power via the communication unit 330. In this case, the command output unit 350 transmits the adjustment command for not adjusting the duty ratio to the power receivers 100 proper in the received electric power via the communication unit 330.

When the determining unit 340 determines that a plurality of power receivers 100 proper in the received electric power are present, the command output unit 350 transmits the adjustment command for not adjusting the duty ratio to all the power receivers 100 via the communication unit 330.

The command output unit 350 adds a power receiver ID to the adjustment command and transmits the adjustment command to the power receiver 100 specified by the power receiver ID.

The memory 360 stores the same data of an adjustment command as the data of the adjustment command stored in the memory 154 of the power receiver 100. This is because, by using the same data of the adjustment command, the duty ratio of the power receiver 100 may be adjusted from the power transmitter 300.

As an example, a 2-bit data value of an adjustment command for increasing a duty ratio is '10', a 2-bit data value of an adjustment command for setting a degree of adjustment of the duty ratio to zero is '01', and a 2-bit data value of an adjustment command for reducing the duty ratio is '00'.

Figure 13:
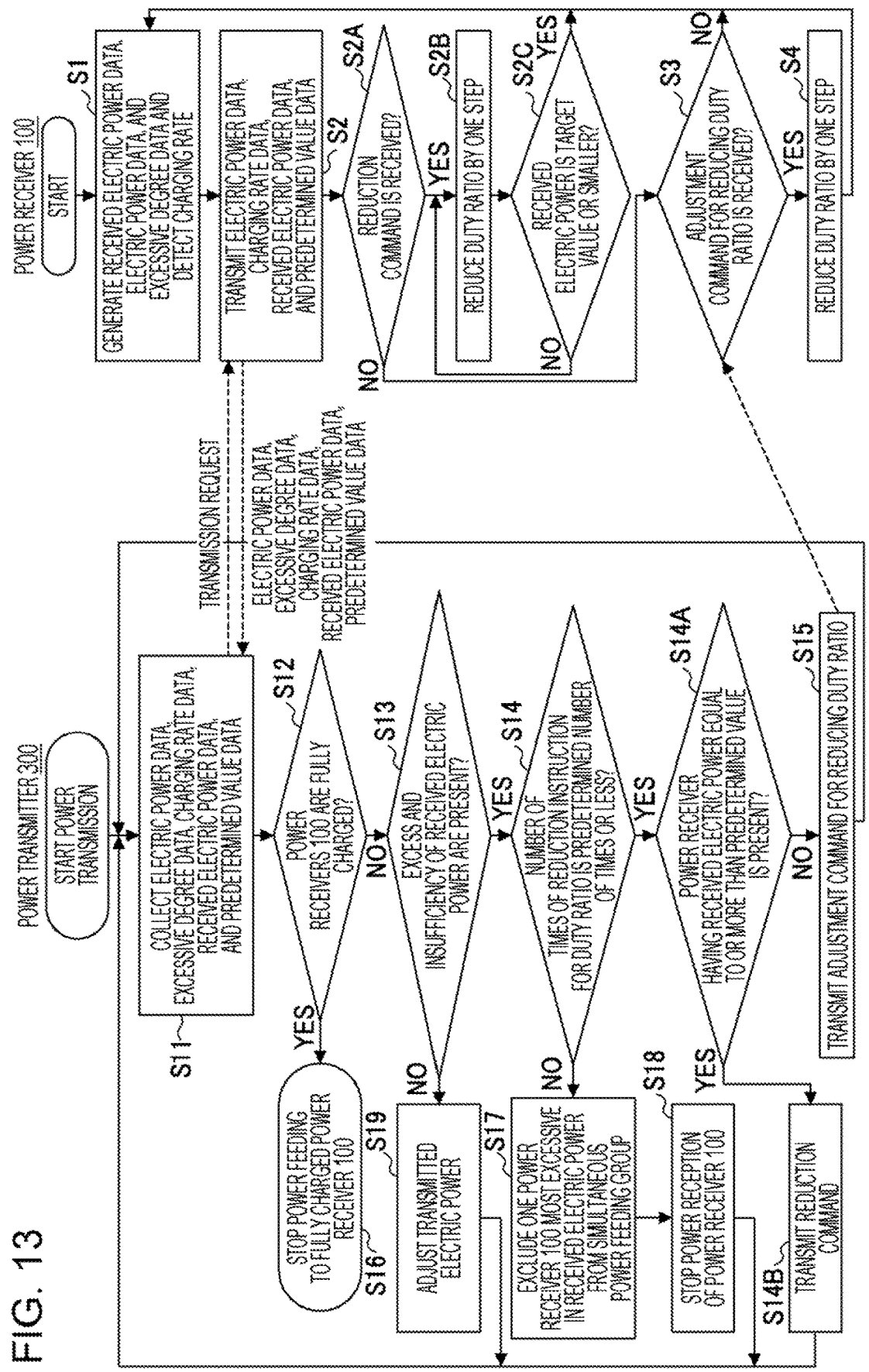
FIG. 13 is a flowchart illustrating processing executed by a power transmitter and a power receiver of the power transmission system in the first embodiment.

FIG. 13 is a flowchart illustrating processing executed by the power transmitter 300 and the power receiver 100 of the power transmission system 500 in the first embodiment. Different kinds of processing are performed in the power transmitter 300 and the power receiver 100. However, a flow of data between the power transmitter 300 and the power receiver 100 is also illustrated in order to illustrate an overall flow.

When the plurality of power receivers 100 simultaneously receive electric power transmitted by the power transmitter 300, optimization of transmitted electric power of the power transmitter 300 and received electric powers of the plurality of power receivers 100 is performed. The optimization of the received electric power is performed by optimizing the duty ratio of the PWM driving pattern of the power receiver 100.

The plurality of power receivers 100 simultaneously receiving the electric power transmitted by the power transmitter 300 is referred to as simultaneous power feeding. The plurality of power receivers 100 that receive the electric power with the simultaneous power feeding are treated as a simultaneous power feeding group.

The power transmitter 300 starts power transmission (a power transmission start). Electric power is output from the primary-side resonance coil 12 of the power transmitter 300. Immediately after the power transmission start, electric power of a preset initial output only has to be output from the primary-side resonance coil 12.

When being switched to a power reception mode, the power receiver 100 starts processing (start).

The power receiver 100 receives electric power from the power transmitter 300 with the magnetic field resonance, generates received electric power data, electric power data, and excessive degree data, and detects a charging rate of the battery 220 (step S1).

The power transmitter 300 requests the power receiver 100 to transmit electric power data, excessive degree data, charging rate data, received electric power data, and predetermined value data and collects the electric power data, the excessive degree data, the charging rate data, the received electric power data, and the predetermined value data from the power receiver 100 (step S11).

The electric power data, the excessive degree data, the charging rate data, the received electric power data, and the predetermined value data are transmitted to the power transmitter 300 in association with the ID (see FIG. 10) of the power receiver 100.

The power receiver 100 transmits the electric power data generated in step S1, the charging rate data indicating a detected charging rate, the received electric power data, and the predetermined value data to the power transmitter 300 (step S2).

The power receiver 100 determines whether a reduction command is received from the power transmitter 300 (step S2A). The reduction command is a command for reducing received electric power of the power receiver 100 having received electric power equal to or larger than the predetermined value indicated by the predetermined value data among the power receivers 100 excessive in the received electric power to a target value.

When determining that the reduction command is not received (NO in step S2A), the power receiver 100 determines whether an adjustment command for reducing a duty ratio of a PWM driving pattern is received (step S3).

The power receiver 100 stays on standby for a predetermined time required after the power transmitter 300 ends the processing in step S11 until the power transmitter 300 ends processing in step S15 explained below. The power receiver 100 determines whether the adjustment command for reducing the duty ratio of the PWM driving pattern is received.

When the power receiver 100 does not receive the adjustment command for reducing the duty ratio of the PWM driving pattern from the power transmitter 300 even if the power receiver 100 stands by for the required time (NO in step S3), the power receiver 100 returns the flow to step S1.

The power transmitter 300 determines based on the charging rate data received from the power receiver 100 whether the power receivers 100 are fully charged (step S12). This because, when the power receiver 100 is fully charged, power transmission does not have to be performed.

Concerning the power receivers 100 determined as not being fully charged in step S12, the power transmitter 300 determines whether both of the power receiver 100 excessive in the received electric power and the power receiver 100 insufficient in the received electric power are present (step S13). When both of the power receiver 100 excessive in the received electric power and the power receiver 100 insufficient in the received electric power are present, the power transmitter 300 performs such determination in order to reduce the duty ratio of the PWM driving pattern of the power receiver 100 excessive in the received electric power.

When determining that both of the power receiver 100 excessive in the received electric power and the power receiver 100 insufficient in the received electric power are present (YES in step S13), the power transmitter 300 determines whether the number of times the power transmitter 300 instructs the power receiver 100 excessive in the received electric power to reduce the duty ratio is equal to or less than a predetermined number of times (step S14).

This is because, if the number of times a reduction in the duty ratio is instructed is large, power reception efficiency of the power receiver 100 is likely to be excessively low. Therefore, the limit is set for the number of times the duty ratio is reduced.

The predetermined number of times only has to be set to an optimum number of times by an experiment or the like. For example, the predetermined number of times may be set to a larger value for the power receiver 100 having a larger rated output. This is because the power receiver 100 having a larger rated output has a wider range in which the duty ratio may be reduced to adjust the received electric power.

For example, the main control unit 320 of the power transmitter 300 may count, concerning the power receivers 100, data indicating the predetermined number of times. The power receivers 100 may count the data indicating the predetermined number of times in advance and, when the processing in step S14 is performed, transmit the data to the power transmitter 300.

When determining that the number of times the reduction in the duty ratio is carried out is equal to or less than the predetermined number of times (YES in step S14), the power transmitter 300 determines whether the power receiver 100 having received electric power equal to or larger than a predetermined value is present (step S14A).

The processing in step S14A is processing for determining whether the power receiver 100 having received electric power equal to or larger than the predetermined value is present among one or a plurality of power receivers 100 for which the number of times the reduction in the duty ratio is instructed in step S14, is determined as equal to or less than the predetermined number of times.

The predetermined value is a value indicated by the predetermined value data received from the power receiver 100 in step S11. The predetermined value data is transmitted to the power transmitter 300 in association with IDs of the power receivers 100. Therefore, the power transmitter 300 compares received electric power and the predetermined value using the IDs.

The predetermined value in step S14A is a value slightly higher than the upper limit value of the received electric power of the power receiver 100. For example, the predetermined value is a value obtained by increasing the upper limit value of the received electric power of the power receiver 100 by 10%. A form is explained in which the predetermined value in step S14A is the value obtained by increasing the upper limit value of the received electric power of the power receiver 100 by 10%. However, the predetermined value in step S14A is not limited to the value obtained by increasing the upper limit value of the received electric power of the power receiver 100 by 10% and only has to be set to an optimum value by an experiment or the like.

For example, the predetermined value in step S14A may be a value obtained by increasing the upper limit value of the received electric power of the power receiver 100 by 5% or 15%.

When determining that the power receiver 100 having received electric power equal to or larger than the predetermined value is present (YES in step S14A), the power transmitter 300 transmits a command for reducing the received electric power to a target value (a reduction command) to the power receiver 100 (step S14B). In step S14B, when a plurality of power receivers 100 are present, the power transmitter 300 identifies the power receivers 100 with IDs and transmits the reduction command to the power receivers 100. Target value data indicating the target value is stored in the memory 154 of the power receiver 100.

When ending the processing in step S14B, the power transmitter 300 returns the flow to step S11. This is to collect electric power data, excessive degree data, charging rate data, received electric power data, and predetermined value data from the power receiver 100, the received electric power of which is reduced to the target value.

When determining that the power receiver 100 having received electric power equal to or larger than the predetermined value is absent (NO in step S14A), the power transmitter 300 transmits an adjustment command for reducing a duty ratio of a PWM driving pattern of the power receiver 100 excessive in the received electric power (step S15). This is to improve a balance of received electric powers of the entire plurality of power receivers 100 by reducing the duty ratio of the PWM driving pattern of the power receiver 100 excessive in the received electric power to reduce the received electric power.

In step S15, when a plurality of power receivers 100 excessive in the received electric power are present, the power transmitter 300 transmits the adjustment command for reducing the duty ratio to all of the plurality of power receivers 100 excessive in the received electric power.

When ending the processing in step S15, the power transmitter 300 returns the flow to step S11.

When the adjustment command for reducing the duty ratio of the PWM driving pattern is transmitted to the power receiver 100 excessive in the received electric power in step S15, the power receiver 100 receiving the adjustment command reduces the duty ratio of the PWM driving pattern by one step (step S4).

When determining that both of the power receiver 100 excessive in the received electric power and the power receiver 100 insufficient in the received electric power are not present (NO in step S13), the power transmitter 300 adjusts electric power transmitted from the primary-side resonance coil 12 (transmitted electric power) (step S16).

In step S16, when one or a plurality of power receivers 100 excessive in the received electric power are present and received electric powers of the remaining power receivers 100 are proper, the power transmitter 300 reduces the transmitted electric power by predetermined electric power.

In step S16, when one or a plurality of power receivers 100 insufficient in the received electric power are present and received electric powers of the remaining power receivers 100 are proper, the power transmitter 300 increases the transmitted electric power by predetermined electric power.

In step S16, when the determining unit 340 determines that a plurality of power receivers 100 proper in the received electric power are present, the power transmitter 300 maintains the transmitted electric power. That is, for example, the power transmitter 300 retains the transmitted electric power at that time without changing the transmitted electric power.

The power transmitter 300 retaining the transmitted electric power at that time without changing the transmitted electric power is equivalent to setting an adjustment degree of the transmitted electric power to zero.

Data indicating predetermined electric power at the time when the power transmitter 300 reduces the transmitted electric power and predetermined electric power at the time when the power transmitter 300 increases the transmitted electric power only have to be stored in the memory 360 in advance. The predetermined electric power in reducing the transmitted electric power and the predetermined electric power in increasing the transmitted electric power may be different.

When ending the processing in step S16, the power transmitter 300 returns the flow to step S11.

When determining in step S14 that the number of times the reduction in the duty ratio is carried out is not equal to or less than the predetermined number of times (NO in step S14), the power transmitter 300 excludes one power receiver 100 most excessive in the received electric power from the simultaneous power feeding group (step S17).

One power receiver 100 for which the number of times the reduction in the duty ratio is carried out is more than the predetermined number of times and that is most excessive in the received electric power is the power receiver 100, the received electric power of which does not fit in a proper range even if the duty ratio is reduced for the number of times more than the predetermined number of times by one. Therefore, the power receiver 100 is excluded from the simultaneous power feeding group.

One power receiver 100 most excessive in the received electric power only has to be determined based on the excessive degree data. When the power receiver 100 excessive in the received electric power is one power receiver 100 in step S17, the one power receiver 100 excessive in the received electric power only has to be excluded from the simultaneous power feeding group without using the excessive degree data.

The power transmitter 300 causes the power receiver 100 excluded from the simultaneous power feeding group in step S17 to stop power reception (step S18). The stop of the power reception only has to be performed by, for example, transmitting an adjustment command for setting a duty ratio to 0% to the power receiver 100.

When ending the processing in step S18, the power transmitter 300 returns the flow to step S11.

When determining in step S12 that any one of the power receivers 100 is fully charged (YES in step S12), the power transmitter 300 stops power feeding to the fully charged power receiver 100 (step S19).

In this case, the power transmitter 300 only has to transmit the adjustment command for setting the duty ratio to 0% to the power receiver 100 determined as being fully charged in step S12. The power receiver 100 not having reached full charge only has to be charged by continuously performing the processing illustrated in FIG. 13.

When determining that the target value reduction command is received in step S2A (YES in step S2A), the power receiver 100 reduces the duty ratio by one step (step S2B).

The power receiver 100 determines whether the received electric power is equal to or smaller than a target value (step S2C). The target value is a value indicated by the target value data stored in the memory 154 of the power receiver 100.

When determining that the received electric power is not equal to or smaller than the target value (NO in step S2C), the power receiver 100 returns the flow to step S2B. The processing in steps S2B and S2C is repeatedly executed until the received electric power becomes equal to or smaller than the target value.

When determining that the received electric power is equal to or smaller than the target value (YES in step S2C), the power receiver 100 returns the flow to step S1. This is to generate received electric power data, electric power data, and excessive degree data and detect a charging rate of the battery 220 in a state in which the received electric power is equal to or smaller than the target value.

Charging of the power receiver 100 may be performed by repeatedly performing the processing explained above. That is, for example, received electric powers of the plurality of power receivers 100 may be gradually brought close to a proper range by detecting excessive and insufficient received electric powers in the power receivers 100 and adjusting a duty ratio of a PWM driving pattern of the power receiver 100 according to a result of the detection.

Therefore, it is possible to provide the power transmission system 500 and the power transmitter 300 that may efficiently charge the power receiver.

The power receiver 100 usually detects a power reception state while the power receiver 100 is receiving electric power from the power transmitter 300 and periodically transmits electric power data, excessive degree data, charging rate data, received electric power data, and predetermined value data to the power transmitter 300 according to the request (step S11) from the power transmitter 300. When received electric power of one power receiver 100 among the plurality of power receivers 100 being charged decreases to zero or when communication is interrupted, the power transmitter 300 only has to determine that the power receiver 100 moves away from a chargeable region and stop the power transmission. Thereafter, the power transmitter 300 only has to perform charging by continuously performing the processing illustrated in FIG. 13 on the remaining power receivers 100.

When received electric powers of all the power receivers 100 are insufficient and an output of the power transmitter 300 is a maximum output, the power transmitter 300 only has to determine that insufficiency of transmitted electric power or an abnormal state in which power reception efficiency of the power receiver 100 is excessively deteriorated has occurred and stop the power transmission.

The power transmitter 300 reduces received electric power of the power receiver 100 having received electric power equal to or more than the predetermined value among the power receivers 100 excessive in the received electric power to the target value. This is the processing performed based on the reduction command transmitted from the power transmitter 300 to the power receiver 100 in step S14B and is the processing in which the power receiver 100 reduces the received electric power to the target value by repeating the processing in steps S2A to S2C without performing communication with the power transmitter 300.

For example, when the power transmitter 300 and the power receiver 100 perform wireless communication with Bluetooth Low Energy, a time required for performing communication once is approximately 0.25 second. For example, when such communication is performed twenty times, the required time is five seconds. If a time of a few seconds to five seconds is required to set a duty ratio of the power receiver 100, the power receiver 100 is unable to be quickly charged. When a user holds the power receiver 100 in a hand, the position or the posture of the power receiver 100 with respect to the power transmitter 300 is likely to change. Therefore, it is desirable to quickly charge the power receiver 100.

When the received electric power is excessive and is equal to or larger than the predetermined value, the received electric power is considerably large. It is desirable to quickly reduce the received electric power to suppress heat generation of the power receiver 100.

In such a case, if the received electric power is reduced to the target value without performing communication between the power receiver 100 and the power transmitter 300 rather than reducing the duty ratio of the power receiver 100 while performing communication between the power transmitter 300 and the power receiver 100, the received electric power of the power receiver 100 may be quickly reduced. In order to realize such a quick reduction in the received electric power, concerning the power receiver 100 excessive in the received electric power and having the received electric power equal to or larger than the predetermined value, the received electric power of the power receiver 100 is quickly reduced by repeating the processing in steps S2A to S2C.

Such operation is explained below with reference to FIG. 18.

A state of adjustment of received electric power of the power receiver 100 by the power transmission system 500 and the power transmitter 300 in the first embodiment is explained with reference to FIGS. 14 to 18.

FIGS. 14 to 17 are diagrams illustrating the state of the adjustment of the received electric power of the power receiver 100 by the power transmission system 500 and the power transmitter 300 in the first embodiment. In FIGS. 14 to 17, three power receivers 100A, 100B, and 100C are used for explanation.

The vertical axes in FIGS. 14 to 17 indicate electric powers obtained by subtracting rated outputs of the respective power receivers 100A, 100B, and 100C from received electric powers of the respective power receivers 100A, 100B, and 100C. The electric powers obtained by subtracting the rated outputs from the received electric powers are referred to as standardized received electric powers.

Upper limit values and lower limit values of the received electric powers of the respective power receivers 100A, 100B, and 100C are sometimes different from one another. Therefore, in FIGS. 14 to 17, levels of the upper limit values and the lower limit values of the received electric powers of the power receivers 100A, 100B, and 100C are aligned to enable comparison of levels of the standardized received electric powers.

Figure 14:
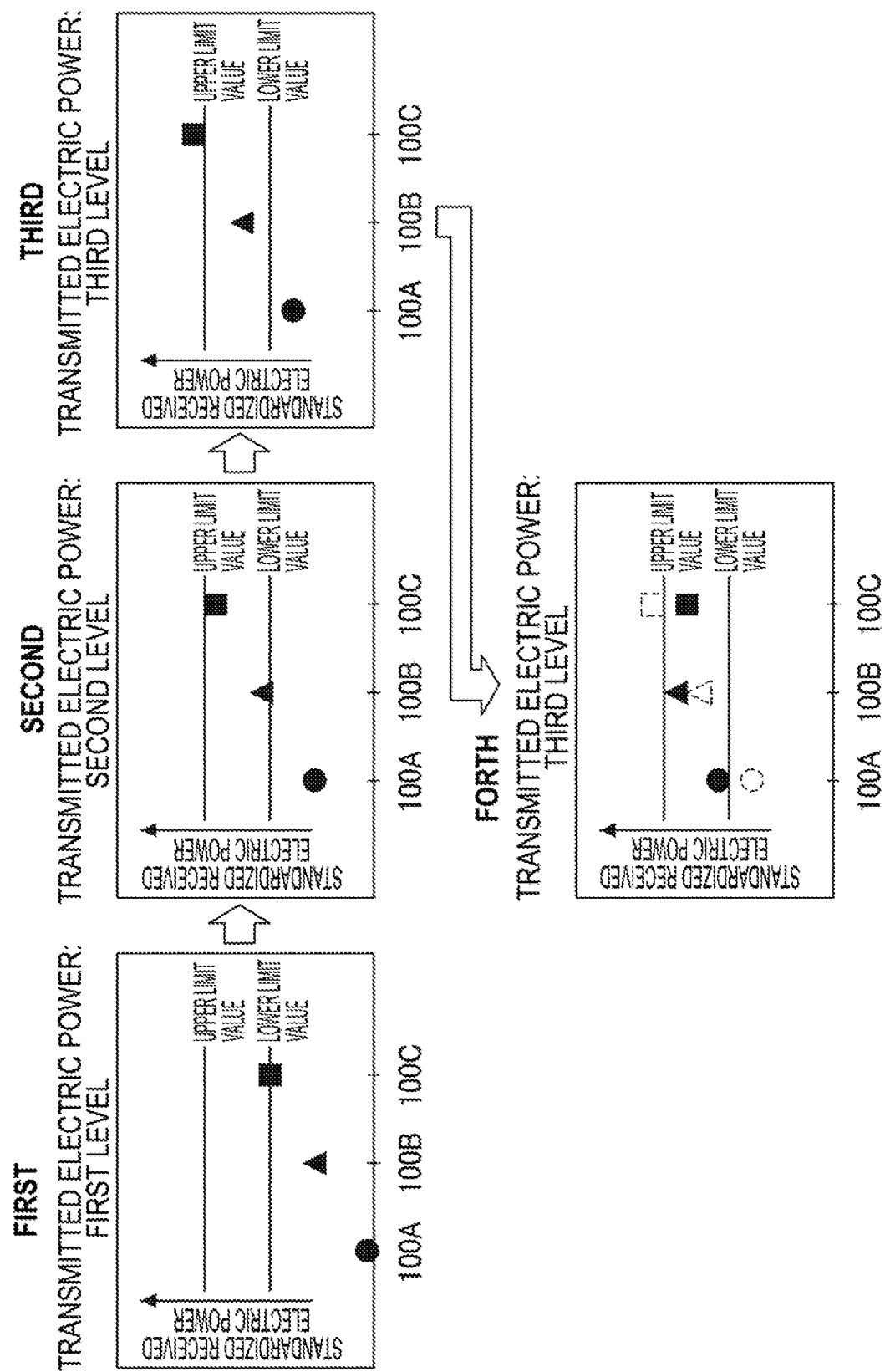
FIG. 14 is a diagram illustrating states of adjustment of received electric power of the power receiver by the power transmission system and the power transmitter in the first embodiment.

In FIRST of FIG. 14, the standardized received electric power of the power receiver 100A is the lowest, the standardized received electric power of the power receiver 100B is an intermediate value, and the standardized received electric power of the power receiver 100C is the highest.

Both of the standardized received electric powers of the power receivers 100A and 100B are lower than the lower limit value and the standardized received electric power of the power receiver 100C is the lower limit value. That is, for example, the power receivers 100A and 100B are insufficient in received electric powers and the power receiver 100C is proper in received electric power.

The state illustrated in FIRST of FIG. 14 is a state immediately after the power transmission by the power transmitter 300 is started. The transmitted electric power is a predetermined low value. Therefore, the transmitted electric power is a first level.

In such a state, it is determined NO in step S13 of the flow illustrated in FIG. 13. In step S16, the transmitted electric power of the power transmitter 300 is increased from the first level by predetermined electric power. A state in which the transmitted electric power is increased from the state illustrated in FIRST of FIG. 14 is illustrated in SECOND of FIG. 14. In SECOND of FIG. 14, the transmitted electric power is a second level.

In SECOND of FIG. 14, the standardized received electric powers of the power receivers 100A, 100B, and 100C further increase than in FIRST of FIG. 14.

In SECOND of FIG. 14, the standardized received electric power of the power receiver 100A is lower than the lower limit value, the standardized received electric power of the power receiver 100B is substantially equal to the lower limit value, and the standardized received electric power of the power receiver 100C is between the lower limit value and the upper limit value. That is, for example, the power receiver 100A is insufficient in received electric power and the power receivers 100B and 100C are proper in received electric powers.

In such a state, it is determined NO in step S13 of the flow illustrated in FIG. 13. In step S16, the transmitted electric power of the power transmitter 300 is further increased from the second level by the predetermined electric power. A state in which the transmitted electric power is increased from the state illustrated in SECOND of FIG. 14 is illustrated in THIRD of FIG. 14. In THIRD of FIG. 14, the transmitted electric power is a third level.

In THIRD of FIG. 14, the standardized received electric powers of the power receivers 100A, 100B, and 100C further increase than in SECOND of FIG. 14.

In THIRD of FIG. 14, the standardized received electric power of the power receiver 100A is lower than the lower limit value, the standardized received electric power of the power receiver 100B is between the lower limit value and the upper limit value, and the standardized received electric power of the power receiver 100C is higher than the upper limit value. That is, for example, the power receiver 100A is insufficient in received electric power, the power receiver 100B is proper in received electric power, and the power receiver 100C is excessive in received electric power.

In such a state, it is determined YES in step S13 of the flow illustrated in FIG. 13. It is determined YES in step S14. In step S15, a duty ratio of the power receiver 100C is reduced. A state in which the duty ratio of the power receiver 100C is reduced from the state illustrated in THIRD of FIG. 14 is illustrated in FORTH of FIG. 14. In FORTH of FIG. 14, the transmitted electric power is maintained in the third level.

In FORTH of FIG. 14, compared with THIRD of FIG. 14, the standardized received electric powers of the power receivers 100A and 100B increase and the standardized received electric power of the power receiver 100C decreases.

In FORTH of FIG. 14, the standardized received electric powers of the power receivers 100A, 100B, and 100C are between the lower limit value and the upper limit value. That is, for example, the power receivers 100A, 100B, and 100C are proper in received electric powers.

Therefore, by adjusting the transmitted electric power of the power transmitter 300 and the duty ratio of the power receiver 100C, all of the power receivers 100A, 100B, and 100C were able to be brought into a simultaneously chargeable state.

Figure 15:
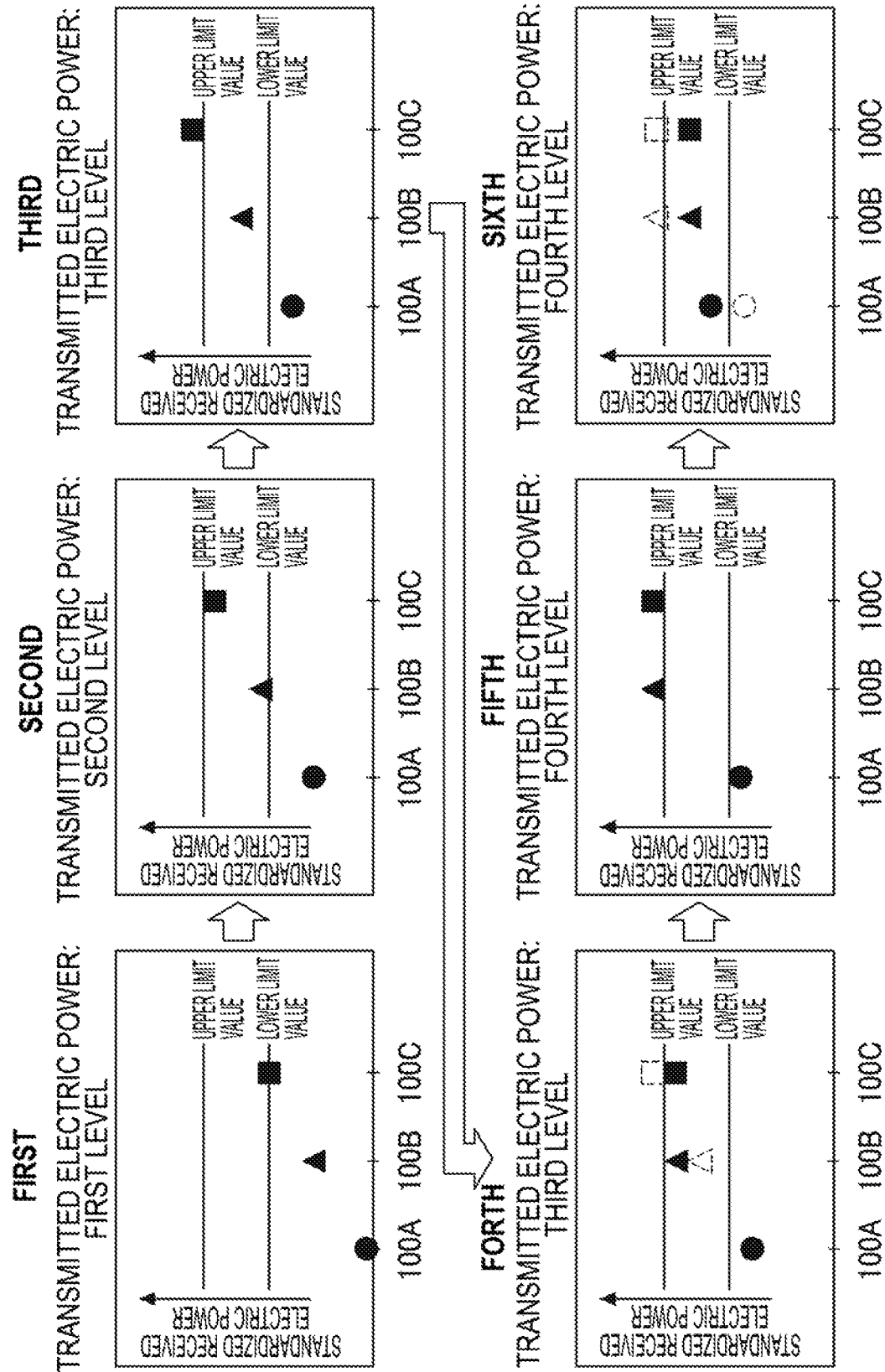
FIG. 15 is a diagram illustrating states of adjustment of received electric power of the power receiver by the power transmission system and the power transmitter in the first embodiment.

The power receivers 100A, 100B, and 100C used for explanation in FIRST to SIXTH of FIG. 15 are different from the power receivers 100A, 100B, and 100C used for the explanation in FIRST to FORTH of FIG. 14 in a degree of a reduction in the duty ratio by an adjustment command.

States illustrated in FIRST to THIRD of FIG. 15 are the same as the states illustrated in FIRST to THIRD of FIG. 14. The transmitted electric power is increased stepwise from FIRST of FIG. 15 to reach the state illustrated in THIRD of FIG. 15.

In the state in THIRD of FIG. 15, it is determined YES in step S13 of the flow illustrated in FIG. 13. It is determined YES in step S14. In step S15, the duty ratio of the power receiver 100C is reduced. A state in which the duty ratio of the power receiver 100C is reduced from the state illustrated in THIRD of FIG. 15 is illustrated in FORTH of FIG. 15. In FORTH of FIG. 15, the transmitted electric power is maintained in the third level.

In FORTH of FIG. 15, compared with THIRD of FIG. 15, the standardized received electric powers of the power receivers 100A and 100B increase and the standardized received electric power of the power receiver 100C decreases.

In FORTH of FIG. 15, the standardized received electric power of the power receiver 100A is lower than the lower limit value and the standardized received electric powers of the power receivers 100B and 100C are between the lower limit value and the upper limit values. That is, for example, the power receiver 100A is insufficient in received electric power and the power receivers 100B and 100C are proper in received electric powers.

In a state in FORTH of FIG. 15, it is determined NO in step S13 of the flow illustrated in FIG. 13. In step S16, the transmitted electric power is further increased from the third level by the predetermined electric power. A state in which the transmitted electric power is increased from the state illustrated in FORTH of FIG. 15 is illustrated in FIFTH of FIG. 15. In FIFTH of FIG. 15, the transmitted electric power is a fourth level.

In FIFTH of FIG. 15, the standardized received electric powers of the power receivers 100A, 100B, and 100C further increase than in FORTH of FIG. 15.

In FIFTH of FIG. 15, the standardized received electric power of the power receiver 100A is lower than the lower limit value and the standardized received electric powers of the power receivers 100B and 100C are higher than the upper limit value. That is, for example, the power receiver 100A is insufficient in received electric power and the power receivers 100B and 100C are excessive in received electric powers.

In such a state, it is determined YES in step S13 of the flow illustrated in FIG. 13. It is determined YES in step S14. In step S15, duty ratios of the power receivers 100B and 100C are reduced. A state in which the duty ratios of the power receivers 100B and 100C are reduced from the state illustrated in FIFTH of FIG. 15 is illustrated in SIXTH of FIG. 15. In SIXTH of FIG. 15, the transmitted electric power is maintained in the fourth level.

In SIXTH of FIG. 15, the reduction in the received electric powers of the power receivers 100B and 100C is received by the power receiver 100A. Consequently, compared with FIFTH of FIG. 15, the standardized received electric power of the power receiver 100A increases and the standardized received electric powers of the power receivers 100B and 100C decrease.

As a result, the standardized received electric powers of the power receivers 100A, 100B, and 100C are between the lower limit value and the upper limit value. That is, for example, the power receivers 100A, 100B, and 100C are proper in received electric powers.

Therefore, by adjusting the transmitted electric power of the power transmitter 300 and the duty ratios of the power receivers 100B and 100C, all of the power receivers 100A, 100B, and 100C were able to be brought into a simultaneously chargeable state.

Figure 16:
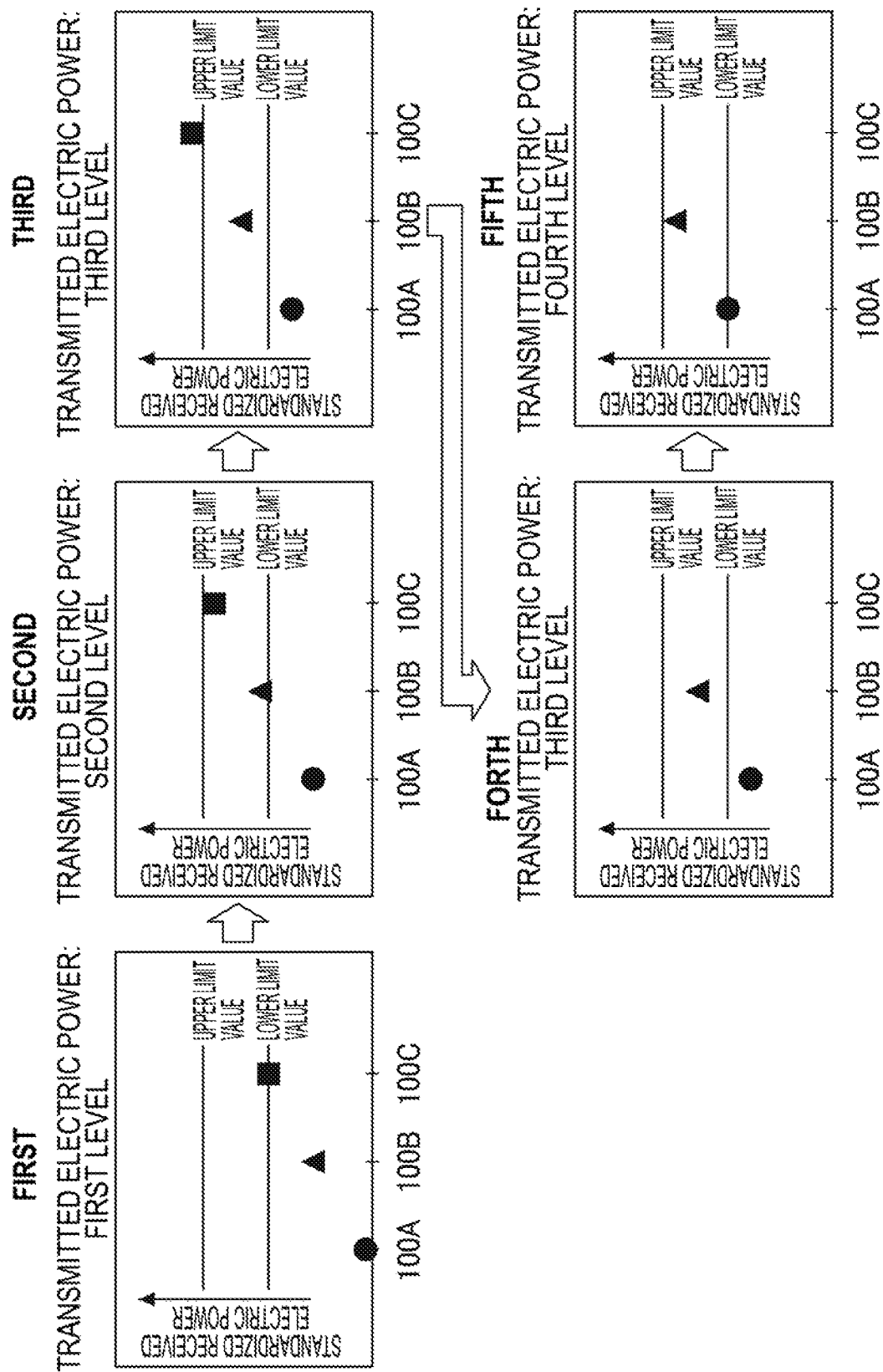
FIG. 16 is a diagram illustrating states of adjustment of received electric power of the power receiver by the power transmission system and the power transmitter in the first embodiment.

The power receivers 100A, 100B, and 100C used for explanation in FIRST to FIFTH of FIG. 16 are the same as the power receivers 100A, 100B, and 100C used for the explanation in FIRST to FORTH of FIG. 14. However, at a point in time when the adjustment of the received electric power reaches a state in FIRST of FIG. 16, the number of times of a reduction instruction for the duty ratio of the power receiver 100C reaches the number of times more than the predetermined number of times in step S14 in FIG. 13 by one.

States illustrated in FIRST to THIRD of FIG. 16 are the same as the states illustrated in FIRST to THIRD of FIG. 14. The transmitted electric power is increased stepwise from FIRST of FIG. 16 and reaches the state illustrated in THIRD of FIG. 16.

In the state in THIRD of FIG. 16, it is determined YES in step S13 of the flow illustrated in FIG. 13. Since the number of times of the reduction instruction for the duty ratio is more than the predetermined number of times by one, it is determined NO in step S14. In step S17, the power receiver 100C excessive in the received electric power is excluded from the simultaneous power feeding group. A state in which the power receiver 100C is excluded from the state illustrated in THIRD of FIG. 16 is illustrated in FORTH of FIG. 16. In FORTH of FIG. 16, the transmitted electric power is maintained in the third level.

In FORTH of FIG. 16, compared with THIRD of FIG. 16, the power receiver 100C is absent. The standardized received electric powers of the power receivers 100A and 100B do not change.

In FORTH of FIG. 16, the standardized received electric power of the power receiver 100A is lower than the lower limit value and the standardized received electric power of the power receiver 100B is between the lower limit value and the upper limit value. That is, for example, the power receiver 100A is insufficient in received electric power and the power receiver 100B is proper in received electric power.

In the state in FORTH of FIG. 16, it is determined NO in step S13 of the flow illustrated in FIG. 13. In step S16, the transmitted electric power is further increased from the third level by the predetermined electric power. A state in which the transmitted electric power is increased from the state illustrated in FORTH of FIG. 16 is illustrated in FIFTH of FIG. 16. In FIFTH of FIG. 16, the transmitted electric power is the fourth level.

In FIFTH of FIG. 16, the standardized received electric powers of the power receivers 100A and 100B further increase than in FORTH of FIG. 16. The standardized received electric powers of the power receivers 100A and 100B are between the lower limit value and the upper limit value. That is, for example, the power receivers 100A and 100B are proper in received electric powers.

Therefore, by adjusting the transmitted electric power of the power transmitter 300 and the duty ratio of the power receiver 100C, the power receivers 100A and 100B were able to be brought into a simultaneously chargeable state.

The power receiver 100C only has to be allocated to a power feeding group different from a power feeding group of the power receivers 100A and 100B and charged.

Figure 17:
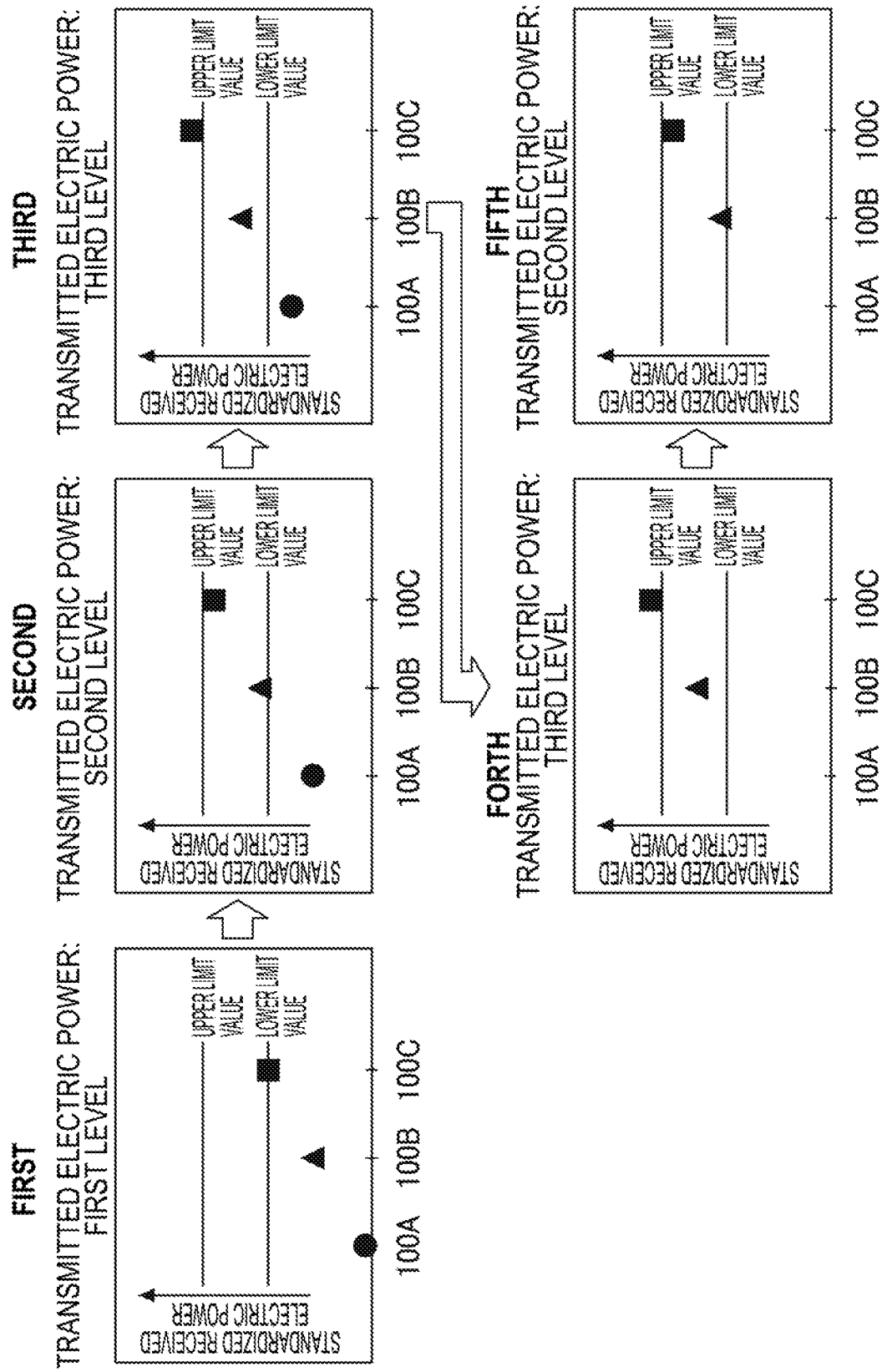
FIG. 17 is a diagram illustrating states of adjustment of received electric power of the power receiver by the power transmission system and the power transmitter in the first embodiment.

The power receivers 100A, 100B, and 100C used for explanation in FIRST to FIFTH of FIG. 17 are the same as the power receivers 100A, 100B, and 100C used for the explanation in FIRST to FIFTH of FIG. 16. However, operation illustrated in FIRST to FIFTH of FIG. 17 is different in that, in step S17 in FIG. 13, the power transmitter 300 performs control processing to exclude one power receiver 100 most insufficient in received electric power from the simultaneous power feeding group.

States illustrated in FIRST to THIRD of FIG. 17 are the same as the states illustrated in FIRST to THIRD of FIG. 14. The transmitted electric power is increased stepwise from FIRST of FIG. 17 and reaches the state illustrated in THIRD of FIG. 17.

In the state in THIRD of FIG. 17, it is determined YES in step S13 of the flow illustrated in FIG. 13. The number of times of the reduction instruction for the duty ratio is more than the predetermined number of times by one. Therefore, it is determined NO in step S14. In step S17, the power receiver 100A insufficient in the received electric power is excluded from the simultaneous power feeding group. A state in which the power receiver 100A is excluded from the state illustrated in THIRD of FIG. 17 is illustrated in FORTH of FIG. 17. In FORTH of FIG. 17, the transmitted electric power is maintained in the third level.

In FORTH of FIG. 17, compared with THIRD of FIG. 17, the power receiver 100A is absent and the standardized received electric powers of the power receivers 100B and 100C do not change.

In FORTH of FIG. 17, the standardized received electric power of the power receiver 100B is between the lower limit value and the upper limit value and the standardized received electric power of the power receiver 100C is higher than the upper limit value. That is, for example, the power receiver 100B is proper in received electric power and the power receiver 100C is excessive in received electric power.

In the state in FORTH of FIG. 17, it is determined NO in step S13 of the flow illustrated in FIG. 13. In step S16, the transmitted electric power is reduced from the third level by the predetermined electric power. A state in which the transmitted electric power is reduced from the state illustrated in FORTH of FIG. 17 is illustrated in FIFTH of FIG. 17. In FIFTH of FIG. 17, the transmitted electric power is the second level.

In FIFTH of FIG. 17, the standardized received electric powers of the power receivers 100B and 100C are further reduced than in FORTH of FIG. 17 and the standardized received electric powers of the power receivers 100B and 100C are between the lower limit value and the upper limit value. That is, for example, the power receivers 100A and 100B are proper in received electric powers.

Therefore, by adjusting the transmitted electric power of the power transmitter 300 and the duty ratio of the power receiver 100A, the power receivers 100B and 100C were able to be brought into a simultaneously chargeable state.

The power receivers 100A only has to be allocated to a power feeding group different from a power feeding group of the power receivers 100B and 100C and charged.

Figure 18:
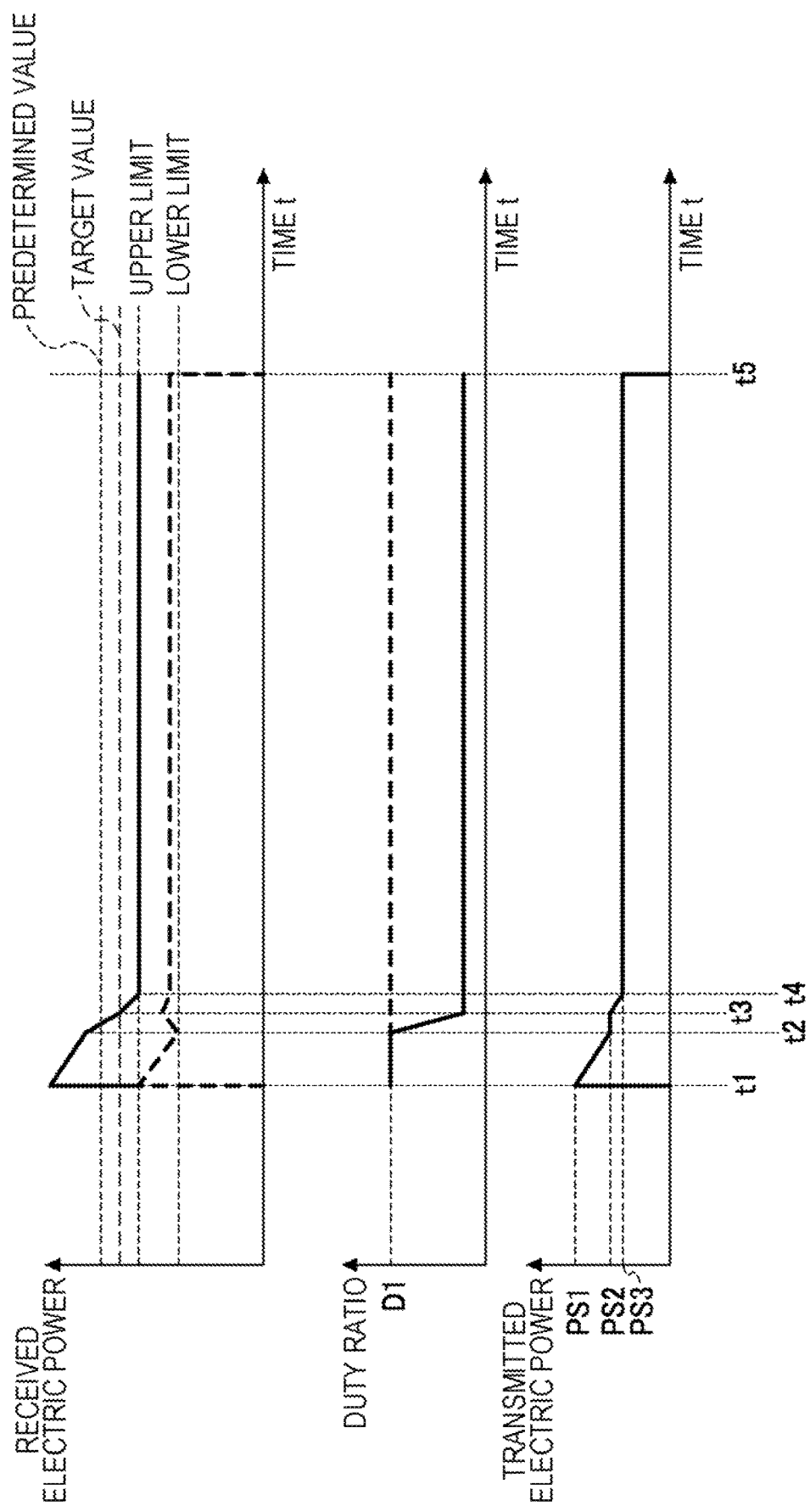
FIG. 18 is a diagram illustrating operation in reducing received electric power of the power receiver to a target value using a reduction command.

FIG. 18 is a diagram illustrating operation in reducing the received electric power of the power receiver 100A to the target value using the reduction command. It is assumed that, when electric power is sent from the power transmitter 300 to the two power receivers 100A and 100B (see FIG. 5), the power receiver 100A is located closer to the power transmitter 300 than the power receiver 100B.

In FIG. 18, the horizontal axis is a time axis and three vertical axes indicate the received electric powers and the duty ratios of the power receivers 100A and 100B and the transmitted electric power of the power transmitter 300. Concerning the received electric powers, levels of a predetermined value, a target value, an upper limit, and a lower limit are illustrated. The received electric power and the duty ratio of the power receiver 100A are indicated by solid lines. The received electric power and the duty ratio of the power receiver 100B are indicated by broken lines.

At time t1, the power transmitter 300 starts power transmission. At this time, the duty ratios of the power receivers 100A and 100B are set to an initial value D1. At time t1, the received electric power of the power receiver 100A exceeds the predetermined value and the received electric power of the power receiver 100B is smaller than the upper limit. In this state, it is assumed that the received electric power of the power receiver 100A is excessive and the received electric power of the power receiver 100B is proper.

At time t1 to time t2, the power transmitter 300 controls the transmitted electric power according to the processing in step S16. The transmitted electric power decreases little by little from PS1 to reach PS2. In this state, the duty ratios of the power receivers 100A and 100B are a fixed value because the duty ratios are not changed. At time t1 to time t2, if the power transmitter 300 and the power receivers 100A and 100B perform communication three times with Bluetooth Low Energy, a required time is approximately 0.75 second.

At time t2, in a state in which the received electric power of the power receiver 100A is excessive and the received electric power of the power receiver 100B is insufficient, concerning the power receiver 100A, the flow proceeds to S14: YES, S14A; YES, and S14B. The reduction command is transmitted from the power transmitter 300 to the power receiver 100A.

When the reduction command is transmitted from the power transmitter 300 to the power receiver 100A, the power receiver 100A receiving the reduction command determines YES in step S2A and executes the processing of steps S2B and S2C until the received electric power becomes equal to or lower than the target value to reduce the duty ratio. On the other hand, concerning the power receiver 100B, control is not particularly performed. The duty ratio is retained at D1.

When the duty ratio of the power receiver 100A is reduced from time t2, since the transmitted electric power is fixed, the received electric power of the power receiver 100B increases.

At time t3, in a state in which the received electric power of the power receiver 100A is equal to or smaller than the target value, the received electric power of the power receiver 100A is excessive, and the received electric power of the power receiver 100B is proper, the power transmitter 300 controls the transmitted electric power according to the processing in step S16. Specifically, for example, the transmitted electric power is reduced little by little from time t3 to time t4 to reach PS3. In this state, the duty ratios of the power receivers 100A and 100B are fixed values because the duty ratios are not changed. At time t3 to time t4, if the power transmitter 300 and the power receiver 100A perform communication once with Bluetooth Low Energy, a required time is approximately 0.25 second.

At time t4, when both the received electric powers of the power receivers 100A and 100B are proper, the power transmitter 300 maintains the transmitted electric power in the processing in step S16. The power receivers 100A and 100B are charged in a state in which the duty ratios are retained fixed until time t5.

As explained above, at time t2 to time t3, the received electric power is reduced to the target value without performing communication between the power receiver 100A and the power transmitter 300. Therefore, the received electric power of the power receiver 100A may be quickly reduced.

In order to realize such a quick reduction in the received electric power, concerning the power receiver 100A excessive in the received electric power and having the received electric power equal to or larger than the predetermined value, the received electric power of the power receiver 100A is quickly reduced by repeating the processing in steps S2A to S2C.

Between time t2 and time t3, since the power receiver 100A is in an excessive received electric power state, not all of the received electric power may be charged to the battery 220A. A part of the received electric power is consumed as, for example, heat generation of the secondary-side resonance coil 110A. Therefore, the power receiver 100A is in a low power reception efficiency state.

However, at time t4 to time t5, the power receiver 100A is in a state in which the received electric power is the upper limit value and is proper. Therefore, the power receiver 100A is in a high power reception efficiency state.

In this way, concerning the power receiver 100A excessive in the received electric power and having the received electric power equal to or larger than the predetermined value, by repeating the processing in steps S2A to S2C, the received electric power of the power receiver 100A may be quickly reduced. The power reception efficiency may be quickly induced to a highly efficient state.

In the above explanation, the power receiver 100A is located closer to the power transmitter 300 than the power receiver 100B. The received electric power of the power receiver 100A is excessive and the received electric power of the power receiver 100B is proper. However, in the opposite case, the duty ratio of the power receiver 100B is quickly reduced to reduce the power reception efficiency.

As explained above, with the power transmission system 500 and the power transmitter 300 in the first embodiment, the power transmission output of the power transmitter 300 and the duty ratio of the PWM driving pattern of the power receiver 100 are adjusted according to whether the received electric powers of the plurality of power receivers 100 are excessive, insufficient, or proper. Whether the received electric power of the power receiver 100 is excessive, insufficient, or proper is a power reception state of the power receiver 100.

Such adjustment may be realized by repeatedly executing the loop processing illustrated in FIG. 13 according to power reception states of the plurality of power receivers 100.

That is, for example, for the adjustment of the power transmission output of the power transmitter 300 and the duty ratio of the PWM driving pattern of the power receiver 100, it is possible to realize a state in which the simultaneous power feeding may be easily and simply performed based on the power reception states of the plurality of power receivers 100 without calculating a coefficient of coupling of the secondary-side resonance coil 110 of the power receiver 100 and the primary-side resonance coil 12 of the power transmitter 300.

Concerning the power receiver 100 excessive in the received electric power and having the received electric power equal to or larger than the predetermined value, the received electric power of the power receiver 100 is reduced by repeating the processing in steps S2A to S2C without performing communication between the power receiver 100 and the power transmitter 300.

Therefore, the received electric power of the power receiver 100 excessive in the received electric power and having the received electric power equal to or larger than the predetermined value may be quickly reduced. The power receiver 100 may be quickly charged.

Therefore, it is possible to provide the power transmission system 500 and the power transmitter 300 that may efficiently charge the power receiver.

In the above explanation, the form is explained in which the power receiver 100 generates the electric power data indicating whether the received electric power is excessive, proper, or insufficient and transmits electric power to the power transmitter 300 and the determining unit 340 determines based on the electric power data whether the received electric power is excessive, insufficient, or proper.

However, the electric power data may be data indicating the rated output of the power receiver 100 and the upper limit value and the lower limit value of the received electric power. The power receiver 100 may transmit such electric power data to the power transmitter 300. The control unit 310 of the power transmitter 300 may determine based on the electric power data indicating the rated output of the power receiver 100 and the upper limit value and the lower limit value of the received electric power whether the received electric power is excessive, proper, or insufficient.

In the above explanation, the form is explained in which the switch 130 is directly connected to the output side of the rectifier circuit 120. However, the power receiver in this embodiment may be a power receiver 101 having a circuit configuration illustrated in FIG. 19.

Figure 19:
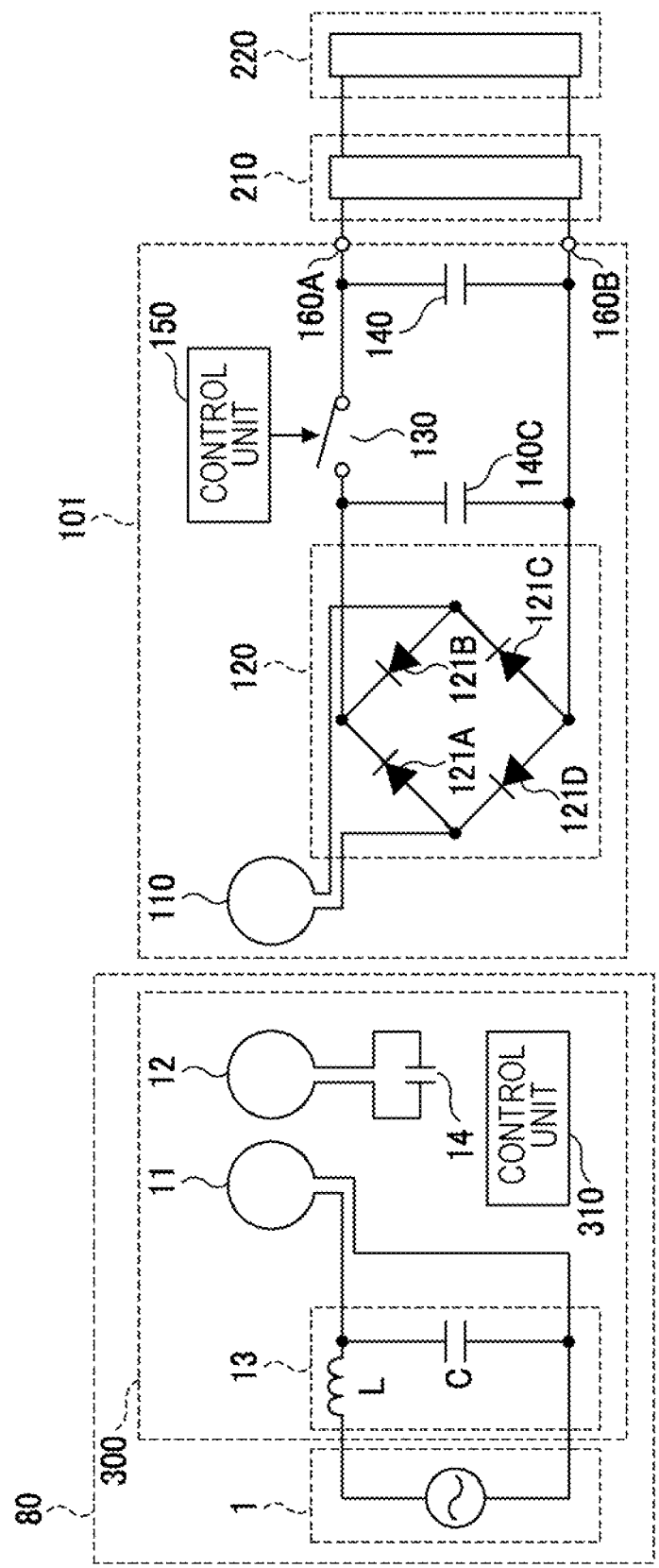
FIG. 19 is a diagram illustrating a power receiver in a first modification of the first embodiment.

FIG. 19 is a diagram illustrating the power receiver 101 in a modification of the embodiment. The power receiver 101 has a configuration in which a smoothing capacitor 140C is added between the rectifier circuit 120 and the switch 130 in the power receiver 100 illustrated in FIG. 4. Consequently, electric power full-wave rectified by the rectifier circuit 120 may be input to the switch 130 after being smoothed. Therefore, for example, when the influence of a ripple or the like included in the full-wave rectified electric power occurs, this is effective for suppressing the influence of the ripple.

In the above explanation, the form is explained in which the electronic devices 200A and 200B are, as an example, the terminal machines such as tablet computers or smartphones. However, the electronic devices 200A and 200B may be, for example, electronic devices incorporating rechargeable batteries such as notebook personal computers (PCs), cellular phone terminals, portable game machines, digital cameras, or video cameras.

In the above explanation, the form is explained in which the duty ratio of the PWM driving pattern for PWM-driving the switch 130 of the power receiver 100 is explained. However, the form may be modified as explained below.

Figure 20:
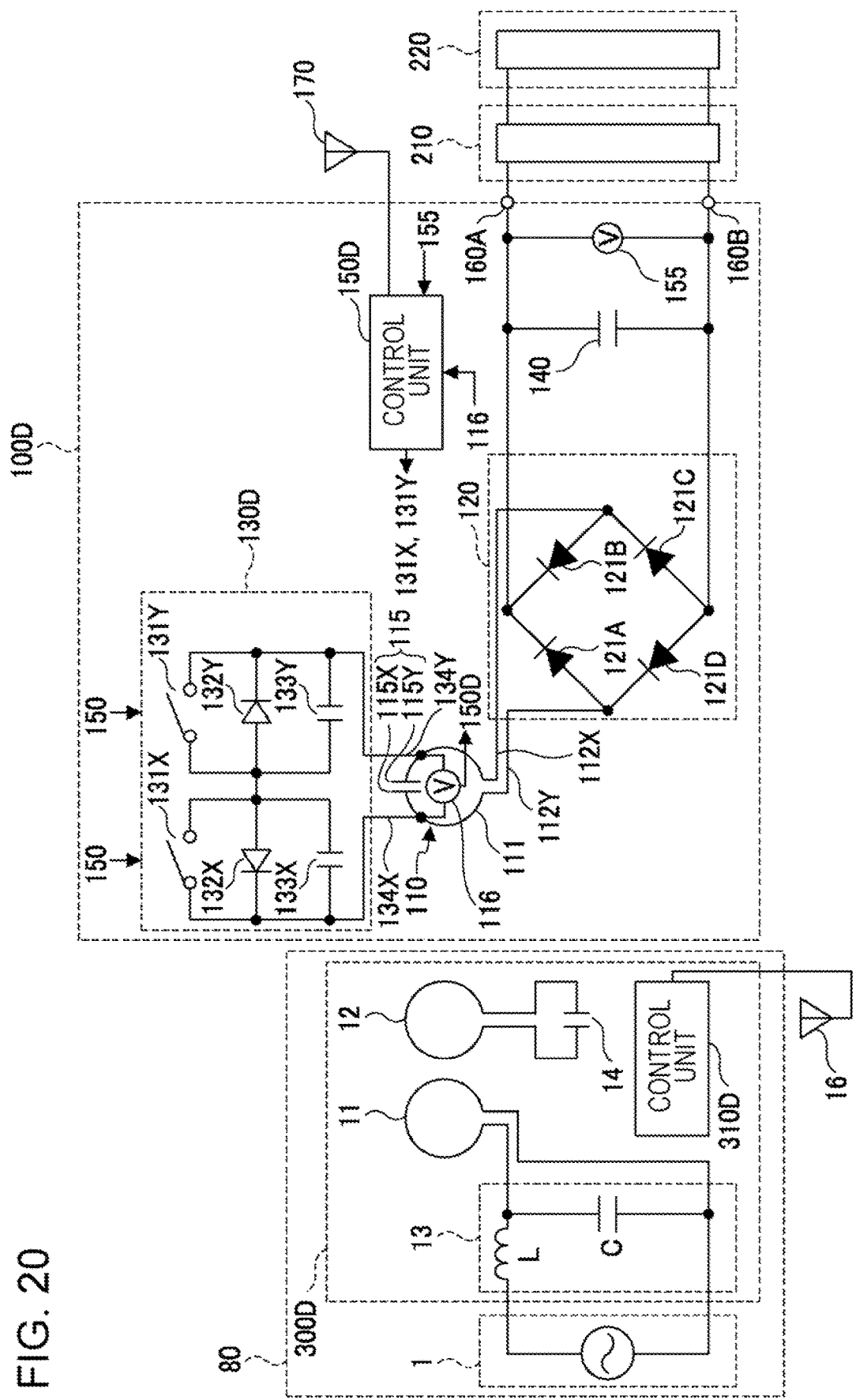
FIG. 20 is a diagram illustrating a power receiver and a power transmitting apparatus in a second modification of the first embodiment.

FIG. 20 is a diagram illustrating a power receiver 100D and the power transmitting apparatus 80 in a second modification of the first embodiment.

The power transmitting apparatus 80 includes the AC power supply 1 and a power transmitter 300D.

The power transmitter 300D includes the primary-side coil 11, the primary-side resonance coil 12, the matching circuit 13, the capacitor 14, a control unit 310D, and the antenna 16. In the power transmitter 300D, the control unit 310 of the power transmitter 300 illustrated in FIG. 4 is replaced with the control unit 310D.

The control unit 310D is different from the control unit 310 in that the control unit 310D performs adjustment of an adjusting unit 130D of the power receiver 100D.

The power receiver 100D includes the secondary-side resonance coil 110, a capacitor 115, a voltmeter 116, the rectifier circuit 120, an adjusting unit 130D, the smoothing capacitor 140, a control unit 150D, a voltmeter 155D, output terminals 160A and 160B, and an antenna 170. The DC-DC converter 210 is connected to the output terminals 160A and 160B. The battery 220 is connected to an output side of the DC-DC converter 210.

The secondary-side resonance coil 110 is designed to have the same resonant frequency as the resonant frequency of the primary-side resonance coil 12 and have a high Q value. The secondary-side resonance coil 110 includes a resonance coil unit 111 and terminals 112X and 112Y. The resonance coil unit 111 is substantially the secondary-side resonance coil 110 itself. However, the resonance coil unit 111 provided with the terminals 112X and 112Y at both ends thereof is treated as the secondary-side resonance coil 110.

The capacitor 115 for adjusting the resonant frequency is inserted in series into the resonance coil unit 111. The adjusting unit 130D is connected in parallel to the capacitor 115. The terminals 112X and 112Y are provided at both the ends of the resonance coil unit 111. The terminals 112X and 112Y are connected to the rectifier circuit 120. The terminals 112X and 112Y are respectively examples of a first terminal and a second terminal.

The secondary-side resonance coil 110 is connected to the rectifier circuit 120 not via a secondary-side coil. In a state in which resonance may be generated by the adjusting unit 130D, the secondary-side resonance coil 110 outputs, to the rectifier circuit 120, AC power transmitted from the primary-side resonance coil 12 of the power transmitter 300D by the magnetic field resonance.

The capacitor 115 is inserted in series into the resonance coil unit 111 in order to adjust the resonant frequency of the secondary-side resonance coil 110. The capacitor 115 includes terminals 115X and 115Y. The adjusting unit 130D is connected in parallel to the capacitor 115.

The voltmeter 116 is connected in parallel to the capacitor 115. The voltmeter 116 measures an inter-terminal voltage of the capacitor 115. The voltmeter 116 detects a voltage of AC power received by the secondary-side resonance coil 110 and transmits a signal indicating the voltage to the control unit 150D. An AC voltage measured by the voltmeter 116 is used to synchronize driving signals for driving switches 131X and 131Y.

The rectifier circuit 120 includes four diodes 121A to 121D. The diodes 121A to 121D are connected in a bridge shape and full-wave rectifies and outputs electric power input from the secondary-side resonance coil 110.

The adjusting unit 130D is connected in parallel to the capacitor 115 in the resonance coil unit 111 of the secondary-side resonance coil 110.

The adjusting unit 130D includes switches 131X and 131Y, diodes 132X and 132Y, capacitors 133X and 133Y, and terminals 134X and 134Y.

The switches 131X and 131Y are connected in series to each other between the terminals 134X and 134Y. The switches 131X and 131Y are respectively examples of a first switch and a second switch. The terminals 134X and 134Y are respectively connected to the terminals 115X and 115Y of the capacitor 115. Therefore, a series circuit of the switches 131X and 131Y is connected in parallel to the capacitor 115.

The diode 132X and the capacitor 133X are connected in parallel to the switch 131X. The diode 132Y and the capacitor 133Y are connected in parallel to the switch 131Y. Anodes of the diodes 132X and 132Y are connected and cathodes of the diodes 132X and 132Y are connected to the capacitor 115. That is, for example, the diodes 132X and 132Y are connected to direct rectifying directions thereof to opposite directions.

The diodes 132X and 132Y are respectively examples of a first rectifying element and a second rectifying element. The adjusting unit 130D may not include the capacitors 133X and 133Y.

As the switch 131X, the diode 132X, and the capacitor 133X, for example, a field effect transistor (FET) may be used. A body diode between a drain and a source of a P-channel type or an N-channel type FET only has to be connected to have a rectifying direction like the rectifying direction of the diode 132X. When the N-channel type FET is used, the source is an anode of the diode 132X and the drain is a cathode of the diode 132X.

A driving signal output from the control unit 150D is input to a gate, whereby the switch 131X is realized by switching a connection state between the drain and the source. The capacitor 133X may be realized by parasitic capacitance between the drain and the source.

Similarly, as the switch 131Y, the diode 132Y, and the capacitor 133Y, for example, an FET may be used. A body diode between a drain and a source of a P-channel type or N-channel type FET only has to be connected to have a rectifying direction like the rectifying direction of the diode 132Y. When the N-channel FET is used, the source is an anode of the diode 132Y and the drain is a cathode of the diode 132Y.

A driving signal output from the control unit 150D is input to a gate, whereby the switch 131Y is realized by switching a connection state between the drain and the source. The capacitor 133Y may be realized by parasitic capacitance between the drain and the source.

The switch 131X, the diode 132X, and the capacitor 133X are not limited to be realized by the FET and may be realized by connecting a switch, a diode, and a capacitor in parallel. The same applies to the switch 131Y, the diode 132Y, and the capacitor 133Y.

The switches 131X and 131Y are switched to ON and OFF in opposite phases each other. When the switch 131X is off and the switch 131Y is on, a resonant current flows in the adjusting unit 130D in a direction from the terminal 134X toward the terminal 134Y through the capacitor 133X and the switch 131Y and the resonant current may flow to the capacitor 115 from the terminal 115X to the terminal 115Y. That is, for example, in FIG. 20, the resonant current may flow to the secondary-side resonance coil 110 in the clockwise direction.

When the switch 131X is on and the switch 131Y is off, a current path from the terminal 134X toward the terminal 134Y through the switch 131X and the diode 132Y is generated in the adjusting unit 130D. Since the current path is parallel to the capacitor 115, an electric current does not flow to the capacitor 115.

Therefore, when the switch 131X is switched to ON and the switch 131Y is switched to OFF from a state in which the switch 131X is off and the switch 131Y is on and a resonant current is flowing to the secondary-side resonance coil 110 in the clockwise direction, the resonant current is not generated. This is because a capacitor is not included in the current path.

When the switch 131X is on and the switch 131Y is off, a resonant current flows in the adjusting unit 130D in a direction from the terminal 134Y toward the terminal 134X through the capacitor 133Y and the switch 131X and the resonant current may flow to the capacitor 115 from the terminal 115Y to the terminal 115X. That is, for example, in FIG. 20, the resonant current may flow to the secondary-side resonance coil 110 in the counterclockwise direction.

When the switch 131X is off and the switch 131Y is on, a current path from the terminal 134Y toward the terminal 134X through the switch 131Y and the diode 132X is generated in the adjusting unit 130D. Since the current path is parallel to the capacitor 115, an electric current does not flow to the capacitor 115.

Therefore, when the switch 131X is switched to OFF and the switch 131Y is switched to ON from a state in which the switch 131X is on and the switch 131Y is off and a resonant current is flowing to the secondary-side resonance coil 110 in the counterclockwise direction, the resonant current is not generated. This is because a capacitor is not included in the current path.

The adjusting unit 130D switches the switches 131X and 131Y as explained above to thereby switch a state in which a resonant current may be generated and a state in which a resonant current is not generated. The switching of the switches 131X and 131Y is performed by a driving signal output from the control unit 150D.

A frequency of the driving signal is set to an AC frequency received by the secondary-side resonance coil 110.

The switches 131X and 131Y perform interruption of an alternating current at the high frequency explained above. For example, the adjusting unit 130D formed by combining two FETs may perform interruption of an alternating current at high speed.

The driving signal and the operation of the adjusting unit 130D are explained below with reference to FIG. 22.

The smoothing capacitor 140 is connected to the output side of the rectifier circuit 120. The smoothing capacitor 140 smooths electric power full-wave rectified by the rectifier circuit 120 and outputs the electric power as DC power. The output terminals 160A and 160B are connected to the output side of the smoothing capacitor 140. The electric power full-wave rectified by the rectifier circuit 120 may be treated as substantial AC power because a negative component of the AC power is inverted into a positive component. However, by using the smoothing capacitor 140, stable DC power may be obtained even when a ripple is included in the full-wave rectified electric power.

A line connecting a terminal on the upper side of the smoothing capacitor 140 and the output terminal 160A is a line on a high-voltage side. A line connecting a terminal on the lower side of the smoothing capacitor 140 and the output terminal 160B is a line on a low-voltage side.

The control unit 150D retains data indicating a rated output of the battery 220 in an internal memory. In response to a request from the control unit 310D of the power transmitter 300D, the control unit 150D measures electric power received by the power receiver 100D from the power transmitter 300D (received electric power) and transmits data indicating the received electric power to the power transmitter 300D via the antenna 170.

When receiving data indicating a phase difference from the power transmitter 300D, the control unit 150D generates a driving signal using the received phase difference and drives the switches 131X and 131Y. The control unit 150D only has to calculate the received electric power based on a voltage V measured by the voltmeter 155D and an internal resistance value R of the battery 220. Received electric power P is calculated by $P=V^2/R$.

Figure 21:
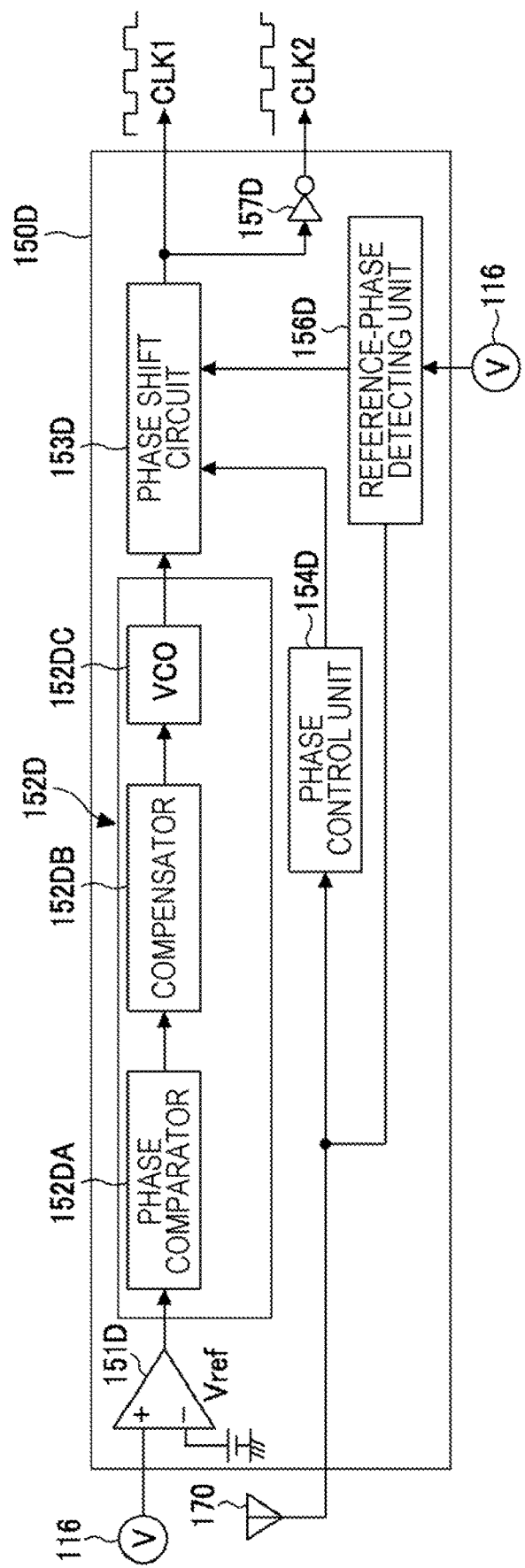
FIG. 21 is a diagram illustrating an internal configuration of a control unit of the power receiver in the second modification of the first embodiment.

The control unit 150D is explained with reference to FIG. 21. FIG. 21 is a diagram illustrating an internal configuration of the control unit 150D.

The control unit 150D includes a comparator 151D, a phase locked loop (PLL) circuit 152D, a phase shift circuit 153D, a phase control unit 154D, an inverter 157D, and a reference-phase detecting unit 156D.

The comparator 151D compares an AC voltage detected by the voltmeter 116 with a predetermined reference voltage Vref and outputs a dock to the PLL 152D.

The PLL 152D includes a phase comparator 152DA, a compensator 152DB, and a voltage controlled oscillator (VCO) 152DC. The phase comparator 152DA, the compensator 152DB, and the VCO 152DC are connected in series and connected such that an output of the VCO 152DC is fed back to the phase comparator 152DA. With such a configuration, the PLL 152D outputs a dock synchronized with a signal input from the comparator 151D.

The phase shift circuit 153D is connected to an output side of the PLL 152D. The phase shift circuit 153D phase-differential shifts, based on a signal indicating a phase difference input from the phase control unit 154D, a phase of a clock output from the PLL 152D with respect to a reference phase and outputs the clock. As the phase shift circuit 153D, for example, a phase shifter only has to be used.

When a signal indicating a phase difference transmitted from the power transmitter 300D is input, the phase control unit 154D converts the signal indicating the phase difference into a signal for the phase shift circuit 153D and outputs the signal.

A dock phase-shifted by the phase difference with respect to the reference phase based on the signal input from the phase control unit 154D is divided into two clocks. One clock is directly output as a dock CLK1. The other clock is inverted by the inverter 157D and output as a dock CLK2. The docks CLK1 and CLK2 are control signals output by the control unit 150D.

The reference-phase detecting unit 156D controls a shift amount for the shift of the phase of the dock by the phase shift circuit 153D to thereby adjust the phase of the dock output by the phase shift circuit 153D with respect to the dock output by the PLL 152D and detect a phase in which maximum power reception efficiency is obtained.

The reference-phase detecting unit 156D retains the detected phase in the internal memory as a reference phase. An operating point where power reception efficiency is maximized is a point where a voltage value detected by the voltmeter 116 is maximized. Therefore, the reference-phase detecting unit 156D detects an operating point where the voltage value detected by the voltmeter is maximized while adjusting the shift amount of the shift given by the phase shift circuit 153D and retains a phase at the operating point in the internal memory as a reference phase.

The clock output by the PLL 152D corresponds to a phase of an AC voltage by the magnetic field resonance detected by the voltmeter 116. Therefore, the adjusting the shift amount of the phase that the phase shift circuit 153D gives to the clock output by the PLL 152D is controlling, in the phase shift circuit 153D, a shift amount of the phase of the clock with respect to a voltage waveform detected by the voltmeter 116.

The reference phase is a phase of the clocks CLK1 and CLK2 with respect to the AC voltage in which maximum power reception efficiency is obtained. In order to treat the reference phase as 0 degree and adjust received electric power, a phase difference of the phase of the clocks CLK1 and CLK2 with respect to the reference phase (0 degree) is adjusted by the phase shift circuit 153D.

Since the phase of the AC voltage is not detected, a shift amount of a phase that the phase shift circuit 153D gives to the clocks CLK1 and CLK2 when maximum power reception efficiency is obtained is treated as the reference phase.

A form is explained in which the phase of the dock output from the PLL 152D is adjusted by the phase shift circuit 153D with respect to the AC voltage detected by the voltmeter 116. However, the phase of the clock with respect to an AC current may be adjusted by the phase shift circuit 153D using an ammeter instead of the voltmeter 116.

The voltmeter 155D is connected between the output terminals 160A and 160B. The voltmeter 155D is used to calculate received electric power of the power receiver 100D. If the received electric power is calculated based on the voltage V measured by the voltmeter 155D and the internal resistance value R of the battery 220, a loss is small compared with when an electric current is measured and received electric power is measured. Therefore, this is a desirable measurement method. However, the received electric power of the power receiver 100D may be calculated by measuring an electric current and a voltage. When the electric current is measured, the electric current only has to be measured using a Hall element, a magnetic resistance element, a detection coil, a resistor, or the like.

The DC-DC converter 210 is connected to the output terminals 160A and 160B. The DC-DC converter 210 converts a voltage of DC power output from the power receiver 100D into a rated voltage of the battery 220 and outputs the voltage. When an output voltage of the rectifier circuit 120 is higher than the rated voltage of the battery 220, the DC-DC converter 210 steps down the output voltage of the rectifier circuit 120 to the rated voltage of the battery 220. When the output voltage of the rectifier circuit 120 is lower than the rated voltage of the battery 220, the DC-DC converter 210 steps up the output voltage of the rectifier circuit 120 to the rated voltage of the battery 220.

The battery 220 only has to be a repeatedly rechargeable secondary battery. For example, a lithium ion battery may be used. For example, when the power receiver 100D is incorporated in an electronic device such as a tablet computer or a smartphone, the battery 220 is a main battery of such an electronic device.

The primary-side coil 11, the primary-side resonance coil 12, and the secondary-side resonance coil 110 are manufactured by, for example, winding a copper wire. However, the material of the primary-side coil 11, the primary-side resonance coil 12, and the secondary-side resonance coil 110 may be metal other than copper (for example, gold or aluminum). Different materials may be used for the primary-side coil 11, the primary-side resonance coil 12, and the secondary-side resonance coil 110.

In such a configuration, the primary-side coil 11 and the primary-side resonance coil 12 are a power transmission side of electric power and the secondary-side resonance coil 110 is a power reception side of the electric power.

The electric power is transmitted from the power transmission side to the power reception side using the magnetic field resonance generated between the primary-side resonance coil 12 and the secondary-side resonance coil 110 by the magnetic field resonance scheme. Therefore, it is possible to transmit the electric power in a longer distance than an electromagnetic induction scheme for transmitting the electric power from the power transmission side to the power reception side with electromagnetic induction.

The magnetic field resonance scheme has advantages that the magnetic field resonance scheme has a higher degree of freedom than the electromagnetic induction scheme concerning the distance or positional deviation between resonance coils and is position-free.

A current path at the time when the switches 131X and 131Y are driven by a driving signal is explained with reference to FIGS. 22 to 23B.

Figure 22:
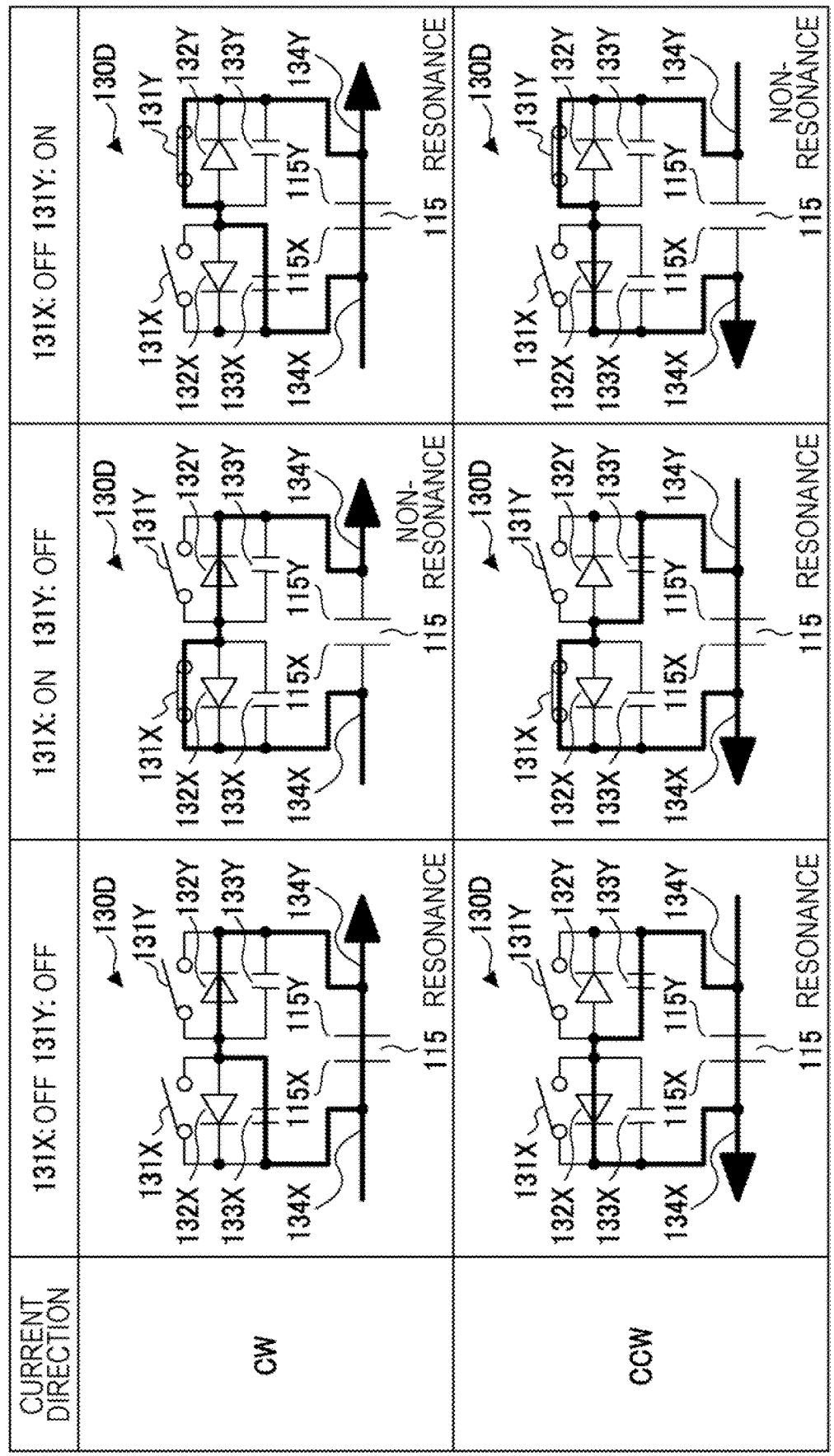
FIG. 22 is a diagram illustrating current paths in a capacitor and an adjusting unit of the power receiver in the second modification of the first embodiment.

FIG. 22 is a diagram illustrating current paths in the capacitor 115 and the adjusting unit 130D. In FIG. 22, as in FIG. 20, a direction of an electric current flowing from the terminal 134X to the terminal 134Y through the inside of the capacitor 115 or the adjusting unit 130D is referred to as clockwise (CW). A direction of an electric current flowing from the terminal 134Y to the terminal 134X through the inside of the capacitor 115 or the adjusting unit 130D is referred to as counterclockwise (CCW).

When both of the switches 131X and 131Y are off and the electric current is clockwise (CW), a resonant current flows in a direction from the terminal 134X toward the terminal 134Y through the capacitor 133X and the diode 132Y and the resonant current flows to the capacitor 115 from the terminal 115X to the terminal 115Y. Therefore, a resonant current flows to the secondary-side resonance coil 110 in the clockwise direction.

When both of the switches 131X and 131Y are off and the electric current is counterclockwise (CCW), a resonant current flows in a direction from the terminal 134Y toward the terminal 134X through the capacitor 133Y and the diode 132X and the resonant current flows to the capacitor 115 from the terminal 115Y to the terminal 115X. Therefore, the resonant current flows to the secondary-side resonance coil 110 in the counterclockwise direction.

When the switch 131X is on and the switch 131Y is off and the electric current is clockwise (CW), a current path from the terminal 134X toward the terminal 134Y through the switch 131X and the diode 132Y is generated in the adjusting unit 130D. Since the current path is parallel to the capacitor 115, the electric current does not flow to the capacitor 115. Therefore, a resonant current does not flow to the secondary-side resonance coil 110. In this case, even if the switch 131Y is switched to ON, the resonant current does not flow to the secondary-side resonance coil 110.

When the switch 131X is on and the switch 131Y is off and the electric current is counterclockwise (CCW), a resonant current flows in the adjusting unit 130D in a direction from the terminal 134Y toward the terminal 134X through the capacitor 133Y and the switch 131X and the resonant current flows to the capacitor 115 from the terminal 115Y to the terminal 115X. Therefore, the resonant current flows to the secondary-side resonance coil 110 in the counterclockwise direction. The electric current flows to the diode 132X parallel to the switch 131X as well.

When the switch 131X is off and the switch 131Y is on and the electric current is clockwise (CW), a resonant current flows in the adjusting unit 130D in a direction from the terminal 134X toward the terminal 134Y through the capacitor 133X and the switch 131Y and the resonant current flows to the capacitor 115 from the terminal 115X to the terminal 115Y. Therefore, the resonant current flows to the secondary-side resonance coil 110 in the clockwise direction. The electric current flows to the diode 132Y parallel to the switch 131Y as well.

When the switch 131X is off and the switch 131Y is on and the electric current is counterclockwise (CCW), a current path from the terminal 134Y toward the terminal 134X through the switch 131Y and the diode 132X is generated in the adjusting unit 130D. Since the current path is parallel to the capacitor 115, the electric current does not flow to the capacitor 115. Therefore, a resonant current does not flow to the secondary-side resonance coil 110. In this case, even if the switch 131X is switched to ON, the resonant current does not flow to the secondary-side resonance coil 110.

Capacitance contributing to a resonant frequency of a resonant current depends on the capacitor 115 and the capacitors 133X and 133Y. Therefore, capacitances of the capacitors 133X and 133Y are desirably equal.

Figure 23A:
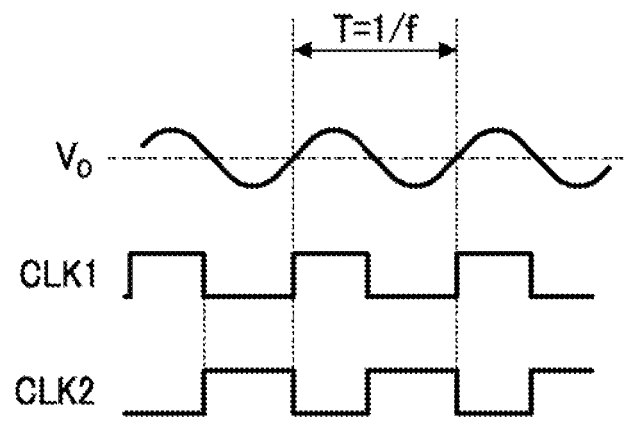
FIGS. 23A and 23B are diagrams illustrating an AC voltage generated in a secondary-side resonance coil of the power receiver and two clocks included in a driving signal in the second modification of the first embodiment.
Figure 23B:
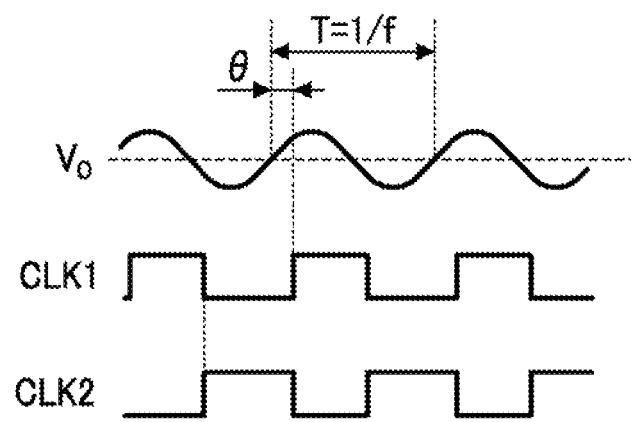

FIGS. 23A and 23B are diagrams illustrating an AC voltage generated in the secondary-side resonance coil 110 and two clocks included in a driving signal.

An AC voltage $V_0$ illustrated in FIGS. 23A and 23B has a waveform of the same frequency as a power transmission frequency and is, for example, an AC voltage generated in the secondary-side resonance coil 110. The AC voltage $V_0$ is detected by the voltmeter 116 (see FIG. 20). The docks CLK1 and CLK2 are the two docks included in the driving signal. For example, the clock CLK1 is used for driving of the switch 131X. The clock CLK2 is used for driving of the switch 131Y. The dock CLK1 and the clock CLK2 are respectively examples of a first signal and a second signal.

In FIG. 23A, the docks CLK1 and CLK2 are synchronized with the AC voltage $V_0$. That is, for example, frequencies of the docks CLK1 and CLK2 are equal to a frequency of the AC voltage $V_0$ and a phase of the dock CLK1 is equal to a phase of the AC voltage $V_0$. The dock CLK2 has a phase 180 degrees different from the phase of the clock CLK1. The docks CLK1 and CLK2 have opposite phases.

In FIG. 23A, a cycle T of the AC voltage $V_0$ is the inverse of a frequency f and the frequency of the AC voltage $V_0$ is 6.78 MHz.

As illustrated in FIG. 23A, in a state in which the switches 131X and 131Y are switched to OFF, the control unit 150D only has to generate the docks CLK1 and CLK2 synchronized with the AC voltage $V_0$ using the PLL 152D in a state in which the power receiver 100D receives electric power from the power transmitter 300D and causes the secondary-side resonance coil 110 to generate a resonant current.

In FIG. 238, phases of the clocks CLK1 and CLK2 are delayed by θ degrees with respect to the AC voltage $V_0$. In this way, the control unit 150D only has to generate, using the phase shift circuit 153D, the docks CLK1 and CLK2 having the phase difference of θ degrees with respect to the AC voltage $V_0$ in this way.

The control unit 150D adjusts the phase difference of the two clocks CLK1 and CLK2 with respect to the AC voltage $V_0$ and detects a phase in which maximum power reception efficiency is obtained. The phase in which the maximum power reception efficiency is obtained is a phase in which electric power received by the power receiver 100D is maximized. Received electric power is maximized when the received electric power is in a resonant state over an entire period of one cycle according to the phase difference of the two docks CLK1 and CLK2 with respect to the AC voltage $V_0$. Therefore, the control unit 150D detects a phase difference in which the received electric power is maximized while increasing and reducing the phase difference of the two clocks CLK1 and CLK2 with respect to the AC voltage $V_0$ and treats the detected phase difference as 0 degree.

The control unit 150D sets the phase difference of the two clocks with respect to the AC voltage $V_0$ in the phase shift circuit 153D based on the phase difference (0 degrees) in which the received electric power is maximized and data indicating a phase difference received from the power transmitter 300D.

Power reception efficiency of electric power received by the power receiver 100D from the power transmitter 300D when the phase difference of the driving signal is adjusted is explained with reference to FIG. 24.

Figure 24:
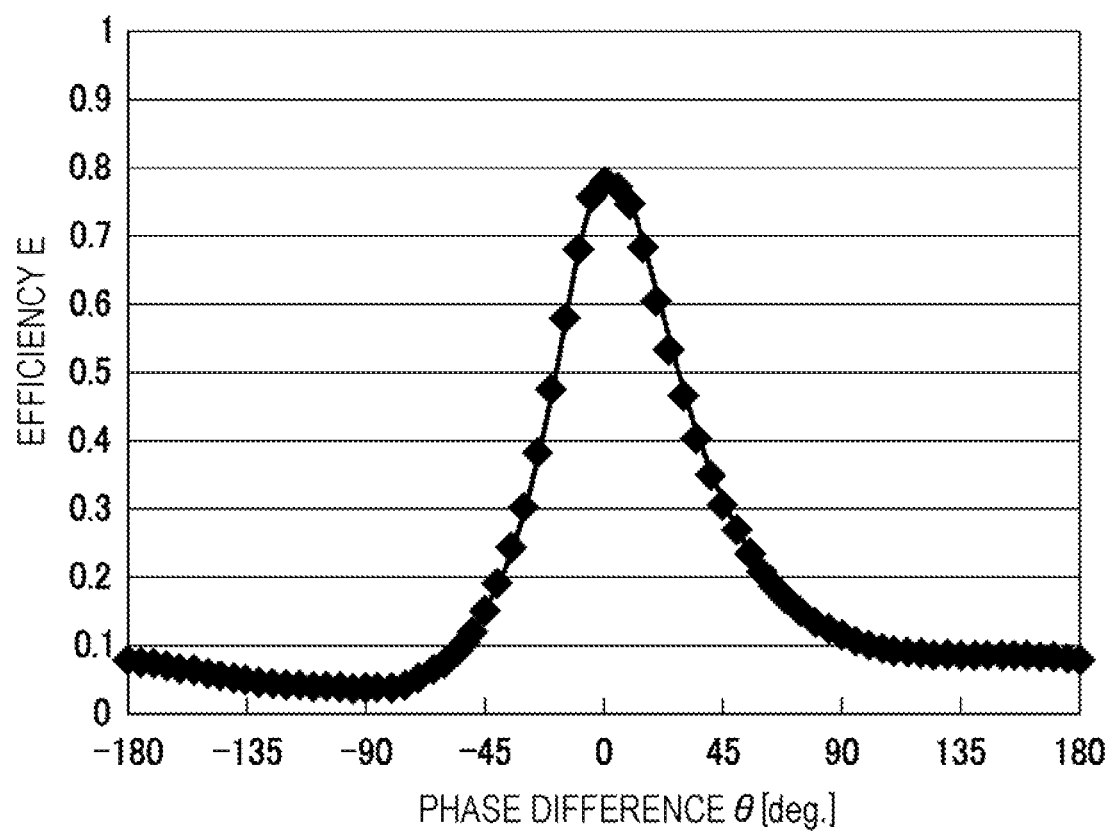
FIG. 24 is a diagram illustrating a simulation result indicating a characteristic of power reception efficiency with respect to a phase difference of the driving signal.

FIG. 24 is a diagram illustrating a simulation result indicating a characteristic of power reception efficiency with respect to the phase difference of the driving signal. The phase difference on the horizontal axis is the phase difference of the two docks with respect to the AC voltage $V_0$ at the time when the phase difference in which the received electric power is maximized is 0 degree. The power reception efficiency on the vertical axis is a ratio of electric power (Pout) output by the power receiver 100D to electric power (Pin) input to the power transmitter 300D by the AC power supply 1 (see FIG. 1). The power reception efficiency is equal to transmission efficiency of electric power between the power transmitter 300D and the power receiver 100D.

A frequency of electric power transmitted by the power transmitter 300D is 6.78 MHz. A frequency of the driving signal is set the same as the frequency of the electric power.

A state in which the phase difference is 0 degrees is a state in which resonance by the magnetic field resonance occurs in the secondary-side resonance coil 110 over an entire period of one cycle of a resonant current and the resonant current is flowing to the secondary-side resonance coil 110. An increase in the phase difference means an increase in a period in which resonance does not occur in the secondary-side resonance coil 110 in one cycle of the resonant current. Therefore, a state in which the phase difference is 180 degrees is theoretically a state in which the resonant current does not flow to the secondary-side resonance coil 110 at all.

As illustrated in FIG. 24, when the phase difference is increased from 0 degree, the power reception efficiency decreases. When the phase difference is approximately 60 degrees or more, the power reception efficiency is less than approximately 0.1. In this way, when the phase difference of the two clocks with respect to the AC voltage $V_0$ is changed, electric energy of the resonant current flowing to the secondary-side resonance coil 110 changes, whereby the power reception efficiency changes.

Figure 25:
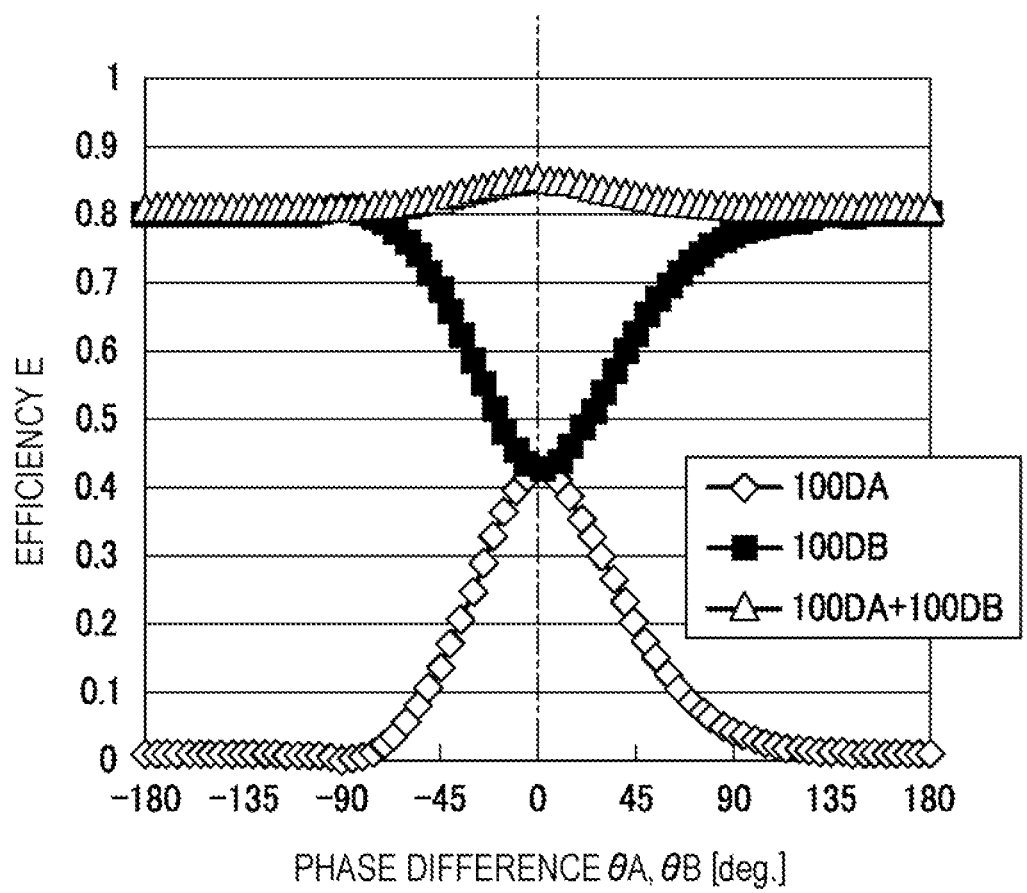
FIG. 25 is a diagram illustrating a relation between the phase difference of the driving signal and power reception efficiencies of two power receivers.

FIG. 25 is a diagram illustrating a relation between the phase difference of the driving signal and power reception efficiency of two power receivers A and B.

The two power receivers A and B are respectively the same as the power receiver 100D illustrated in FIG. 20. In the following explanation, methods of controlling the adjusting unit 130D of the power receiver A and controlling the adjusting unit 130D of the power receiver B in power transmission performed from the power transmitter 300D to the two power receivers A and B are explained. The control unit 310D of the power receiver A controls the adjusting unit 130D of the power receiver A. The control unit 310D of the power receiver B controls the adjusting unit 130D of the power receiver B.

In the following explanation, in a state in which a phase difference of a driving signal for driving the adjusting unit 130D of the power receiver B is fixed to the phase difference (0 degree) in which the power reception efficiency is maximized, a phase difference of a driving signal for driving the adjusting unit 130D of the power receiver A is changed from the phase difference (0 degree) in which the power reception efficiency is maximized.

In FIG. 25, the horizontal axis indicates a phase difference θA of the driving signal for driving the adjusting unit 130D of the power receiver A and a phase difference θB of the driving signal for driving the adjusting unit 130D of the power receiver B. The vertical axis on the left side indicates power reception efficiency of each of the power receivers A and B and a total value of power reception efficiencies of the power receivers A and B.

In a state in which the phase difference of the driving signal for driving the adjusting unit 130D of the power receiver B is fixed to 0 degree, when the phase difference of the driving signal for driving the adjusting unit 130D of the power receiver A is increased or reduced from 0 degree, as illustrated in FIG. 25, a ratio of the power reception efficiency of the power receiver A decreases. The power reception efficiency of the power receiver A is the maximum when the phase difference is 0 degree. The ratio of the power reception efficiency of the power receiver A increases according to the decrease in the power reception efficiency of the power receiver A.

When the phase difference of the driving signal for driving the adjusting unit 130D of the power receiver A is changed in this way, since a power reception amount of the power receiver A decreases, an electric current flowing to the power receiver A also decreases. That is, for example, the impedance of the power receiver A changes according to the change in the phase difference.

In the simultaneous power transmission using the magnetic field resonance, electric power transmitted from the power transmitter 300D to the power receivers A and B by the magnetic field resonance is distributed between the power receivers A and B. Therefore, when the phase difference of the driving signal for driving the adjusting unit 130D of the power receiver A is changed from 0 degree, a power reception amount of the power receiver B increases by a decrease in the power reception amount of the power receiver A.

Therefore, as illustrated in FIG. 25, the ratio of the power reception efficiency of the power receiver A decreases. The ratio of the power reception efficiency of the power receiver B increases according to the decrease in the ratio of the power reception efficiency of the power receiver A.

When the phase difference of the driving signal for driving the adjusting unit 130D of the power receiver A changes to approximately ±90 degrees, the ratio of the power reception efficiency of the power receiver A decreases to approximately 0 (zero). The ratio of the power reception efficiency of the power receiver B increases to approximately 0.8.

A sum of the power reception efficiencies of the power receivers A and B is approximately 0.85 when the phase difference of the driving signal for driving the adjusting unit 130D of the power receiver A is 0 degree. When the phase difference of the driving signal for driving the adjusting unit 130D of the power receiver B decreases to approximately ±90 degrees, the sum of the power reception efficiencies of the power receivers A and B decreases to approximately 0.8.

In this way, in a state in which the phase difference of the driving signal for driving the adjusting unit 130D of the power receiver B is fixed to 0 degrees, when the phase difference of the driving signal for driving the adjusting unit 130D of the power receiver A is changed from 0 degrees, the ratio of the power reception efficiency of the power receiver A decreases and the ratio of the power reception efficiency of the power receiver B increases. The sum of the power reception efficiencies of the power receivers A and B is a value around 0.8 and does not greatly fluctuate.

In the power transmission using the magnetic field resonance, the electric power transmitted from the power transmitter 300D to the power receivers A and B by the magnetic field resonance is distributed between the power receivers A and B. Therefore, even if the phase difference changes, the sum of the power reception efficiencies of the power receivers A and B does not greatly fluctuate.

Similarly, in a state in which the phase difference of the driving signal for driving the adjusting unit 130D of the power receiver A is fixed to 0 degrees, when the phase difference of the driving signal for driving the adjusting unit 130D of the power receiver B is reduced from 0 degrees, the ratio of the power reception efficiency of the power receiver B decreases and the ratio of the power reception efficiency of the power receiver A increases. The sum of the power reception efficiencies of the power receivers A and B is a value around 0.8 and does not greatly fluctuate.

Therefore, if the phase difference of the driving signal for driving one of the adjusting units 130D of the power receivers A and B is adjusted, the ratios of the power reception efficiencies of the power receivers A and B may be adjusted.

As explained above, when the phase difference of the driving signal for driving the adjusting unit 130D of the power receiver A or B is changed, ratios of power reception efficiencies of the secondary-side resonance coils 110A and 110B of the power receivers A and B change.

Therefore, the phase difference of one of the driving signals for the adjusting units 130D of the power receivers A and B is changed from the reference phase difference. For example, the phase difference in which the power reception efficiency is maximized is defined as the reference phase difference (0 degree). In this case, the other phase difference is changed from 0 degree.

In this case, the phase difference of the driving signal of which of the adjusting units 130D is changed from the reference phase difference is determined as explained below.

First, a first value obtained by dividing a rated output of the battery 220 of the power receiver A by reception efficiency of the secondary-side resonance coil 110 of the power receiver A and a second value obtained by dividing a rated output of the battery 220 of the power receiver B by power reception efficiency of the secondary-side resonance coil 110 of the power receiver B are calculated.

The phase difference of the driving signal corresponding to the power receiver (A or B) having smaller one of the first value and the second value is changed from 0 degree and set to an appropriate phase difference.

A value obtained by dividing a rated output by power reception efficiency represents electric energy (a required power transmission amount) transmitted by the power transmitter 300D to the power receiver (A or B). The required power transmission amount is electric energy transmitted from the power transmitter 300D such that the power receiver (A or B) may receive electric power without causing excessive power and insufficient power.

Therefore, if a power supply amount to the power receiver (A or B) having a smaller required power transmission amount is reduced, a power supply amount to the power receiver (A or B) having a larger required power transmission amount may be increased. As a result, a balance of the power supply amounts to the power receivers A and B may be improved.

As it is seen from FIG. 25, when the phase difference of one of the power receivers (A or B) is changed, a received electric power amount of the power receiver (A or B) decreases. A received electric power amount of the other power receiver (A or B) increases in a state in which the phase difference of the other power receiver is fixed to 0 degree.

Therefore, if the phase difference of the driving signal corresponding to the power receiver (A or B) having the smaller required power transmission amount is changed from the reference phase difference (0 degree), the power supply amount to the power receiver (A or B) having the smaller required power transmission amount is reduced. The power supply amount to the power receiver (A or B) having the larger required power transmission amount may be increased.

The control unit 310D of the power receiver A and the control unit 310D of the power receiver B control the received electric power amounts of the power receivers A and B by changing the phase difference of the driving signal for driving the adjusting unit 130D of the power receiver A and the phase difference of the driving signal for driving the adjusting unit 130D of the power receiver B.

The power transmission system in this embodiment may be modified as explained below.

Figure 26:
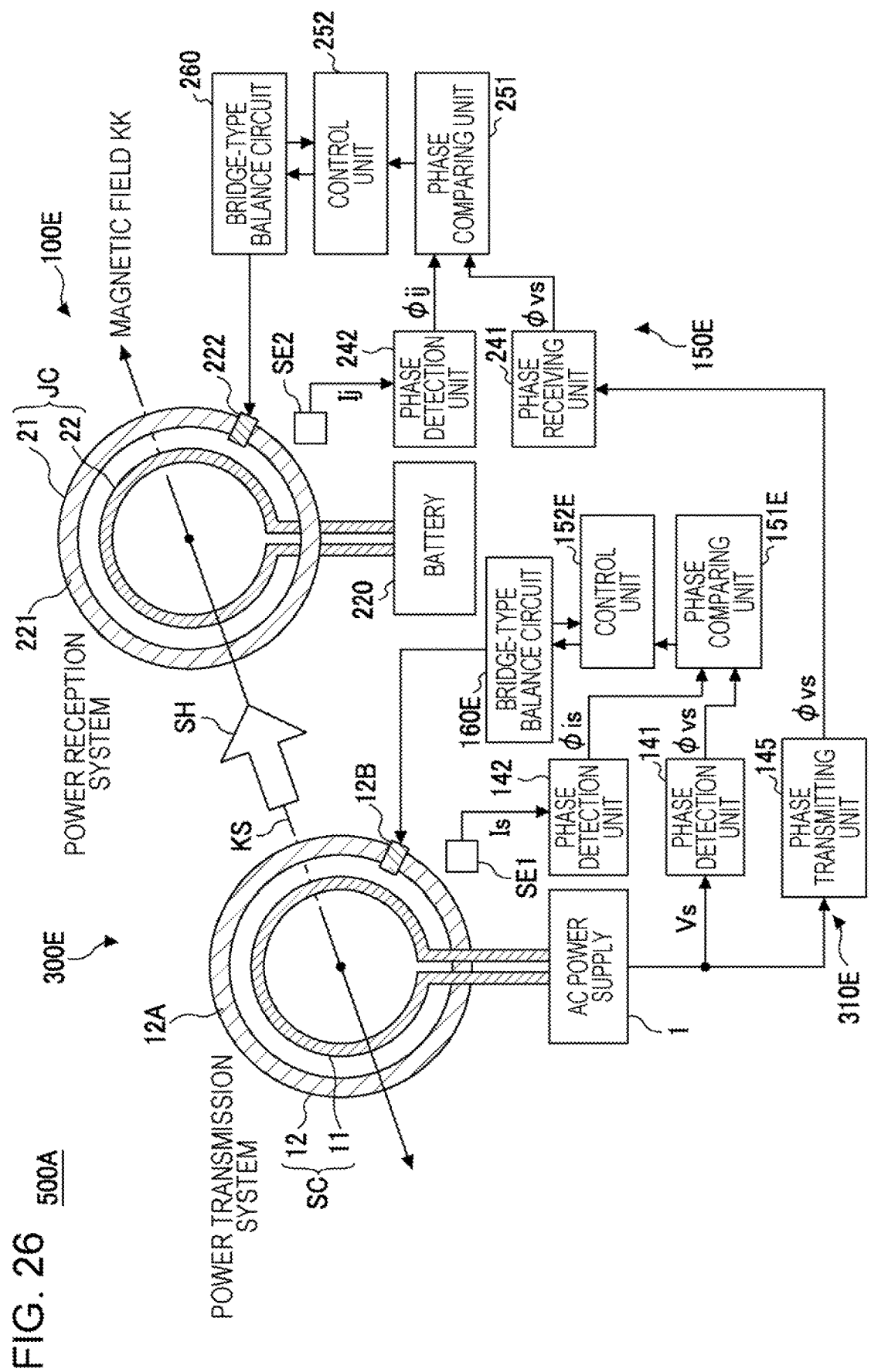
FIG. 26 is a diagram illustrating an overview of a power transmission system of a magnetic field resonance type in a third modification of the first embodiment.

FIG. 26 is a diagram illustrating an overview of a power transmission system 500A of a magnetic field resonance type in a third modification of the first embodiment. The power transmission system 500A includes a power transmitter 300E and a power receiver 100E.

In FIG. 26, a power transmission system coil SC includes the primary-side coil 11 and the primary-side resonance coil 12. The primary-side coil 11 is a coil obtained by winding a metal wire such as a copper wire or an aluminum wire a plurality of times in a circumferential shape. An AC voltage (a high-frequency voltage) by the AC power supply 1 is applied to both ends of the primary-side coil 11.

The primary-side resonance coil 12 includes a coil 12A obtained by winding a metal wire such as a copper wire or an aluminum wire in a circumferential shape and a capacitor 12B connected to both ends of the coil 12A. The primary-side resonance coil 12 forms a resonance circuit by the coil 12A and the capacitor 12B. A resonant frequency f0 is indicated by the following Expression (1).

$$f_0 = \frac{1}{2\pi\sqrt{LC}} \quad (1)$$

In Expression (1), L represents the inductance of the coil 12A and C represents the capacitance of the capacitor 12B.

The coil 12A of the primary-side resonance coil 12 is, for example, a one-turn coil. Capacitors of various forms are used as the capacitor 12B. However, a capacitor having as small a loss as possible and having a sufficient withstanding voltage is desirable. In the first embodiment, a variable capacitor is used as the capacitor 12B in order to change a resonant frequency. As the variable capacitor, for example, a variable capacity device manufactured using a MEMs technique is used. The variable capacitor may be a variable capacity device (a varactor) including a semiconductor.

The primary-side coil 11 and the primary-side resonance coil 12 are disposed to be electromagnetically closely coupled to each other. For example, the primary-side coil 11 and the primary-side resonance coil 12 are disposed on the same plane and concentrically. That is, for example, the primary-side coil 11 is disposed to be fit on the inner circumference side of the primary-side resonance coil 12. Alternatively, the primary-side coil 11 and the primary-side resonance coil 12 may be disposed an appropriate distance apart from each other on the same axis.

In this state, when an AC voltage is supplied from the AC power supply 1 to the primary-side coil 11, a resonant current flows to the primary-side resonance coil 12 with electromagnetic induction by an alternating magnetic field generated in the primary-side coil 11. That is, for example, electric power is supplied from the primary-side coil 11 to the primary-side resonance coil 12 by the electromagnetic induction.

A power reception system coil JC includes the secondary-side resonance coil 21 and the secondary-side coil 22. The secondary-side resonance coil 21 includes a coil 221 obtained by winding a metal wire such as a copper wire or an aluminum wire in a circumferential shape and a capacitor 222 connected to both ends of the coil 221. The resonant frequency f0 of the secondary-side resonance coil 21 is indicated by the above Expression (1) based on the inductance of the coil 221 and the capacitance of the capacitor 222.

The coil 221 of the secondary-side resonance coil 21 is, for example, a one-turn coil. As the capacitor 222, capacitors of various forms are used as explained above. In the first embodiment, a variable capacitor is used as the capacitor 222 in order to change a resonant frequency. As the variable capacitor, for example, a variable capacity device manufactured using the MEMS technique is used. The variable capacitor may be a variable capacity device (a varactor) including a semiconductor.

The secondary-side coil 22 is a coil obtained by winding a metal wire such as a copper wire or an aluminum wire a plurality of times in a circumferential shape. The battery 220, which is a load, is connected to both ends of the secondary-side coil 22.

The secondary-side resonance coil 21 and the secondary-side coil 22 are disposed to be electromagnetically closely coupled to each other. For example, the secondary-side resonance coil 21 and the secondary-side coil 22 are disposed on the same plane and concentrically. That is, for example, the secondary-side coil 22 is disposed to be fit on the inner circumferential side of the secondary-side resonance coil 21. Alternatively, the secondary-side resonance coil 21 and the secondary-side coil 22 may be disposed an appropriate distance apart from each other on the same axis.

In this state, when a resonant current flows to the secondary-side resonance coil 21, an electric current flows to the secondary-side coil 22 with electromagnetic induction by an alternating magnetic field generated by the resonant current. That is, for example, electric power is sent from the secondary-side resonance coil 21 to the secondary-side coil 22 by the electromagnetic induction.

The power transmission system coil SC and the power reception system coil JC transmit electric power by radio with the magnetic field resonance. Therefore, as illustrated in FIG. 26, the power transmission system coil SC and the power reception system coil JC are disposed within a range of an appropriate distance from each other such that coil surfaces of the power transmission system coil SC and the power reception system coil JC are parallel to each other and coil axes of the power transmission system coil SC and the power reception system coil JC coincide with each other or do not greatly deviate from each other. For example, when the diameter of the primary-side resonance coil 12 and the secondary-side resonance coil 21 is approximately 100 mm, the power transmission system coil SC and the power reception system coil JC are disposed within a range of a distance of approximately several hundred millimeters.

In the power transmission system 500A illustrated in FIG. 26, a direction along a coil axis KS is a main radiation direction of a magnetic field KK. A direction from the power transmission system coil SC toward the power reception system coil JC is a power transmission direction SH.

When both of a resonant frequency fs of the primary-side resonance coil 12 and a resonant frequency fJ of the secondary-side resonance coil 21 coincide with a frequency fd of the AC power supply 1, maximum electric power is transmitted. However, if the resonant frequencies fs and fJ deviate from each other or the resonant frequencies fs and fj and the frequency fd of the AC power supply 1 deviate, transmitted electric power decreases and efficiency is deteriorated.

Figure 27:
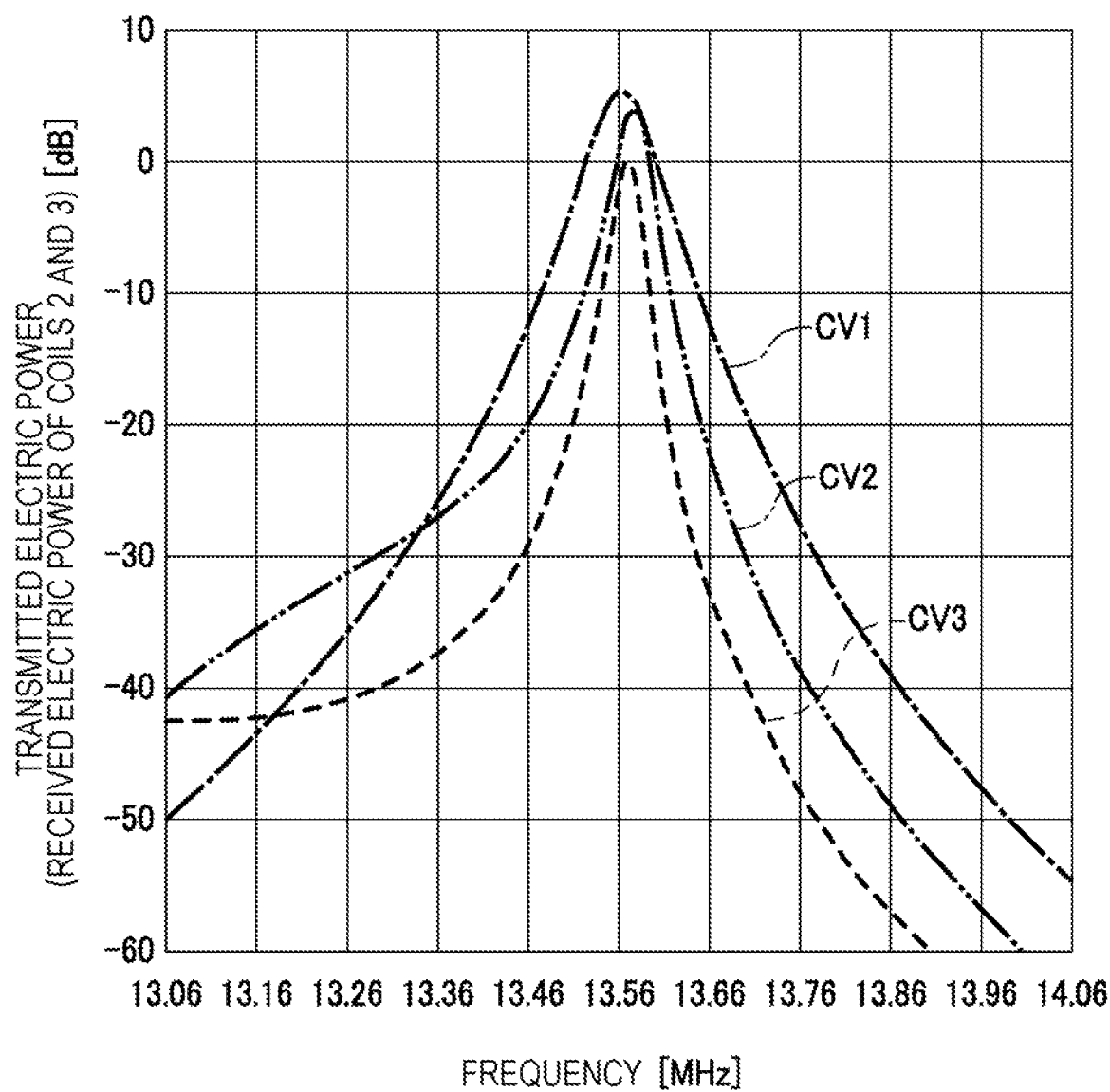
FIG. 27 is a diagram illustrating frequency dependency of the power transmission system.

FIG. 27 is a diagram illustrating frequency dependency of the power transmission system.

In FIG. 27, the horizontal axis indicates the frequency fd [MHz] of the AC power supply 1 and the vertical axis indicates the magnitude [dB] of the transmitted electric power. A curve CV1 indicates that the resonant frequency fs of the primary-side resonance coil 12 and the resonant frequency fj of the secondary-side resonance coil 21 coincide. In this case, according to FIG. 27, the resonant frequencies fs and fj are 13.56 MHz.

Curves CV2 and CV3 respectively indicate that the resonant frequency fj of the secondary-side resonance coil 21 is higher than the resonant frequency fs of the primary-side resonance coil 12 by five percent and ten percent.

In FIG. 27, when the frequency fd of the AC power supply 1 is 13.56 MHz, highest electric power is transmitted in the curve CV1. However, the electric power sequentially decreases in the curves CV2 and CV3. When the frequency fd of the AC power supply 1 shifts from 13.56 MHz, the transmitted electric power decreases in all of the curves CV1 to CV3 except when the frequency fd slightly shifts to the upper side.

Therefore, the resonant frequencies fs and fj of the primary-side resonance coil 12 and the secondary-side resonance coil 21 have to be matched with the frequency fd of the AC power supply 1 as much as possible.

Figure 28:
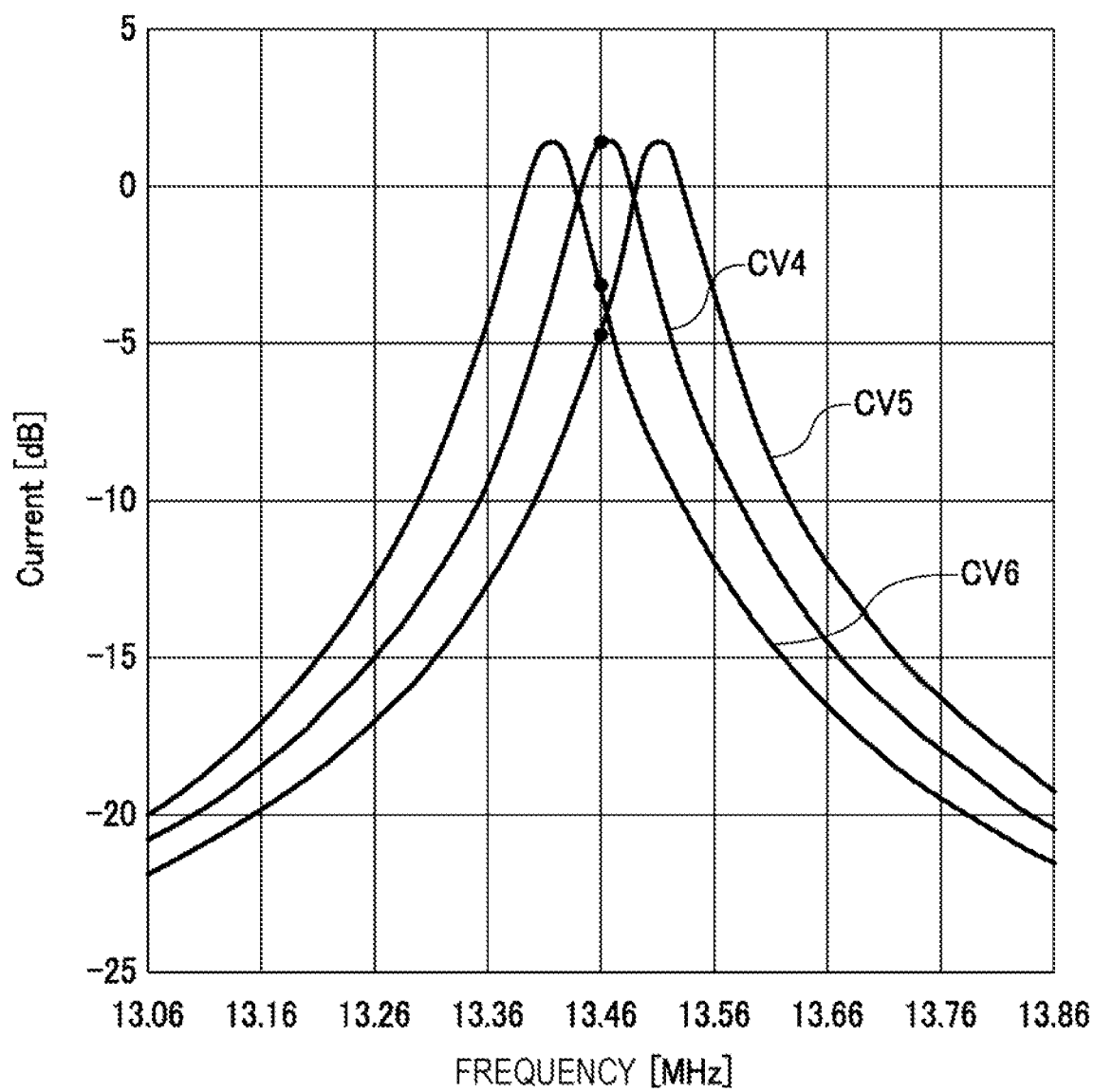
FIG. 28 is a diagram for explaining a method of sweeping a resonant frequency of a coil.

FIG. 28 is a diagram for explaining a method of sweeping a resonant frequency of a coil.

In FIG. 28, the horizontal axis indicates a frequency [MHz] and the vertical axis indicates the magnitude [dB] of an electric current flowing to the coil. A curve CV4 indicates that the resonant frequency of the coil coincides with the frequency fd of the AC power supply 1. In this case, according to FIG. 28, the resonant frequency is 10 MHz.

Curves CV5 and CV6 indicate that the resonant frequency of the coil is higher or lower than the frequency fd of the AC power supply 1.

In FIG. 28, a largest electric current flows in the curve CV4. However, the electric current decreases in both of the curves CV5 and CV6. When a Q value of the coil is high, the influence of deviation of the resonant frequency on a decrease in an electric current or transmitted electric power is large.

Therefore, the power transmission system 500A in the third modification of the first embodiment performs, with a control unit 310E and a control unit 150E, resonant frequency control using a phase $\phi vs$ of the AC power supply 1 and phases $\phi is$ and $\phi ij$ of electric currents flowing to the primary-side resonance coil 12 and the secondary-side resonance coil 21.

The control unit 310E detects a phase $\phi vs$ of a voltage Vs supplied to the power transmission system coil SC and a phase $\phi is$ of an electric current Is flowing to the power transmission system coil SC and changes the resonant frequency fs of the power transmission coil SC such that a phase difference $\Delta \phi s$ of the phase $\phi vs$ and the phase $\phi is$ reaches a predetermined target value $\phi ms$. Data indicating the target value $\phi ms$ is stored in an internal memory of a control unit 152E explained below.

That is, for example, the control unit 310E includes a current detection sensor SE1, phase detecting units 141 and 142, and a phase transmitting unit 145.

The current detection sensor SE1 detects the electric current Is flowing to the primary-side resonance coil 12. As the current detection sensor SE1, a Hall element, a magnetic resistance element, a detection coil, or the like may be used. The current detection sensor SE1 outputs, for example, a voltage signal corresponding to a waveform of the electric current Is.

The phase detecting unit 141 detects the phase $\phi vs$ of the voltage Vs supplied to the primary-side coil 11. The phase detecting unit 141 outputs, for example, a voltage signal corresponding to a waveform of the voltage Vs. In this case, the voltage Vs may be directly output or may be divided by appropriate resistance and output. Therefore, the phase detecting unit 141 may be configured by a mere electric wire or one or a plurality of resistors.

The phase detecting unit 142 detects, based on the output from the current detection sensor SE1, the phase is of the electric current Is flowing to the primary-side resonance coil 12. The phase detecting unit 142 outputs, for example, a voltage signal corresponding to the waveform of the electric current Is. In this case, the phase detecting unit 142 may directly output the output of the current detection sensor SE1. Therefore, the current detection sensor SE1 may be configured to function as the phase detecting unit 142 as well.

The phase transmitting unit 145 transmits, to the control unit 150E, for example, by radio, information concerning the phase $\phi vs$ of the voltage Vs supplied to the primary-side coil 11. The phase transmitting unit 145 transmits, for example, a voltage signal corresponding to the waveform of the voltage Vs as an analog signal or a digital signal. In that case, to improve an S/N ratio, the phase transmitting unit 145 may multiply the voltage signal corresponding to the waveform of the voltage Vs by an integer and transmit the voltage signal.

The control unit 150E detects a phase $\phi vs$ of a voltage VS supplied to the power transmission system coil SC and a phase $\phi ij$ of an electric current IJ flowing to the power reception system coil JC and changes the resonant frequency fj of the power reception system coil JC such that a phase difference $\Delta \phi j$ of the phase $\phi vs$ and the phase $\phi ij$ reaches a predetermined target value $\phi mj$.

The control unit 150E includes a current detection sensor SE2, a phase receiving unit 241, and a phase detecting unit 242.

The current detection sensor SE2 detects the electric current Ij flowing to the secondary-side resonance coil 21. As the current detection sensor SE2, a Hall element, a magnetic resistance element, a detection coil, or the like may be used. The current detection sensor SE2 outputs, for example, a voltage signal corresponding to a waveform of the electric current Ij.

The phase receiving unit 241 receives information concerning the phase $\phi vs$ transmitted from the phase transmitting unit 145 and outputs the information. When the voltage signal is multiplied in the phase transmitting unit 145, the phase receiving unit 241 performs frequency division in order to reset the voltage signal to the original voltage signal. The phase receiving unit 241 outputs, for example, a voltage signal corresponding to the voltage Vs.

The phase detecting unit 242 detects, based on the output from the current detection sensor SE2, the phase $\phi ij$ of the electric current Ij flowing to the secondary-side resonance coil 21. The phase detecting unit 242 outputs, for example, a voltage signal corresponding to the waveform of the electric current Ij. In this case, the phase detecting unit 242 may directly output the output of the current detection sensor SE2. Therefore, the current detection sensor SE2 may be configured to function as the phase detecting unit 242 as well.

Figure 29:
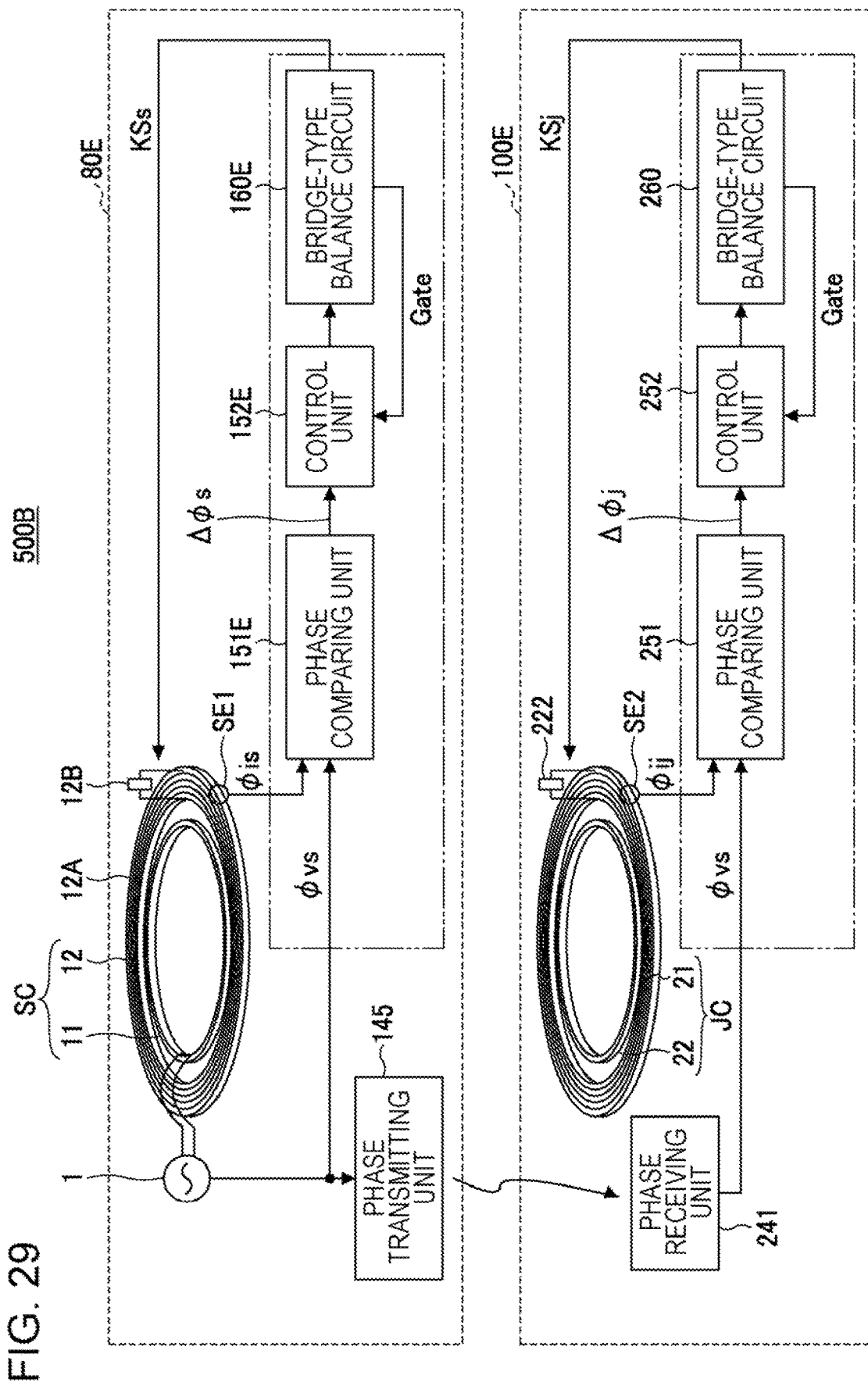
FIG. 29 is a diagram illustrating an example of the configuration of a control unit of the power transmission system in the third modification of the first embodiment.

The power transmission system in the third modification of the first embodiment is explained more in detail below with reference to FIG. 29. In FIG. 29, components having the same functions as the functions of the components illustrated in FIG. 26 are denoted by the same reference numerals and signs. Explanation of the components is sometimes omitted or simplified.

FIG. 29 is a diagram illustrating an example of the configuration of the control unit of the power transmission system in the third modification of the first embodiment.

In FIG. 29, a power transmission system (a power transmission apparatus) 500B includes a power transmitting apparatus 80E and the power receiver 100E.

The power transmitting apparatus 80E includes the AC power supply 1, the power transmission system coil SC including the primary-side coil 11 and the primary-side resonance coil 12, and a resonant-frequency control unit CTs.

The power receiver 100E includes the power reception system coil JC including the secondary-side resonance coil 21 and the secondary-side coil 22 and a resonant-frequency control unit CTj.

The resonant-frequency control unit CTs on the transmission side includes a phase comparing unit 151E, a control unit 152E, and a bridge-type balance circuit 160E. The phase comparing unit 151E is an example of a phase detecting unit or a second phase detecting unit. The control unit 152E is an example of a resonant-frequency control unit or a second resonant-frequency control unit. The bridge-type balance circuit 160E is an example of a bridge circuit or a second bridge circuit.

The phase comparing unit 151E compares the phase Os of the electric current Is detected by the current detection sensor SE1 and the phase φvs of the voltage Vs of the AC power supply 1 and outputs the phase difference Δφs, which is the difference between the phase φis and the phase φvs.

The control unit 152E sets and stores the target value φms of the phase difference Δφs. Therefore, an internal memory for storing the target value φms is provided in the control unit 152E. As the target value φms, as explained below, for example, "−π" or "a value obtained by adding an appropriate correction value "a" to −π" is set.

The setting of the target value φms may be performed by selecting the target value φms out of one or a plurality of data stored in advance or may be performed according to a command from a CPU, a keyboard, or the like.

The control unit 152E generates, based on the phase difference Δφs output by the phase comparing unit 151E and a gate signal Gate input from the bridge-type balance circuit 160E, driving signals for driving four switch elements SW1 to SW4 included in the bridge-type balance circuit 160E and outputs the driving signals such that the phase difference reaches the target value φms. The target value φms is set such that plus and minus are opposite to plus and minus of the phase difference Δφs set as a target. Therefore, a sum of the phase difference Δφs and the target value φms is 0 when the absolute values of the phase difference Δφs and the target value φms coincide.

The bridge-type balance circuit 160E shifts the resonant frequency of the coil 12A based on a control signal input from the control unit 152E such that the phase difference output by the phase comparing unit 151E reaches the target value φms. A circuit configuration and the operation of the bridge-type balance circuit 160E are explained below with reference to FIGS. 30 to 33.

The resonant-frequency control unit CTJ on the reception side includes a target-value setting unit 243, a phase comparing unit 251, a control unit 252, and a bridge-type balance circuit 260. The bridge-type balance circuit 260 is an example of a first bridge circuit. The phase comparing unit 251 is an example of a first phase detecting unit. The control unit 252 is an example of a first resonant-frequency control unit.

The control unit 252 sets and stores the target value φmj of the phase difference Δφj. As the target value φmj, as explained below, for example, a value obtained by adding "−π/2" to the target value φms in the control unit 310E is set.

That is, for example, "−3π/2" is set as the target value φmj. Alternatively, for example, a value obtained by adding an appropriate correction value "b" to "−3π/2" is set. A setting method and the like of the target value φmj are the same as the setting method and the like in the case of the target value φms.

The configurations and the operations of the units of the resonant-frequency control unit CTJ on the power reception side are the same as the configurations and the operations of the units of the resonant-frequency control unit CTs on the power transmission side explained above.

The control unit 310E, the control unit 150E, the resonant-frequency control units CTs and CTj, and the like in the power transmission systems 500A and 500B may be realized by software or hardware or by a combination of the hardware and the software. For example, a computer including a CPU, memories such as a ROM and a RAM, and other peripheral elements may be used to cause the CPU to execute an appropriate computer program. In that case, an appropriate hardware circuit only has to be concurrently used.

Figure 30:
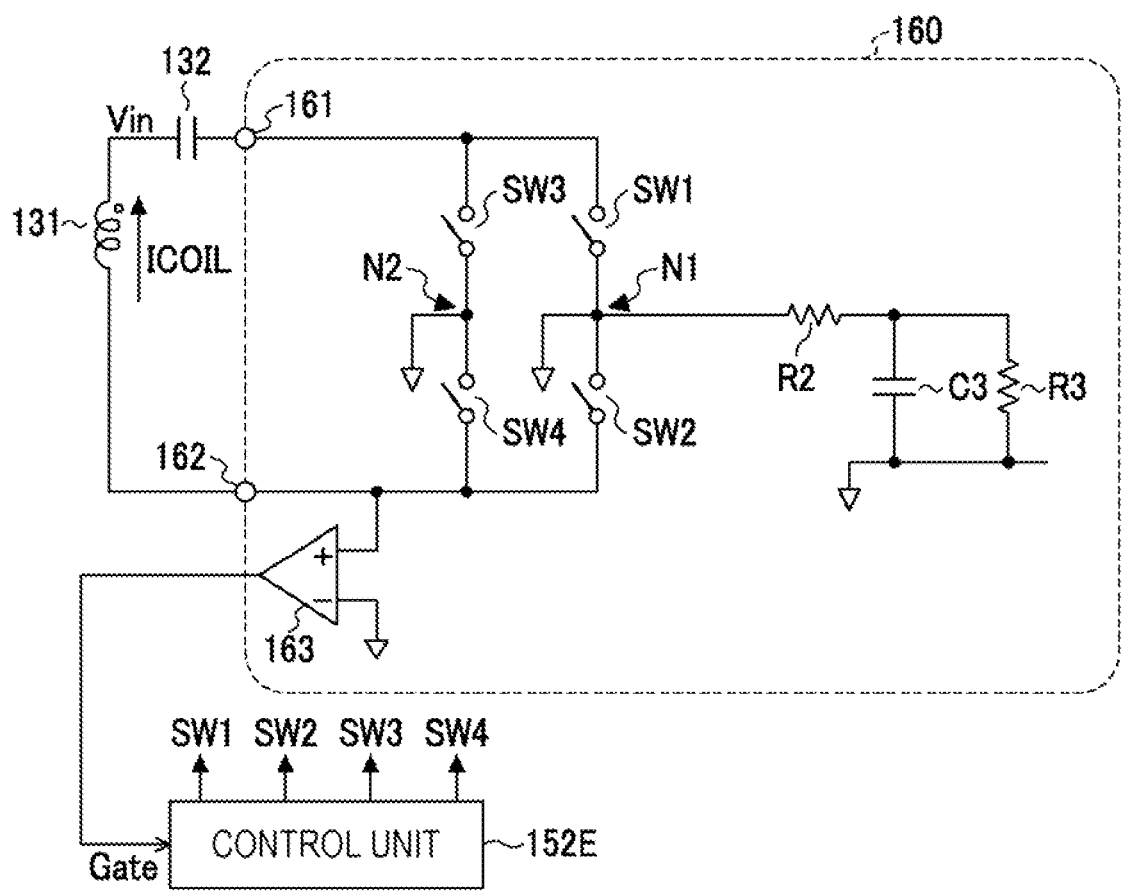
FIG. 30 is a diagram illustrating a circuit configuration of a bridge-type balance circuit of a power receiver in the third modification of the first embodiment.

FIG. 30 is a diagram illustrating a circuit configuration of the bridge-type balance circuit 160E.

The bridge-type balance circuit 160E includes terminals 161 and 162, a comparator 163, switch elements SW1, SW2, SW3, and SW4, resistors R2 and R3, and a capacitor C3.

The switch elements SW1, SW2, SW3, and SW4 are connected in an H bridge shape. A midpoint of the switches SW1 and SW2 is represented as a node N1. A midpoint of the switches SW3 and SW4 is represented as a node N2. The switches SW1 and SW3 are connected to the terminal 161. The switches SW2 and SW4 are connected to the terminal 162.

One ends of the resistor R3 and the capacitor C3 are connected to the node N1 via the resistor R2. The resistor R3 and the capacitor C3 are connected in parallel to each other. The other ends of the resistor R3 and the capacitor C3 are grounded.

ON/OFF of the switch elements SW1 to SW4 is controlled by a control signal input from the control unit 152E.

The terminal 161 is connected to one end (a terminal on the right side in FIG. 30) of the capacitor 12B. The other end (a terminal on the left side in FIG. 30) of the capacitor 12B is connected to one end (a terminal on the upper side in FIG. 30) of the coil 12A. The terminal 162 is connected to the other end (a terminal on the lower side in FIG. 30) of the coil 12A.

A noninverting input terminal of the comparator 163 is connected between the terminal 162 and the switches SW2 and SW4. An inverting input terminal of the comparator 163 is grounded. A voltage value indicating a coil current ICOIL flowing to the coil 12A is input to the noninverting input terminal of the comparator 163.

An output terminal of the comparator 163 is connected to the control unit 152E. An output of the comparator 163 is input to the noninverting input terminal. The comparator 163 inputs the voltage value indicating the coil current ICOIL and a gate signal Gate indicating a comparison result with ground potential to the control unit 152E.

Such a bridge-type balance circuit 160E performs control such that an output of the phase comparing unit 151E is zero when an duty ratio of control signals SW1 to SW4 input to the switch elements SW1 to SW4 from the control unit 152E is 50% and a phase difference between the control signals SW1 and SW4 and the control signals SW2 and SW3 is 180 degrees.

However, in this embodiment, the resonant frequency of the coil 12A is shifted such that the output of the phase comparing unit 151E reaches the target value φms by shifting a balance operating point of the bridge-type balance circuit 160E.

In FIG. 30, the circuit configuration of the bridge-type balance circuit 160E is illustrated. However, a circuit configuration of the bridge-type balance circuit 260 (see FIGS. 26 and 29) is the same. In the case of the bridge-type balance circuit 260, the capacitor 222 and the secondary-side resonance coil 21 are connected instead of the capacitor 12B and the coil 12A. The switch elements SW1 to SW4 are driven by the control signals SW1 to SW4 output from the control unit 252. Therefore, a drawing of the circuit configuration of the bridge-type balance circuit 260 is omitted.

Figure 31:
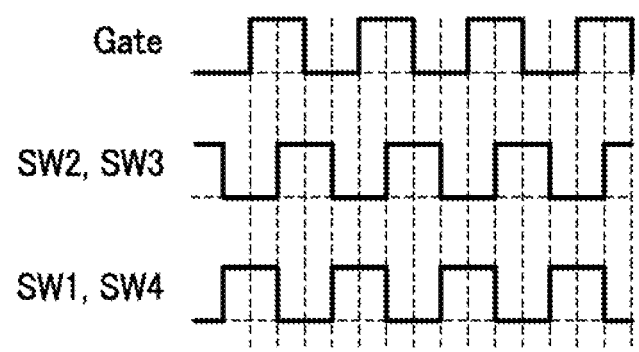
FIG. 31 is a diagram illustrating a waveform of a control signal for driving the bridge-type balance circuit of the power receiver in the third modification of the first embodiment.
Figure 32:
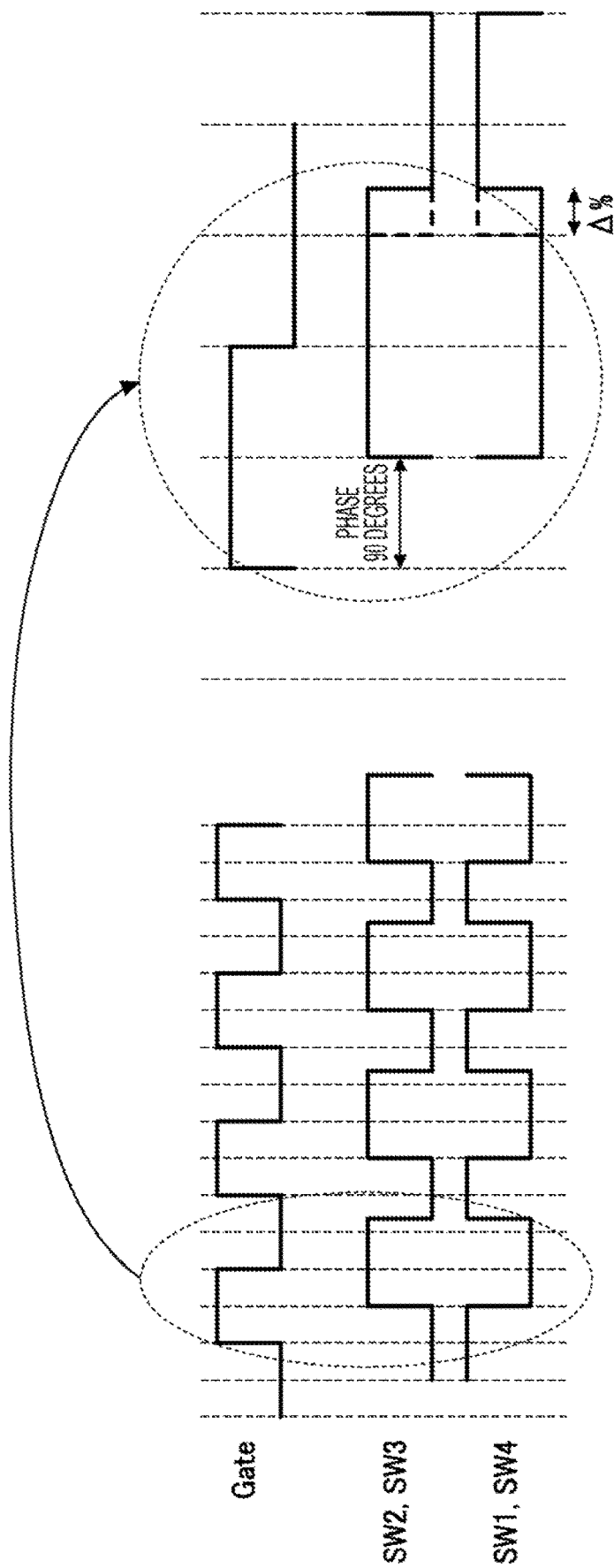
FIG. 32 is a diagram illustrating a waveform of a control signal for driving the bridge-type balance circuit of the power receiver in the third modification of the first embodiment.
Figure 33:
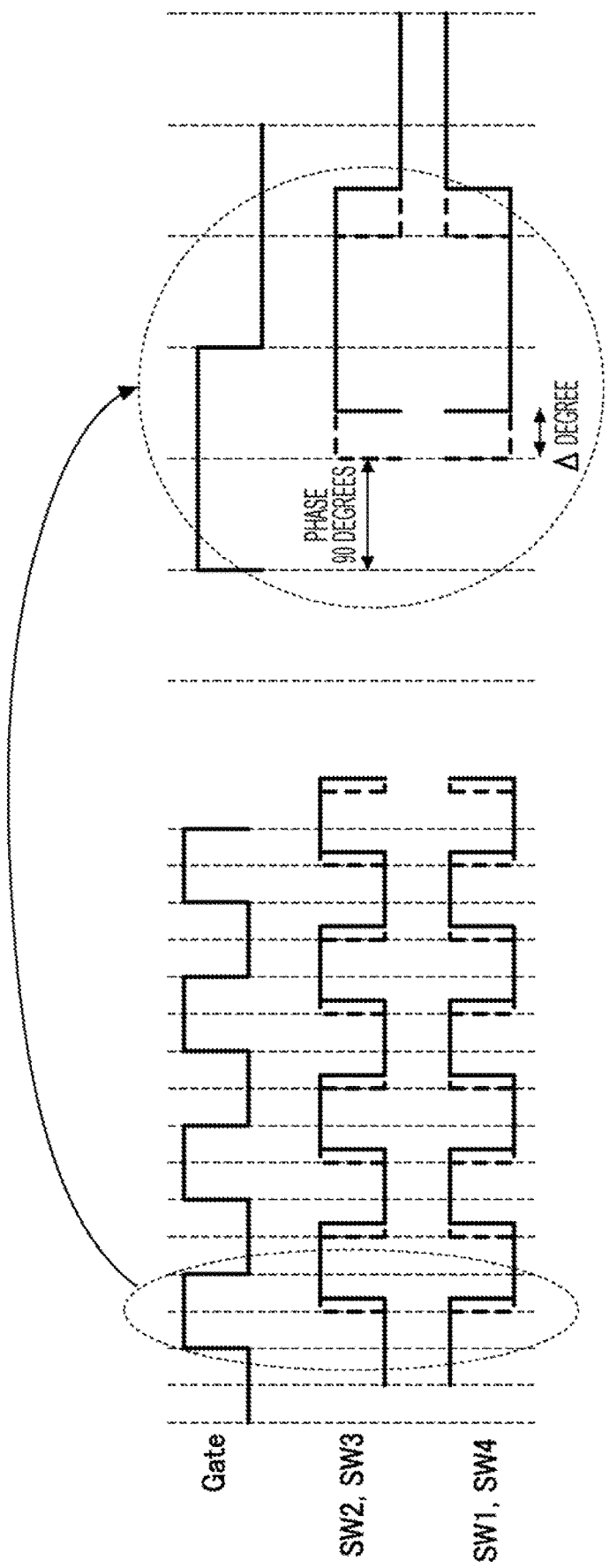
FIG. 33 is a diagram illustrating a waveform of a control signal for driving the bridge-type balance circuit of the power receiver in the third modification of the first embodiment.

FIGS. 31 to 33 are diagrams illustrating waveforms of the control signals SW1 to SW4 for driving the bridge-type balance circuit 160E in the third modification of the first embodiment.

In FIG. 31, the gate signal Gate and the control signals SW1 to SW4 are illustrated. The gate signal Gate illustrated in FIG. 31 has signal levels obtained by binarizing a sine waveform of the coil current ICOIL having a predetermined resonant frequency flowing to the coil 12A into an H level ('1') and an L level ('0'). Therefore, the gate signal Gate includes a signal having a duty ratio of 50%.

The control unit 152E includes a phase shifter circuit. The control unit 152E outputs the control signals SW2 and SW3 obtained by delaying a phase of the gate signal Gate by 90 degrees and the control signals SW1 and SW4 obtained by respectively inverting the control signals SW2 and SW3.

Like the gate signal Gate, the control signals SW1 to SW4 illustrated in FIG. 31 are control signals output when the duty ratio is 50% and the phase difference between the control signals SW1 and SW4 and the control signals SW2 and SW3 is 180 degrees. This indicates the control signals SW1 to SW4 output when control is performed to reduce the output of the phase comparing unit 151E to zero.

The bridge-type balance circuit 160E is a circuit that simultaneously controls ON/OFF of the switch elements SW1 and SW4 based on the control signals SW1 and SW4 and simultaneously controls ON/OFF of the switch elements SW2 and SW3 based on the control signals SW2 and SW3 in the opposite phase of the switch elements SW1 and SW4 to thereby converge on a balance operating point determined by the duty ratio or the phase of the control signals SW1 to SW4.

In the first embodiment, when the duty ratio of the control signals SW1 to SW4 is 50%, an operating point of the bridge-type balance circuit 160E converges on a balance operating point realized by the control signals SW1 to SW4 having the duty ratio of 50%, whereby the output of the phase comparing unit 151E decreases to zero.

When the duty ratio of the control signals SW1 to SW4 is 50%±Δ% (Δ≠0%), the operating point of the bridge-type balance circuit 160E converges on a balance operating point realized by the control signals SW1 to SW4 having the duty ratio of 50%±Δ%. The balance operating point at the time when the duty ratio is 50%±Δ% is different from the balance operating point at the time when the duty ratio is 50%.

In the first embodiment, the output of the phase comparing unit 151E is controlled to reach the target value φms by setting the duty ratio of the control signals SW1 to SW4 to 50%±Δ% and shifting the balance operating point.

In FIG. 32, waveforms of the control signals SW1 to SW4 obtained by changing the duty ratio while fixing the phase difference with respect to the gate signal Gate are illustrated.

As enlarged and illustrated on the right side of FIG. 32, the control unit 152E changes the duty ratio of the control signals SW1 to SW4. As a result, a ratio of ON/OFF periods of the switch elements SW1 to SW4 of the bridge-type balance circuit 160E changes. The resonant frequency of the coil 12A may be shifted. In this embodiment, the control unit 152E changes the duty ratio of the control signals SW1 to SW4 such that the output of the phase comparing unit 151E reaches the target value φms.

In FIG. 33, waveforms of the control signals SW1 to SW4 obtained by changing the phase difference while fixing the duty ratio to 50% with respect to the gate signal Gate are illustrated.

As enlarged and illustrated on the right side of FIG. 33, the control unit 152E changes the phases of the control signals SW1 to SW4. As a result, ON/OFF timings of the switch elements SW1 to SW4 of the bridge-type balance circuit 160E change. The resonant frequency of the coil 12A may be shifted. In this embodiment, the control unit 152E changes the duty ratio of the control signals SW1 to SW4 such that the output of the phase comparing unit 151E reaches the target value φms.

In this embodiment, the control unit 152E changes the duty ratio or the phase difference of the control signals SW1 to SW4 with respect to the gate signal Gate to thereby perform control to shift from the operating point where the output of the phase comparing unit 151E decreases to zero as examined above to the operating point where the output of the phase comparing unit 151E reaches the target value φms.

As explained above, the resonant frequency may be change by changing a resonance condition. When a plurality of power receivers are present, distribution of electric power may be adjusted.

Second Embodiment

A second embodiment is realized by the power transmitter 300 and the power receiver 100 of the same power transmission system 500 as the power transmission system 500 in the first embodiment. Therefore, the explanation of the first embodiment is referred to. In the second embodiment, the main control unit 151 is an example of a power reception-side control unit and a power reception-side determining unit.

Figure 34:
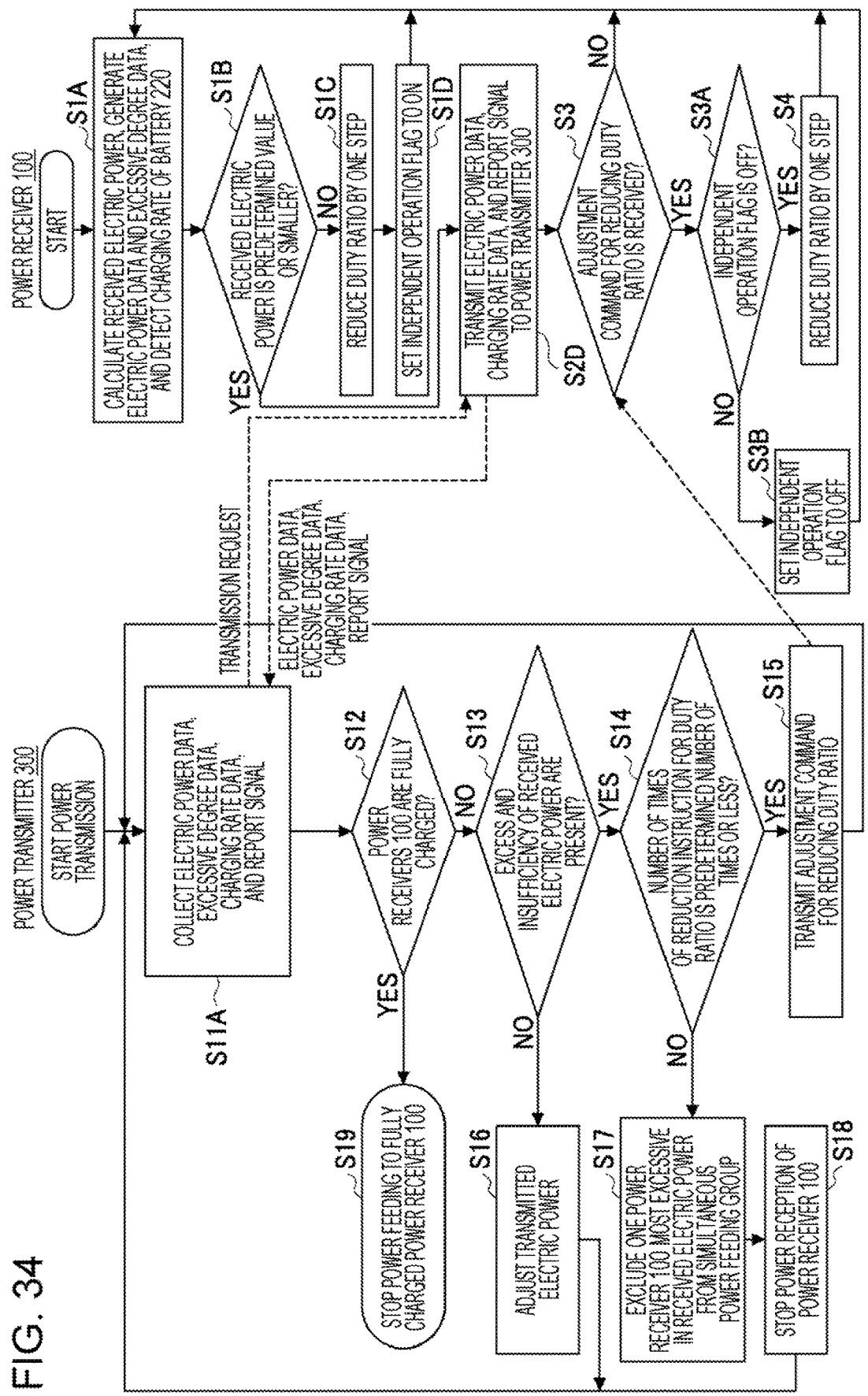
FIG. 34 is a flowchart illustrating processing executed by a power transmitter and a power receiver of a power transmission system in a second embodiment.

FIG. 34 is a flowchart illustrating processing executed by the power transmitter 300 and the power receiver 100 of the power transmission system 500 in the second embodiment. Processing is separately performed in the power transmitter 300 and the power receiver 100. However, to illustrate an entire flow, a flow of data between the power transmitter 300 and the power receiver 100 is also illustrated. The same steps as the steps of the flowchart (see FIG. 13) in the first embodiment are denoted by the same step numbers.

When the plurality of power receivers 100 simultaneously receive electric power transmitted by the power transmitter 300, optimization of transmitted electric power of the power transmitter 300 and received electric power of the plurality of power receivers 100 is performed. The optimization of the received electric power is performed by optimizing a duty ratio of a PWM driving pattern of the power receiver 100.

The plurality of power receivers 100 simultaneously receiving the electric power transmitted by the power transmitter 300 is referred to as simultaneous power feeding. The plurality of power receivers 100 that receive the electric power with the simultaneous power feeding are treated as a simultaneous power feeding group.

The power transmitter 300 starts power transmission (a power transmission start). Electric power is output from the primary-side resonance coil 12 of the power transmitter 300. Immediately after the power transmission start, electric power of a preset initial output only has to be output from the primary-side resonance coil 12.

When being switched to a power reception mode, the power receiver 100 starts processing (start).

The power receiver 100 receives electric power from the power transmitter 300 with the magnetic field resonance, calculates received electric power, generates electric power data and excessive degree data, and detects a charging rate of the battery 220 (step S1A).

The power receiver 100 determines whether the received electric power calculated in step S1A is equal to or smaller than a predetermined value (step S1B).

The predetermined value in step S1B is, for example, a value obtained by increasing an upper limit value of the received electric power of the power receiver 100 by 10%. A form is explained in which the predetermined value in step S1B is the value obtained by increasing the upper limit value of the received electric power of the power receiver 100 by 10%. However, the predetermined value in step S1B is not limited to the value obtained by increasing the upper limit value of the received electric power of the power receiver 100 by 10% and only has to be set to an optimum value by an experiment or the like.

When determining that the received electric power is equal to or smaller than the predetermined value (YES in step S1B), the power receiver 100 advances the flow to step S2D.

The power transmitter 300 requests the power receiver 100 to transmit electric power data, excessive degree data, and charging rate data and collects the electric power data, the excessive degree data, the charging rate data, and a report signal from the power receiver 100 (step S11A). The electric power data, the excessive degree data, the charging rate data, and the report signal are transmitted from the power receiver 100 to the power transmitter 300 in association with an ID of the power receiver 100.

The report signal indicates a duty ratio reduced by the power receiver 100 in the processing in step S1C. The report signal is transmitted from the power receiver 100 to the power transmitter 300, whereby the power transmitter 300 may obtain the duty ratio after being independently adjusted by the power receiver 100 and use the duty ratio for control of the duty ratio.

The power receiver 100 determines that the received electric power is equal to or smaller than the predetermined value (YES in step S1B). When transmission of data is requested from the power transmitter 300, the power receiver 100 transmits the electric power data generated in step S1A, charging rate data indicating a detected charging rate, and data indicating the report signal to the power transmitter 300 (step S2D).

After transmitting the electric power data, the excessive degree data, the charging rate data, and the data indicating the report signal to the power transmitter 300 in step S2D, the power receiver 100 determines whether the power receiver 100 receives an adjustment command for reducing the duty ratio of the PWM driving pattern (step S3).

The power receiver 100 stays on standby for a predetermined time required after the power transmitter 300 ends the processing in step S11A until the power transmitter 300 ends processing in step S15 explained below. The power receiver 100 determines whether the adjustment command for reducing the duty ratio of the PWM driving pattern is received.

When the power receiver 100 does not receive the adjustment command for reducing the duty ratio of the PWM driving pattern from the power transmitter 300 even if the power receiver 100 stands by for the required time (NO in step S3), the power receiver 100 returns the flow to step S1A.

The power transmitter 300 determines based on the charging rate data received from the power receiver 100 whether the power receivers 100 are fully charged (step S12). This because, when the power receiver 100 is fully charged, power transmission does not have to be performed.

Concerning the power receivers 100 determined as not being fully charged in step S12, the power transmitter 300 determines whether both of the power receiver 100 excessive in the received electric power and the power receiver 100 insufficient in the received electric power are present (step S13). When both of the power receiver 100 excessive in the received electric power and the power receiver 100 insufficient in the received electric power are present, the power transmitter 300 performs such determination in order to reduce the duty ratio of the PWM driving pattern of the power receiver 100 excessive in the received electric power.

When determining that both of the power receiver 100 excessive in the received electric power and the power receiver 100 insufficient in the received electric power are present (YES in step S13), the power transmitter 300 determines whether the number of times the power transmitter 300 instructs the power receiver 100 excessive in the received electric power to reduce the duty ratio is equal to or less than a predetermined number of times (step S14).

This is because, if the number of times a reduction in the duty ratio is instructed is large, power reception efficiency of the power receiver 100 is likely to be excessively low. Therefore, the limit is set for the number of times the duty ratio is reduced.

The predetermined number of times only has to be set to an optimum number of times by an experiment or the like. For example, the predetermined number of times may be set to a larger value for the power receiver 100 having a larger rated output. This is because the power receiver 100 having the larger rated output has a wider range in which the duty ratio may be reduced to adjust the received electric power.

For example, the main control unit 320 of the power transmitter 300 may count, concerning the power receivers 100, data indicating the predetermined number of times. The power receivers 100 may count the data indicating the predetermined number of times in advance and, when the processing in step S14 is performed, transmit the data to the power transmitter 300.

When determining that the number of times the reduction in the duty ratio is carried out is equal to or less than the predetermined number of times (YES in step S14), the power transmitter 300 transmits an adjustment command for reducing the duty ratio of the PWM driving pattern of the power receiver 100 excessive in the received electric power (step S15). This is to improve a balance of received electric powers of all of the plurality of power receivers 100 by reducing the duty ratio of the PWM driving pattern of the power receiver 100 excessive in the received electric power to reduce the received electric power.

In step S15, when a plurality of power receivers 100 excessive in the received electric power are present, the power transmitter 300 transmits the adjustment command for reducing the duty ratio to all of the plurality of power receivers 100 excessive in the received electric power.

When ending the processing in step S15, the power transmitter 300 returns the flow to step S11A.

When the adjustment command for reducing the duty ratio of the PWM driving pattern is transmitted to the power receiver 100 excessive in the received electric power in step S15, the power receiver 100 determines that the adjustment command is received (YES in step S3) and determines whether an independent operation flag is off (step S3A).

The independent operation flag is a flag set to '1' when the power receiver 100 independently adjusts the duty ratio in a state in which the power receiver 100 does not receive the adjustment command from the power transmitter 300. The independent operation flag is set to '0' when the power receiver 100 does not independently adjust the duty ratio.

When determining that the independent operation flag is off (YES in step S3A), the power receiver 100 reduces the duty ratio of the PWM driving pattern by one step according to the adjustment command (step S4).

When determining that both of the power receiver 100 excessive in the received electric power and the power receiver 100 insufficient in the received electric power are not present (NO in step S13), the power transmitter 300 adjusts electric power transmitted from the primary-side resonance coil 12 (transmitted electric power) (step S16).

In step S16, when one or a plurality of power receivers 100 excessive in the received electric power are present and received electric powers of the remaining power receivers 100 are proper, the power transmitter 300 reduces the transmitted electric power by predetermined electric power.

In step S16, when one or a plurality of power receivers 100 insufficient in the received electric power are present and received electric powers of the remaining power receivers 100 are proper, the power transmitter 300 increases the transmitted electric power by predetermined electric power.

In step S16, when the determining unit 340 determines that a plurality of power receivers 100 proper in the received electric power are present, the power transmitter 300 maintains the transmitted electric power. That is, for example, the power transmitter 300 retains the transmitted electric power at that time without changing the transmitted electric power.

The power transmitter 300 retaining the transmitted electric power at that time without changing the transmitted electric power is equivalent to setting an adjustment degree of the transmitted electric power to zero.

Data indicating predetermined electric power at the time when the power transmitter 300 reduces the transmitted electric power and predetermined electric power at the time when the power transmitter 300 increases the transmitted electric power only have to be stored in the memory 360 in advance. The predetermined electric power in reducing the transmitted electric power and the predetermined electric power in increasing the transmitted electric power may be different.

When ending the processing in step S16, the power transmitter 300 returns the flow to step S11A.

When determining in step S14 that the number of times the reduction in the duty ratio is carried out is not equal to or less than the predetermined number of times (NO in step S14), the power transmitter 300 excludes one power receiver 100 most excessive in the received electric power from the simultaneous power feeding group (step S17).

One power receiver 100 for which the number of times the reduction in the duty ratio is carried out is more than the predetermined number of times and that is most excessive in the received electric power is the power receiver 100, the received electric power of which does not fit in a proper range even if the duty ratio is reduced for the number of times more than the predetermined number of times by one. Therefore, the power receiver 100 is excluded from the simultaneous power feeding group.

One power receiver 100 most excessive in the received electric power only has to be determined based on the excessive degree data. When the power receiver 100 excessive in the received electric power is one power receiver 100 in step S17, the one power receiver 100 excessive in the received electric power only has to be excluded from the simultaneous power feeding group without using the excessive degree data.

The power transmitter 300 causes the power receiver 100 excluded from the simultaneous power feeding group in step S17 to stop power reception (step S18). The stop of the power reception only has to be performed by, for example, transmitting an adjustment command for setting a duty ratio to 0% to the power receiver 100.

When ending the processing in step S18, the power transmitter 300 returns the flow to step S11A.

When determining in step S12 that any one of the power receivers 100 is fully charged (YES in step S12), the power transmitter 300 stops power feeding to the fully charged power receiver 100 (step S19).

In this case, the power transmitter 300 only has to transmit the adjustment command for setting the duty ratio to 0% to the power receiver 100 determined as being fully charged in step S12. The power receiver 100 not having reached full charge only has to be charged by continuously performing the processing illustrated in FIG. 34.

When determining that the received electric power is not equal to or smaller than the predetermined value (NO in step S1B), the power receiver 100 reduces the duty ratio by one step (step S1C). This is processing for independently reducing the duty ratio in a state in which the power receiver 100 does not receive the adjustment command from the power transmitter 300.

Subsequently, the power receiver 100 sets the independent operation flag to ON ('1') (step S1D). The power receiver 100 sets the independent operation flag in the memory 154.

When ending the processing in step S1D, the power receiver 100 returns the flow to step S1A. This is to calculate received electric power, generate electric power data and excessive degree data, and detect a charging rate of the battery 220 in a state in which the duty ratio is reduced by one step.

The processing in steps S1B, S1C, and S1D is repeatedly executed until it is determined in step S1B that the received electric power is equal to or smaller than the predetermined value (YES in step S1B). While the processing in steps S1B, S1C and S1D is repeatedly executed, the received electric power of the power receiver 100 is larger than the predetermined value in step S1B.

In such a case, the power receiver 100 independently adjusts the duty ratio and reduces the received electric power without performing communication with the power transmitter 300. That is, for example, even if the power receiver 100 does not receive the adjustment command from the power transmitter 300, the power receiver 100 reduces the received electric power by independently repeatedly executing the processing in steps S1B, S1C, and S1D. Therefore, the received electric power may be reduced in a short time.

Compared with when the power receiver 100 receives the adjustment command from the power transmitter 300, the processing in steps S2D, S3, S3A, and S4 is skipped and a time in which the power receiver 100 and the power transmitter 300 perform communication is reduced. Therefore, the received electric power may be reduced in a short time.

When determining that the received electric power is equal to or smaller than the predetermined value (YES in step S1B) in step S1B after the processing in steps S1B, S1C, and S1D is repeatedly executed and the independent operation flag is set to ON and further determining that the independent operation flag is not off (NO in step S3A), the power receiver 100 sets the independent operation flag to OFF (step S3B). The power receiver 100 sets the independent operation flag to OFF in preparation for the next control cycle.

When the flow proceeds to steps S1B, S2D, S3, S3A, and S3B after the processing in steps S1B, S1C, and S1D is repeatedly executed and the independent operation flag is set to ON in this way, the received electric power of the power receiver 100 is reduced to the predetermined value or smaller in step S1B.

The power receiver 100 sets the independent operation flag to OFF in step S3B and returns the flow to step S1A.

FIG. 35 is a diagram illustrating operation in reducing received electric power of the power receiver 100 to a target value using a reduction command. In the following explanation, the power receiver 100 moves and approaches the power transmitter 300 when the power transmitter 300 is transmitting electric power to the power receiver 100. When the power receiver 100 approaches the power transmitter 300, the received electric power increases. Therefore, measures taken when the received electric power suddenly increases are explained.

In FIG. 35, the horizontal axis is a time axis and three vertical axes indicate received electric power and a duty ratio of the power receiver 100 and transmitted electric power of the power transmitter 300. Concerning the received electric power, levels of a predetermined value, a target value, an upper limit, and a lower limit are illustrated. When the received electric power exceeds a breakage upper limit, the secondary-side resonance coil 110 of the power receiver 100 is likely to be broken. Therefore, the predetermined value, the target value, and the upper limit are set to values lower than the breakage upper limit. The same applies to the first embodiment.

At time t11, the power transmitter 300 starts power transmission. At this time, the duty ratio of the power receiver 100 is set to an initial value D11. At time t11, the received electric power of the power receiver 100 is equal to or smaller than the predetermined value. In this state, the received electric power of the power receiver 100 is excessive.

At time t11 to time t12, the power transmitter 300 controls the transmitted electric power according to the processing in step S16. The transmitted electric power decreases little by little from PS11 to reach PS12 at time t12. In this state, the duty ratio of the power receiver 100 is a fixed value because the duty ratio is not changed. At time t11 to time t12, if the power transmitter 300 and the power receiver 100 perform communication three times with Bluetooth Low Energy, a required time is approximately 0.75 second.

At time t12, the received electric power of the power receiver 100 decreases to the upper limit value to be a proper state. At time t12 to time t13, the received electric power is in the proper state and electric power is stably transmitted from the power transmitter 300 to the power receiver 100. The received electric power is retained at the upper limit value. Maximum electric power in the proper state is transmitted from the power transmitter 300 to the power receiver 100. The duty ratio is retained at D11.

At time t13, the power receiver 100 moves and approaches the power transmitter 300. Therefore, the received electric power increases to be larger than the predetermined value.

When the received electric power increases to be larger than the predetermined value, the power receiver 100 determines NO in step S1B, reduces the duty ratio by one step in step S1C, and sets the independent operation flag to ON in step S1D. The duty ratio is reduced to D12.

The processing in steps S1B, S1C, and S1D is repeatedly executed until the received electric power decreases to the predetermined value or smaller. At time t13 to time t14, the power transmitter 300 and the power receiver 100 do not perform communication. Therefore, the received electric power of the power receiver 100 may be very quickly reduced.

At time t14, the received electric power of the power receiver 100 decreases to the predetermined value or smaller. However, since the received electric power is in the excessive state, the transmitted electric power is reduced in step S16. The processing in step S16 is repeatedly performed at time t14 to time t15, whereby, at time t15, the received electric power reaches the upper limit and the transmitted electric power reaches PS13. Since the received electric power of the power receiver 100 reaches the upper limit, the received electric power changes to a proper state.

At time t15, when the received electric power of the power receiver 100 becomes proper as well, the power transmitter 300 maintains the transmitted electric power in the processing in step S16. The power receiver 100 is charged in a state in which the duty ratio is retained fixed until time t16. The charging of the battery 220 ends at time t16, whereby the power transmission is stopped.

As explained above, at time t13 to time t14, the received electric power is reduced to the target value without performing communication between the power receiver 100 and the power transmitter 300, the received electric power of the power receiver 100 may be quickly reduced.

In order to realize such a quick reduction in the received electric power, concerning the power receiver 100 excessive in the received electric power and having the received electric power equal to or larger than the predetermined value, the received electric power of the power receiver 100 is quickly reduced by repeating the processing in steps S1B to S1D.

The form is explained in which electric power is transmitted from the power transmitter 300 to one power receiver 100. However, when a plurality of power receivers 100 are present, the power receivers 100 only have to perform the control explained above. The power receivers 100 perform the control explained above, whereby the flow illustrated in FIG. 34 is realized.

As explained above, with the power transmission system 500 and the power transmitter 300 in the second embodiment, the power transmission output of the power transmitter 300 and the duty ratio of the PWM driving pattern of the power receiver 100 are adjusted according to whether the received electric powers of the plurality of power receivers 100 are excessive, insufficient, or proper. Whether the received electric power of the power receiver 100 is excessive, insufficient, or proper is a power reception state of the power receiver 100.

Such adjustment may be realized by repeatedly executing the loop processing illustrated in FIG. 34 according to power reception states of the plurality of power receivers 100.

That is, for example, for the adjustment of the power transmission output of the power transmitter 300 and the duty ratio of the PWM driving pattern of the power receiver 100, it is possible to realize a state in which the simultaneous power feeding may be easily and simply performed based on the power reception states of the plurality of power receivers 100 without calculating a coefficient of coupling of the secondary-side resonance coil 110 of the power receiver 100 and the primary-side resonance coil 12 of the power transmitter 300.

When the power receiver 100 is receiving electric power from the power transmitter 300 and the power receiver 100 is brought close to the power transmitter 300 and the received electric power becomes excessive and larger than the predetermined value, the received electric power of the power receiver 100 is reduced by repeating the processing in steps S1B to S1D without performing communication between the power receiver 100 and the power transmitter 300.

Therefore, when the power receiver 100 is brought close to the power transmitter 300, the received electric power of the power receiver 100 may be quickly reduced. Breakage of the power receiver 100 may be suppressed. The power receiver 100 may be quickly charged.

Therefore, it is possible to provide the power transmission system 500 and the power transmitter 300 that may efficiently charge the power receiver.

The power transmission systems in the illustrative embodiments are explained above. However, the present disclosure is not limited to the specifically disclosed embodiments. Various modifications and changes are possible without departing from the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power transmission system comprising:
a power transmitter; and
a plurality of power receivers configured to simultaneously receive electric power from the power transmitter with magnetic field resonance or electric field resonance, wherein
each of the plurality of power receivers includes:
a secondary-side resonance coil;
an adjuster configured to adjust received electric power received by the secondary-side resonance coil;
a power reception-side modem configured to communicate with the power transmitter; and
a power reception-side controller configured to control the adjuster,
the power transmitter include:
a primary-side resonance coil configured to transmit electric power to the secondary-side resonance coil of each of the plurality of power receivers with the magnetic field resonance or the electric field resonance;
a power transmission-side modem configured to communicate with the plurality of power receivers;
a first determiner configured to determine based on electric power data concerning rated electric power received from each of the plurality of power receivers and the received electric power whether the power receiver excessive in the received electric power and the power receiver insufficient in the received electric power are present;
a second determiner configured to, when the first determiner determines that the power receiver excessive in the received electric power and the power receiver insufficient in the received electric power are present, determine whether the received electric power of the power receiver excessive in the received electric power is equal to or larger than a predetermined value; and
a command generator configured to transmit, to the power receiver determined as having the received electric power equal to or larger than the predetermined value by the second determiner, via the power transmission-side modem, a command for reducing the received electric power with the adjuster to be equal to or smaller than a predetermined target value,
when the command is received by the power reception-side modem, the power reception-side controller controls the adjuster until the received electric power decrease to the predetermined target value or smaller, and
when the received electric power decreases to the predetermined target value or smaller, the power reception-side modem transmits the electric power data to the power transmission-side modem.

2. The power transmission system according to claim 1, wherein the power reception-side modem does not transmit the electric power data to the power transmission-side modem before the received electric power decreases to the predetermined target value or smaller.

3. The power transmission system according to claim 1, wherein the electric power data is data indicating whether the received electric power of the power receiver is excessive, proper, or insufficient.

4. The power transmission system according to claim 1, wherein
the power receiver further includes:
a rectifier circuit connected to the secondary-side resonance coil and configured to rectify AC power output from the secondary-side resonance coil;
a smoothing circuit connected to an output side of the rectifier circuit; and
a switch inserted in series into a line between the rectifier circuit and the smoothing circuit and configured to switch a connection state of the line, and
the adjuster adjusts the received electric power by adjusting a duty ratio of a driving signal for PWM-driving the switch.

5. The power transmission system according to claim 1, wherein
the power receiver further includes:
a capacitor inserted in series into a resonance coil of the secondary-side resonance coil;
a series circuit of a first switch and a second switch connected in parallel to the capacitor;
a first rectifying element connected in parallel to the first switch and having a first rectifying direction;
a second rectifying element connected in parallel to the second switch and having a second rectifying direction opposite to the first rectifying direction; and a detector configured to detect a voltage waveform or a current waveform of the received electric power of the secondary-side resonance coil, and the adjuster adjusts the received electric power by adjusting a phase difference between the voltage waveform or the current waveform detected by the detector and a first signal for switching ON/OFF of the first switch and a second signal for switching ON/OFF of the second switch.

6. The power transmission system according to claim 1, wherein the power receiver further includes a capacitor inserted in series into the secondary-side resonance coil, and the adjuster adjusts the received electric power by adjusting capacitance of the capacitor.

7. A power transmission system comprising:

a power transmitter; and a plurality of power receivers configured to simultaneously receive electric power from the power transmitter with magnetic field resonance or electric field resonance, wherein each of the plurality of power receivers includes:

a secondary-side resonance coil;

an adjuster configured to adjust received electric power received by the secondary-side resonance coil;

a power reception-side modem configured to communicate with the power transmitter;

a power reception-side determiner configured to determine whether the received electric power is a predetermined value or smaller; and a controller configured to, when the power reception-side determiner determines that the received electric power is not the predetermined value or smaller, adjust the adjuster by a predetermined degree to reduce the received electric power and, when the power reception-side determiner determines that the received electric power is the predetermined value or smaller, cause the power reception-side modem to transmit a report signal indicating an adjustment degree of the adjuster to the power transmitter, the power transmitter include:

a primary-side resonance coil configured to transmit electric power to the secondary-side resonance coils of the plurality of power receivers with the magnetic field resonance or the electric field resonance;

a power transmission-side modem configured to communicate with the plurality of power receivers; and a command generator configured to, when receiving the report signal via the power transmission-side modem, transmit, via the power transmission-side modem, a command for causing the controller to adjust the adjuster based on the adjustment degree indicated by the report signal.

8. The power transmission system according to claim 7, wherein the controller does not cause the power reception-side modem to transmit the report signal to the power transmitter before the power reception-side determiner determines that the received electric power is the predetermined value or smaller.

9. The power transmission system according to claim 7, wherein the power transmitter further includes a determiner configured to determine based on electric power data concerning rated electric power received from each of the plurality of power receivers and the received electric power whether the power receiver excessive in the received electric power and the power receiver insufficient in the received electric power are present, and when the determiner determines that the power receiver excessive in the received electric power and the power receiver insufficient in the received electric power are present, the command generator transmits, to the power receiver excessive in the received electric power, via the power transmission-side modem, a command for adjusting the adjuster to reduce the received electric power.

* * * * *